United States Patent
Ichihashi et al.

(10) Patent No.: US 6,875,483 B2
(45) Date of Patent: Apr. 5, 2005

(54) LIQUID CRYSTAL COMPOSITION COMPRISING LIQUID CRYSTAL MOLECULES AND ALIGNMENT PROMOTER

(75) Inventors: Mitsuyoshi Ichihashi, Shizuoka (JP); Ken Kawata, Kanagawa (JP); Hiroshi Takeuchi, Kanagawa (JP); Koushin Matsuoka, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 293 days.

(21) Appl. No.: 09/899,031

(22) Filed: Jul. 6, 2001

(65) Prior Publication Data

US 2002/0039627 A1 Apr. 4, 2002

(30) Foreign Application Priority Data

| Jul. 6, 2000 | (JP) | 2000-205709 |
| Jul. 6, 2000 | (JP) | 2000-205710 |
| Jul. 21, 2000 | (JP) | 2000-220963 |

(51) Int. Cl.$^7$ .............................................. C09K 19/56
(52) U.S. Cl. ........................ 428/1.23; 428/1.1; 428/1.2; 252/299.1; 252/299.4
(58) Field of Search ..................... 252/299.01, 299.1, 252/299.2, 299.3, 299.4, 299.5, 299.6, 299.61, 299.62, 299.63, 299.64, 299.65, 299.66, 299.67, 299.68, 299.7; 428/340, 421, 446, 447, 448, 1.1, 1.2, 1.21, 1.23, 1.25, 1.26, 1.27, 1.28

(56) References Cited

U.S. PATENT DOCUMENTS 6,245,398 B1   6/2001   Matsuoka et al.

6,338,808 B1   1/2002   Kawata et al.
6,485,798 B1 * 11/2002   Aminaka et al. ............ 428/1.1

FOREIGN PATENT DOCUMENTS

| EP | 0 864 885 A1 | 9/1998 |
| EP | 0 911 656 A2 | 4/1999 |
| EP | 0 928 984 A2 | 7/1999 |
| GB | 1 455 442 | 11/1976 |
| JP | 2000-345164 A | 12/2000 |
| WO | WO 00/04110 A1 | 1/2000 |

OTHER PUBLICATIONS

EPO Search Report, dated Dec. 10, 2002 in EP Application No. 01115725.2–2103.

* cited by examiner

Primary Examiner—Philip C. Tucker
Assistant Examiner—Michael J Feely
(74) Attorney, Agent, or Firm—Burns, Doane, Swecker & Mathis, L.L.P.

(57) ABSTRACT

A liquid crystal composition comprises liquid crystal molecules and an alignment promoter. The alignment promoter is represented by the formula (I):

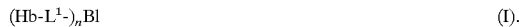

$$(Hb-L^1-)_n Bl \qquad (I).$$

In the formula (I), Hb is an aliphatic group having 4 to 40 carbon atoms, an aromatic group having 6 to 40 carbon atoms or an aliphatic substituted oligosiloxanoxy group having 1 to 40 carbon atoms. $L^1$ is a single bond or a divalent linking group, and n is an integer of 2 to 12. Bl is an n-valent group comprising at least two rings.

50 Claims, 5 Drawing Sheets

LIQUID CRYSTAL COMPOSITION COMPRISING LIQUID CRYSTAL MOLECULES AND ALIGNMENT PROMOTER

FIELD OF THE INVENTION

The present invention relates to a liquid crystal composition comprising liquid crystal molecules and an alignment promoter. The invention also relates to an optically anisotropic element.

BACKGROUND OF THE INVENTION

A liquid crystal display of transmission type comprises a liquid crystal cell and two polarizing elements placed on both sides of the cell. A display of reflection type comprises a reflection board, a liquid crystal cell and one polarizing element in this order.

The liquid crystal cell comprises a pair of substrates, rod-like liquid crystal molecules and an electrode layer. The rod-like liquid crystal molecules are provided between the substrates. The electrode layer has a function of applying a voltage to the rod-like liquid crystal molecules. Each of the substrates has an orientation layer, which has a function of aligning the rod-like liquid crystal molecules. Since the rod-like liquid crystal molecules are placed between the orientation layers, the alignment of the liquid crystal is easily controlled by the orientation layers.

An optical compensatory sheet (phase retarder) is often provided between the cell and the polarizing element to enlarge a viewing angle of the display. The optical compensatory sheet has another function of removing undesirable color from a displayed image. A stretched birefringent film has been usually used as the optical compensatory sheet. An optically anisotropic element has recently been proposed as an optical compensatory sheet in place of the stretched birefringent film. The optically anisotropic element comprises a transparent support and an optically anisotropic layer.

The optically anisotropic layer comprises aligned liquid crystal molecules that are aligned and polymerized while keeping alignment. The liquid crystal molecules are aligned by one orientation layer provided between the transparent support and the optically anisotropic layer.

SUMMERY OF THE INVENTION

It is difficult to align liquid crystal molecules uniformly (i.e., to orient the molecules in monodomain alignment) from an interface facing the orientation layer to the opposite interface facing air by using only one orientation layer. If the liquid crystal molecules are not uniformly aligned, disclination arises to scatter light.

An object of the present invention is to provide a liquid crystal composition in which liquid crystal molecules can easily be aligned uniformly.

Another object of the invention is to provide an optically anisotropic element in which liquid crystal molecules are uniformly aligned near an interface having no orientation layer.

A further object of the present invention is to provide an aromatic compound, which can be used as an alignment promoter effectively controlling the alignment of liquid crystal molecules.

The present invention provides a liquid crystal composition comprising liquid crystal molecules and an alignment promoter represented by the formula (I) in an amount of 0.01 to 20 wt. % based on the amount of the liquid crystal molecules:

$$(Hb-L^1-)_n Bl \quad (I)$$

in which Hb is a hydrophobic group selected from the group consisting of an aliphatic group having 4 to 40 carbon atoms, an aromatic group having 6 to 40 carbon atoms and an aliphatic substituted oligosiloxanoxy group having 1 to 40 carbon atoms; $L^1$ is a single bond or a divalent linking group; n is an integer of 2 to 12; and Bl is an n-valent group comprising at least two rings.

The invention also provides an optically anisotropic element which comprises a liquid crystal layer comprising liquid crystal molecules and an orientation layer provided on only one side of the liquid crystal layer, wherein the liquid crystal layer further contains an alignment promoter represented by the formula (I) in an amount of 0.005 to 0.5 g/m².

The invention further provides an aromatic compound represented by the formula (III):

$$(Hb-L^1-Cy^1-L^2-)_n Ar \quad (III)$$

in which Hb is an aliphatic group having 6 to 40 carbon atoms or an aliphatic substituted oligosiloxanoxy group having 1 to 40 carbon atoms; $L^1$ is a single bond or a divalent linking group selected from the group consisting of an alkylene group, a fluorine-substituted alkylene group, —O—, —S—, —CO—, —NR—, —SO₂— and a combination thereof, and R is hydrogen or an alkyl group having 1 to 30 carbon atoms; $Cy^1$ is a divalent aromatic group or a divalent heterocyclic group; $L^2$ is a single bond or a divalent linking group selected from the group consisting of an alkylene group, an alkenylene group, an alkynylene group, —O—, —S—, —CO—, —NR—, —SO₂— and a combination thereof, and R is hydrogen or an alkyl group having 1 to 30 carbon atoms; n is an integer of 2, 3, 4 or 5; and Ar is an n-valent aromatic hydrocarbon group.

In the present specification, the term "average inclined angle" means an average of angles between discotic planes of discotic liquid crystal molecules and a surface of the support (or a surface of the orientation layer), or an average of angles between major axes of rod-like liquid crystal molecules and a surface of the support (or a surface of the orientation layer).

The present specification refers to alignment of liquid crystal molecules at an average inclined angle in the range of 50° to 90° as essentially vertical alignment. The specification also refers to alignment of liquid crystal molecules at an average inclined angle in the range of 0° to 50° as horizontal alignment.

In other words, the term "essentially vertical alignment" means homogeneous alignment of discotic liquid crystal molecules or homeotropic alignment of rod-like liquid crystal molecules. In contrast, the term "essentially horizontal alignment" in the specification means homeotropic alignment of discotic liquid crystal molecules or homogeneous alignment of rod-like liquid crystal molecules.

If liquid crystal molecules are placed between a pair of orientation layers (for example, in a liquid crystal cell), the layer of the liquid crystal molecules has no free interface (an interface facing air). In that case, the alignment of the liquid crystal molecules can be controlled relatively with ease. On the other hand, however, if only one orientation layer is used, various alignment defects often appear near the free interface (having no orientation layer). Since force for controlling the alignment is not given near the free interface, it is very difficult to align the liquid crystal molecules uniformly without defects. Further, the alignment near the free interface is often perturbed by influence from outside. For example, solvent of the coating liquid unevenly evaporates from the free interface, or the free interface is blown by air for drying. Consequently, defects of the alignment are liable to appear on the free interface. Dual domain alignment is often observed on the free interface when discotic liquid crystal molecules are aligned vertically (homogeneously). The dual domain alignment comprises two aligning forms in which the discotic planes in one aligning form reversibly face to those in the other aligning form though the optical axes are parallel.

The study of the present applicants revealed that the compound defined by the formula (I) has a function of controlling the alignment of liquid crystal molecules, particularly liquid crystal molecules near the free interface when only one orientation layer is used. As shown in the formula (I), the compound comprises a hydrophobic group (Hb) and a bulky group (Bl), which can show an excluded volume effect.

The compound of the formula (I) is mixed with liquid crystal, applied on the orientation layer, and thickly distributed near the free interface. For thickly distributing near the free interface, the compound must be incompatible with the liquid crystal so that the phase of the compound may be separated from that of the liquid crystal. The hydrophobic group (Hb) has a function of separating the compound from the liquid crystal phase. A hydrophobic group (Hb) containing a fluorine atom has a strong function of causing the phase separation.

Further, for promoting the alignment of the liquid crystal molecules, the compound must comprise a relatively rigid part having molecular polarization property similar to that of the liquid crystal. The bulky group (Bl) functions as that part.

The present inventors consider that the hydrophobic group (Hb) faces the air side while the bulky group (Bl) faces the liquid crystal side, where the compound of the formula (I) is placed near the free interface. The bulky group (Bl) has at least two rings. The two rings can form a planar structure. The two rings can also form a structure comprising a part protruding to the liquid crystal side (for example, a structure comprising at least two rings connected through a single bond, a vinylene bond or an ethynylene bond).

In the case that the rings form a planar structure, the compound of the formula (I) effectively aligns rod-like liquid crystal molecules horizontally. If the bulky group (Bl) has a structure comprising a part protruding to the liquid crystal side, the compound vertically aligns both rod-like and discotic liquid crystal molecules.

As is described above, interactions (such as intermolecular electrostatic force of attraction and force of repulsion caused by the excluded volume effect of the bulky group (Bl)) between the liquid crystal molecules and the compound of the formula (I) can be freely controlled by varying the molecular structure, particularly the bulky group (Bl) of the compound. Regardless of the chemical structures of the liquid crystal molecules, the inclined angles of the molecules near the free interface can be freely controlled by appropriately selecting the compound of the formula (I).

Further, an aligning direction of liquid crystal molecules can be controlled by irradiating light from the direction where a photosensitive group is contained in the bulky group (Bl). By adjusting the direction in which light is applied, the aligning direction of liquid crystal molecules near the free interface can be desirably controlled, no matter what kind of liquid crystal molecules is used.

Therefore, the liquid crystal molecules even near the free interface having no orientation layer can be uniformly aligned by the alignment promoter represented by the formula (I).

Moreover, discotic liquid crystal molecules can be essentially vertically (homogeneously) and uniformly oriented in mono domain alignment according to the present invention.

In more detail, the discotic liquid crystal molecules can be aligned by using an appropriate amount of the compound of the formula (I) and by controlling the temperature for alignment. Without either using the compound of the formula (I) or controlling the aligning temperature, the liquid crystal molecules are aligned in dual domain alignment.

An optical compensatory sheet suitable for a liquid crystal display of an STN mode is now obtained by using the discotic liquid crystal molecules in essentially vertical, uniform and stable alignment. Accordingly, blue or yellow color can be reduced in a liquid crystal display of an STN mode. Therefore, the liquid crystal display of an STN mode can give a clear image with a high contrast by using the optical compensatory sheet in which the discotic liquid crystal molecules are essentially vertically oriented in essentially mono domain alignment (and are preferably twisted).

DETAILED DESCRIPTION OF THE INVENTION

Figure 1:
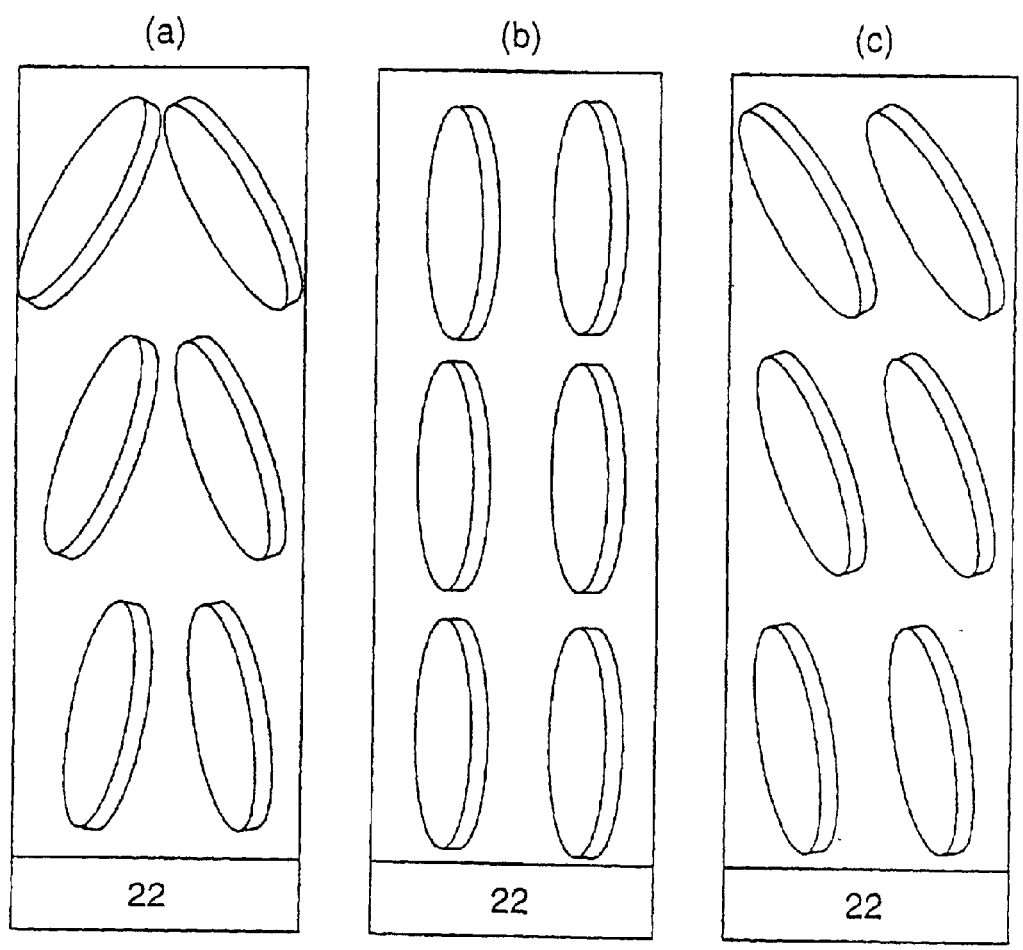
FIG. 1 schematically illustrates discotic liquid crystal molecules vertically oriented in essentially dual domain alignment or in essentially mono domain alignment.

FIG. 1 schematically illustrates discotic liquid crystal molecules vertically oriented in essentially dual domain alignment or in essentially mono domain alignment.

In FIG. 1($a$), the discotic liquid crystal molecules are aligned vertically in dual domain alignment at the average inclined angle of 90°. Though each of the molecules has an inclined angle of 60° to 80°, they form pairs inclined toward opposite directions (i.e., they are aligned in dual domain alignment). Therefore, the average inclined angle is 90° in total. In general, the molecules near the orientation layer (22) have large inclined angles (e.g., 80° in the figure) and those on the opposite side (near the interface facing the air) have small inclined angles (e.g., 60° in the figure). Discotic liquid crystal molecules substantially vertically aligned in prior arts are thought to form the dual domain alignment shown in the figure. The discotic liquid crystal molecules oriented in the dual domain alignment scatter light because of the disclination.

In FIG. 1($b$), the discotic liquid crystal molecules are aligned vertically in mono domain alignment at the average inclined angle of 90°. Each of the molecules has the inclined angle of 90°.

In FIG. 1(c), the discotic liquid crystal molecules are aligned in mono domain alignment at the average inclined angle of 70°. Each of the molecules has an inclined angle of 60° to 80°. In contrast to FIG. 1(a), the molecules in FIG. 1(c) incline toward the same direction (i.e., they are oriented in mono domain alignment), and the average inclined angle is 70° in total.

The light-scattering caused by the disclination can be prevented by the discotic liquid crystal molecules oriented in mono domain alignment shown in FIG. 1(b) or (c).

Figure 2:
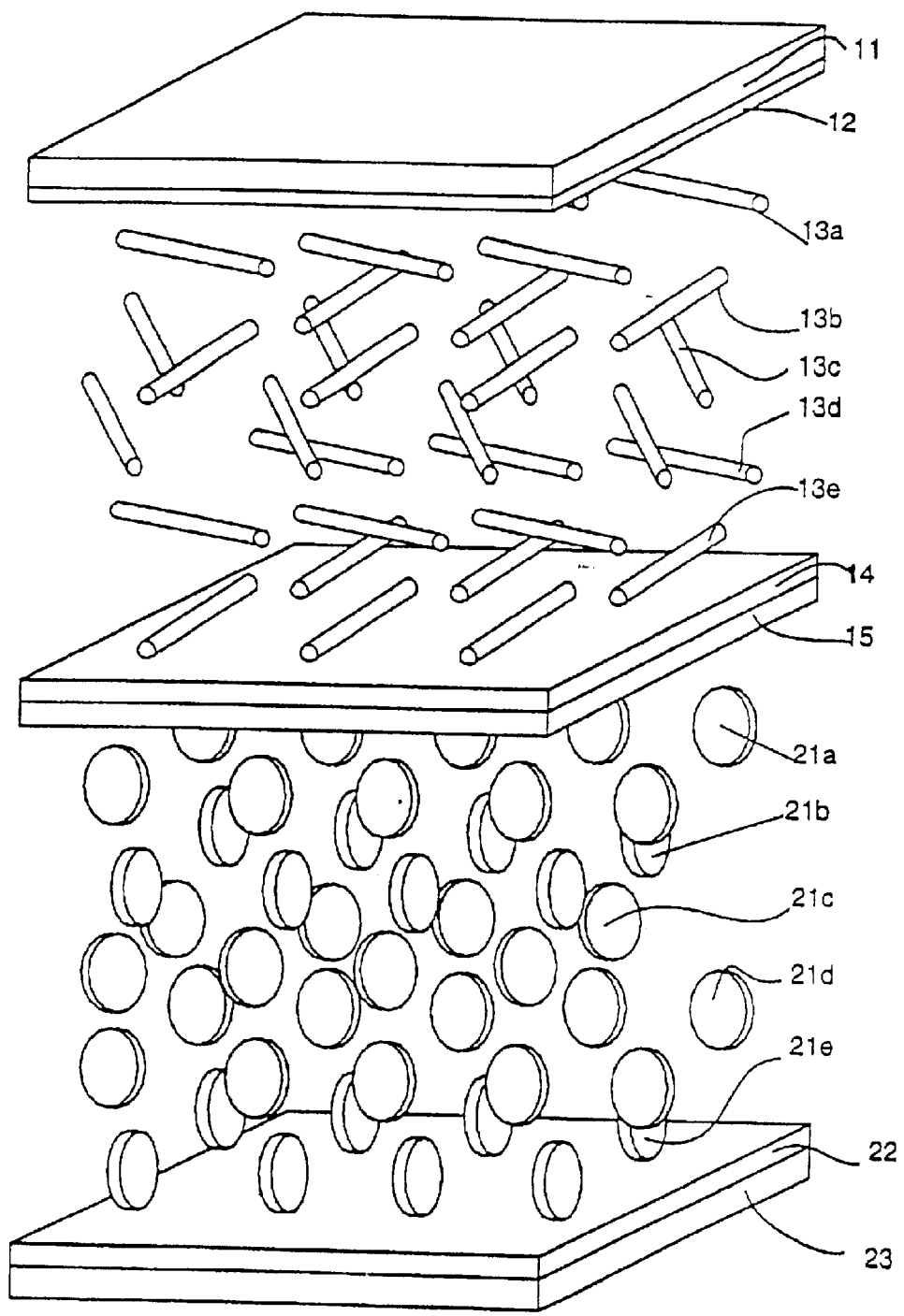
FIG. 2 is a sectional view schematically illustrating alignment of rod-like liquid crystal molecules in a liquid crystal cell of an STN mode and alignment of discotic liquid crystal molecules in an optically anisotropic layer when voltage is not applied (off) to the cell.
Figure 3:
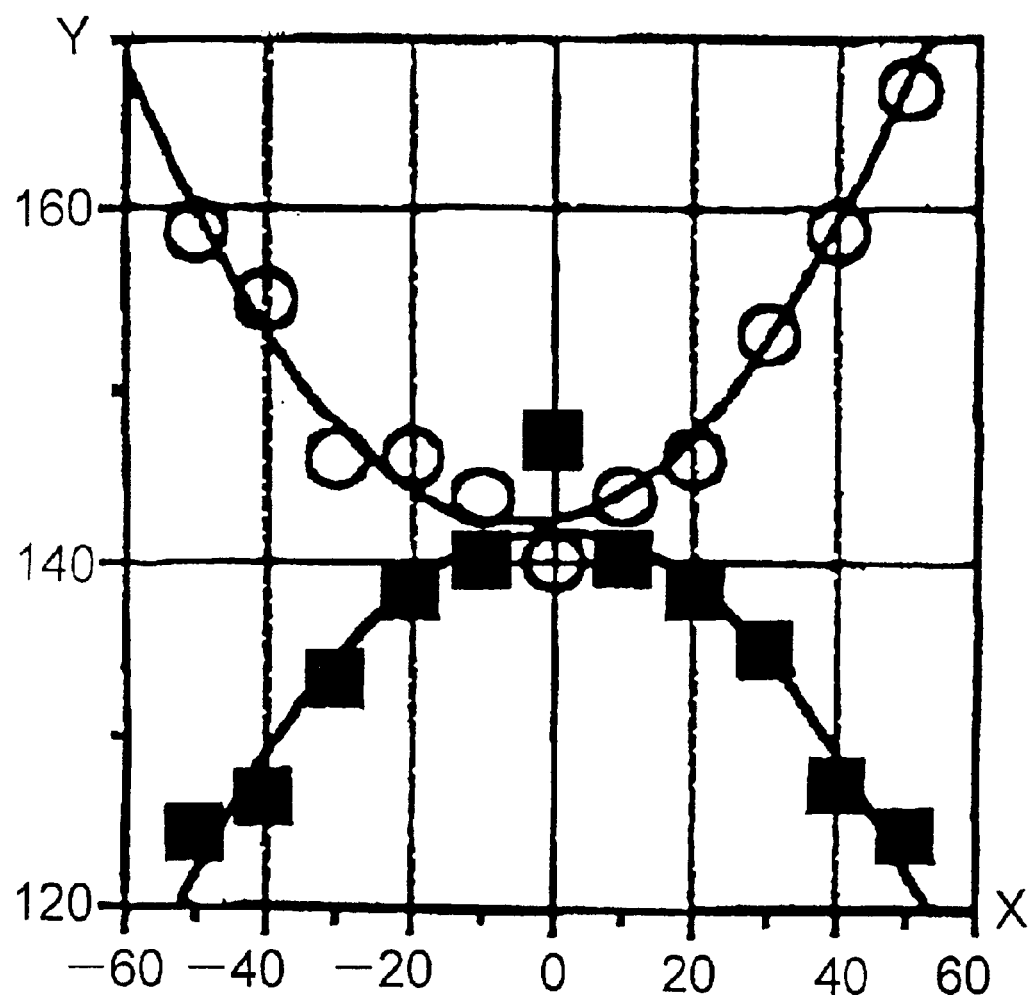
FIG. 3 is a graph showing retardation values of the optically anisotropic element prepared in Example 5 measured at various viewing angles.
Figure 4:
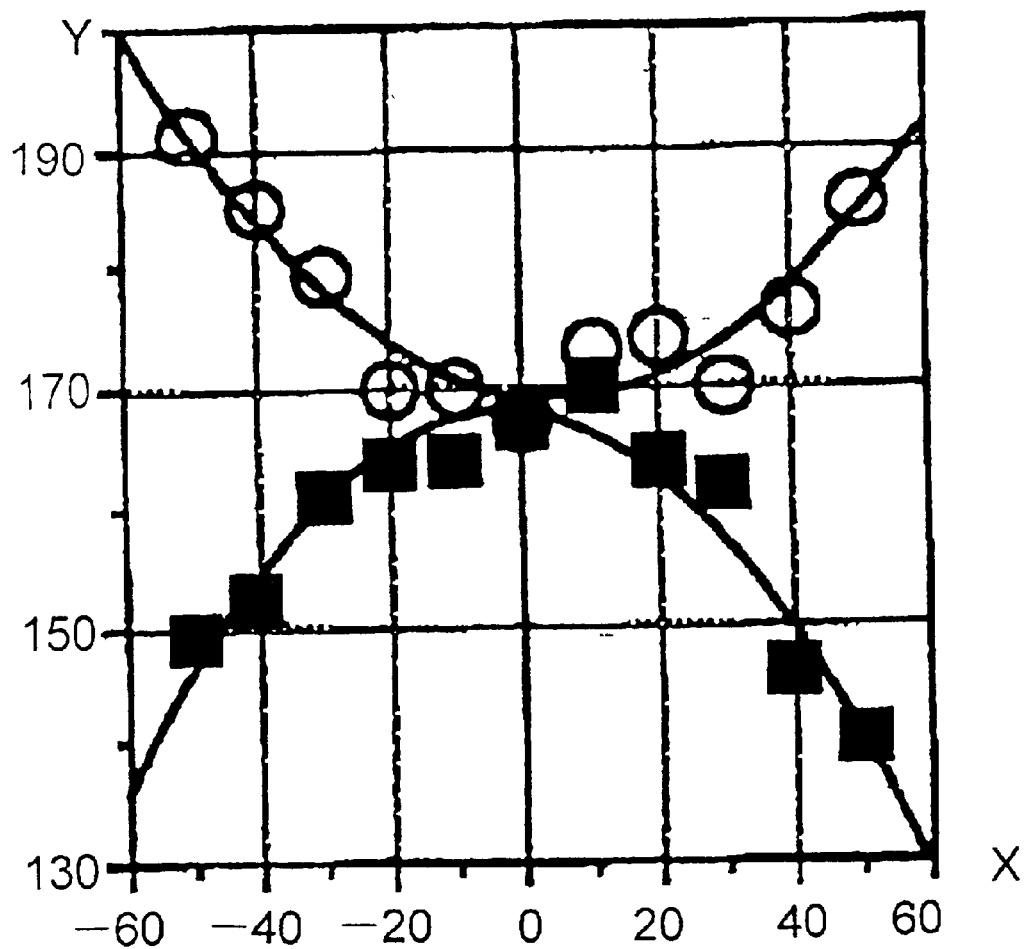
FIG. 4 is a graph showing retardation values of the optically anisotropic element prepared in Example 6 measured at various viewing angles.

FIG. 2 is a sectional view schematically illustrating alignment of rod-like liquid crystal molecules in a liquid crystal cell of an STN mode and alignment of discotic liquid crystal molecules in an optically anisotropic layer when voltage is not applied (off) to the cell.

As is shown in FIG. 2, a liquid crystal cell (11 to 15) comprises an upper substrate (11) having an upper orientation layer (12), a lower substrate (15) having a lower orientation layer (14) and a liquid crystal layer comprising rod-like liquid crystal molecules (13a to 13e) sealed between the orientation layers (12 & 14). The rod-like liquid crystal molecules (13a to 13e) are aligned by functions of the orientation layers (12 & 14), and are twisted by a function of a chiral agent (not shown) contained in the liquid crystal layer.

Each of the upper substrate (11) and the lower substrate (15) has an electrode (not shown), which has a function of applying voltage to the rod-like liquid crystal molecules (13a to 13e).

When voltage is not applied to the liquid crystal cell of an STN mode (off), the rod-like liquid crystal molecules (13a to 13e) are essentially horizontally aligned parallel to the surface of the orientation layers (12 & 14), as is shown in FIG. 2. The rod-like liquid crystal molecules (13a to 13e) are twisted along a thickness direction, and spiral on a plane (counterclockwise about 240° from 13a to 13e in FIG. 2).

When voltage is applied to the liquid crystal cell of an STN mode (on), rod-like liquid crystal molecules placed in the middle of the cell (13b to 13d) are rather vertically aligned (realigned parallel to a direction of an electric field), compared with FIG. 2 (off). On the other hand, the alignment of the other rod-like liquid crystal molecules (13a, 13e) neighboring the substrates (11, 15) is not essentially changed after applying voltage to the cell.

An optical compensatory sheet is provided under the liquid crystal cell. The optical compensatory sheet shown in FIG. 2 comprises a transparent substrate (23), an orientation layer (22) and an optically anisotropic layer in order. The optically anisotropic layer is formed by aligning discotic liquid crystal molecules (21a to 21e) and fixing the molecules while the alignment is maintained.

According to the present invention, discotic liquid crystal molecules (21a to 21e) are so aligned that discotic planes of the molecules are essentially perpendicular to a surface of the orientation layer (22). The discotic liquid crystal molecules (21a to 21e) are preferably twisted along a thickness direction, and spiral on a plane (clockwise about 240° from 21a to 21e in FIG. 2).

In FIG. 2, alignment of each of the rod-like liquid crystal molecules corresponds to alignment of each of the discotic liquid crystal molecules, namely 13a to 21e, 13b to 21d, 13c to 21c, 13d to 21b and 13e to 21a. Accordingly, the discotic liquid crystal molecule 21e optically compensates the rod-like liquid crystal molecule 13a, 21d compensates 13b, 21c compensates 13c, 21b compensates 13d, and 21a compensates 13e.

[Alignment Promoter]

The compound represented by the formula (I) is used as the alignment promoter.

$$(Hb\text{-}L^1\text{-})_n Bl \qquad (I)$$

In the formula (I), Hb is a hydrophobic group selected from the group consisting of an aliphatic group having 4 to 40 carbon atoms, an aromatic group having 6 to 40 carbon atoms and an aliphatic substituted oligosiloxanoxy group having 1 to 40 carbon atoms. A fluorine-substituted alkyl group having 4 to 40 carbon atoms, an alkyl group having 6 to 40 carbon atoms and a fluorine-substituted aryl group having 6 to 40 carbon atoms are preferred.

The aliphatic group preferably has a chain structure rather than a cyclic structure. The aliphatic group can have a branched structure. The aliphatic group preferably has 6 to 40 carbon atoms, more preferably has 7 to 35 carbon atoms, further preferably has 8 to 30 carbon atoms, furthermore preferably has 9 to 25-carbon atoms, and most preferably has 10 to 20 carbon atoms.

The aliphatic group means an alkyl group, a substituted alkyl group, an alkenyl group, a substituted alkenyl group, an alkynyl group or a substituted alkynyl group. The alkyl group, the substituted alkyl group, the alkenyl group and the substituted alkenyl group are preferred, the alkyl group and the substituted alkyl group are more preferred.

Examples of the substituent groups of the aliphatic groups include a halogen atom, hydroxyl, cyano, nitro, an alkoxy group, a substituted alkoxy group (e.g., an oligoalkoxy group), an alkenyloxy group (e.g., vinyloxy), an acyl group (e.g., acryloyl, methacryloyl), an aryloxy group (e.g., acryloyloxy, benzoyloxy), sulfamoyl, an aliphatic substituted sulfamoyl group and an epoxyalkyl group (e.g., epoxyethyl). The substituent group preferably is a halogen atom, and more preferably is fluorine. In other words, a fluorine-substituted aliphatic group is preferred.

In the fluorine-substituted aliphatic group, the ratio of fluorine atoms substituting hydrogen atoms of the aliphatic group is preferably in the range of 50 to 100%, more preferably 60 to 100%, further preferably 70 to 100%, furthermore preferably 80 to 100%, and most preferably 85 to 100%.

The aromatic group means an aryl group or a substituted aryl group.

The aryl group preferably is phenyl or naphthyl.

Examples of the substituent groups of the substituted aryl groups include a halogen atom, hydroxyl, cyano, nitro, an alkoxy group, a substituted alkoxy group (e.g., an oligoalkoxy group), an alkenyloxy group (e.g., vinyloxy), an acyl group (e.g., acryloyl, methacryloyl), an aryloxy group (e.g., acryloyloxy, benzoyloxy), sulfamoyl, an aliphatic substituted sulfamoyl group and an epoxyalkyl group (e.g., epoxyethyl). The substituent group preferably is a halogen atom, and more preferably is fluorine. In other words, a fluorine-substituted aryl group is preferred.

The fluorine-substituted aryl group is preferably a fluorine-substituted phenyl. The ratio of fluorine atoms substituting hydrogen atoms of the aryl group is preferably in the range of 50 to 100%, more preferably 60 to 100%, further preferably 70 to 100%, furthermore preferably 80 to 100%, and most preferably 85 to 100%.

The aliphatic substituted oligosiloxanoxy group comprises 1 to 40 carbon atoms in total. The aliphatic substituted oligosiloxanoxy group preferably has 6 to 40 carbon atoms, more preferably has 7 to 35 carbon atoms, further preferably has 8 to 30 carbon atoms, furthermore preferably has 9 to 25 carbon atoms, and most preferably has 10 to 20 carbon atoms. The aliphatic substituted oligosiloxanoxy group is represented by the following formula:

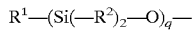

in which $R^1$ is hydrogen, hydroxyl or an aliphatic group; $R^2$ is hydrogen, an aliphatic group or an alkoxy group; and q is an integer of 1 to 12. $R^1$ preferably is hydroxyl. Each of the two groups represented by $R^2$ preferably is an alkyl group. In the formula, q preferably is an integer of 2 to 8, and more preferably is an integer of 3 to 6.

The aliphatic group preferably has a chain structure rather than a cyclic structure. The aliphatic group can have a branched structure. The aliphatic group preferably has 1 to 12 carbon atoms, more preferably has 1 to 8 carbon atoms, further preferably has 1 to 6 carbon atoms, furthermore preferably has 1 to 5 carbon atoms, and most preferably has 1 to 4 carbon atoms.

The aliphatic group means an alkyl group, a substituted alkyl group, an alkenyl group, a substituted alkenyl group, an alkynyl group or a substituted alkynyl group. The alkyl group, the substituted alkyl group, the alkenyl group and the substituted alkenyl group are preferred, the alkyl group and the substituted alkyl group are more preferred.

Examples of the substituent groups of the aliphatic groups include a halogen atom, hydroxyl, cyano, nitro, an alkoxy group, a substituted alkoxy group (e.g., an oligoalkoxy group), an alkenyloxy group (e.g., vinyloxy), an acyl group (e.g., acryloyl, methacryloyl), an aryloxy group (e.g., acryloyloxy, benzoyloxy), sulfamoyl, an aliphatic substituted sulfamoyl group and an epoxy group (e.g., epoxyethyl).

The alkoxy group can have a cyclic or branched structure. The alkoxy group preferably has 1 to 12 carbon atoms, more preferably has 1 to 8 carbon atoms, further preferably has 1 to 6 carbon atoms, and most preferably has 1 to 4 carbon atoms.

Examples of the hydrophobic group (Hb) are shown below.

| | |
|---|---|
| Hb1: | n-C$_{16}$H$_{33}$— |
| Hb2: | n-C$_{20}$H$_{41}$— |
| Hb3: | n-C$_6$H$_{13}$—CH(n-C$_4$H$_9$)—CH$_2$—CH$_2$— |
| Hb4: | n-C$_{12}$H$_{25}$— |
| Hb5: | n-C$_{18}$H$_{37}$— |
| Hb6: | n-C$_{14}$H$_{29}$— |
| Hb7: | n-C$_{15}$H$_{31}$— |
| Hb8: | n-C$_{10}$H$_{21}$— |
| Hb9: | n-C$_{10}$H$_{21}$—CH(n-C$_4$H$_9$)—CH$_2$—CH$_2$— |
| Hb10: | n-C$_8$F$_{17}$— |
| Hb11: | n-C$_8$H$_{17}$— |
| Hb12: | CH(CH$_3$)$_2$—{C$_3$H$_6$—CH(CH$_3$)}$_3$—C$_2$H$_4$— |
| Hb13: | CH(CH$_3$)$_2$—{C$_3$H$_6$—CH(CH$_3$)}$_2$—C$_3$H$_6$—C(CH$_3$)=CH—CH$_2$— |
| Hb14: | n-C$_8$H$_{17}$—CH(n-C$_6$H$_{13}$)—CH$_2$—CH$_2$— |
| Hb15: | n-C$_6$H$_{13}$—CH(C$_2$H$_5$)—CH$_2$—CH$_2$— |
| Hb16: | n-C$_8$F$_{17}$—CH(n-C$_4$F$_9$)—CH$_2$— |
| Hb17: | n-C$_8$F$_{17}$—CF(n-C$_6$F$_{13}$)—CF$_2$—CF$_2$— |
| Hb18: | n-C$_3$F$_7$—CF(CF$_3$)—CF$_2$— |
| Hb19: | Si(CH$_3$)$_3$—{Si(CH$_3$)$_2$—O}$_6$—O— |
| Hb20: | Si(OC$_3$H$_7$)(C$_{16}$H$_{33}$)(C$_2$H$_4$—SO$_2$—NH—C$_8$H$_{17}$)—O— |
| Hb21: | H—C$_8$F$_{16}$— |
| Hb22: | tetrafluorophenyl- |
| Hb23: | H—C$_6$F$_{12}$— |
| Hb24: | H—C$_4$F$_8$— |
| Hb25: | HO—(Si(CH$_3$)$_2$—O)$_4$— |
| Hb26: | n-C$_8$H$_{17}$—CH$_2$—CH$_2$— |

In the formula (I), $L^1$ is a single bond or a divalent linking group. The divalent linking group is preferably selected from the group consisting of an alkylene group, a fluorine-substituted alkylene group, —O—, —S—, —CO—, —NR—, —SO$_2$— and a combination thereof. R is hydrogen or an alkyl group having 1 to 30 carbon atoms. $L^1$ preferably is a divalent linking group selected from the group consisting of an alkylene group, —O—, —S—, —CO—, —NR—, —SO$_2$— and a combination thereof. R preferably is hydrogen or an alkyl group having 1 to 20 carbon atoms, more preferably is hydrogen or an alkyl group having 1 to 15 carbon atoms, and most preferably is hydrogen or an alkyl group having 1 to 12 carbon atoms.

The alkylene group or the fluorine-substituted alkylene group preferably has 1 to 40 carbon atoms, more preferably has 1 to 30 carbon atoms, further preferably has 1 to 20 carbon atoms, furthermore preferably has 1 to 15 carbon atoms, and most preferably has 1 to 12 carbon atoms.

Examples of $L^1$ are shown below. In the examples, the left side is attached to the hydrophobic group (Hb), and the right side is attached to the bulky group (Bl).

| | |
|---|---|
| L0: | Single bond |
| L1: | —O— |
| L2: | —O—CO— |
| L3: | —CO—C$_4$H$_8$—O— |
| L4: | —O—C$_2$H$_4$—O—C$_2$H$_4$—O— |
| L5: | —S— |
| L6: | —N(n-C$_{12}$H$_{25}$)— |
| L7: | —SO$_2$—N(n-C$_3$H$_7$)—CH$_2$CH$_2$—O— |
| L8: | —O—{CF(CF$_3$)—CF$_2$—O}$_3$—CF(CF$_3$)— |
| L9: | —SO$_2$—NH— |
| L10: | —SO$_2$—NH—(CH$_2$)$_6$— |
| L11: | —SO$_2$—N(n-C$_3$H$_7$)—CH$_2$CH$_2$—O—CO—O—CH$_2$CH$_2$— |

In the formula (I), n is an integer of 2 to 12, preferably is an integer of 3 to 9, more preferably is an integer of 3 to 6, and most preferably is 3 or 4.

In the formula (I), Bl is a bulky group comprising at least two rings. Bl preferably comprises at least three rings. Bl preferably shows an excluded volume effect.

Bl preferably is an n-valent group represented by the formula (II):

$$(-Cy^1-L^2-)_n Cy^2 \qquad (II)$$

In the formula (II), $Cy^1$ is a divalent cyclic group. $Cy^1$ preferably is a divalent aromatic hydrocarbon group or a divalent heterocyclic group, and more preferably is a divalent aromatic hydrocarbon group.

The divalent aromatic hydrocarbon group means an arylene group or a substituted arylene group.

Examples of the arylene groups include phenylene, indenylene, naphthylene, fluorenylene, phenanthrenylene, anthrylene and pyrenylene. Phenylene and naphthylene are preferred.

Examples of the substituted arylene groups include an aliphatic group, an aromatic hydrocarbon group, a heterocyclic group, an alkoxy group (e.g., methoxy, ethoxy, methoxyethoxy), an aryloxy group (e.g., phenoxy), an arylazo group (e.g., phenyl azo), an alkylthio group (e.g., methylthio, ethylthio, propylthio), an alkylamino group (e.g., methylamino, propylamino), an acyl group (e.g., acetyl, propanoyl, octanoyl, benzoyl), an acyloxy group (e.g., acetoxy, pivaloyloxy, benzoyloxy), hydroxyl, mercarpto, amino, carboxyl, sulfo, carbamoyl, sulfamoyl and ureido.

The divalent aromatic group of $Cy^1$ is preferably combined with another aromatic ring by a single bond, vinylene bond or ethynylene bond, or is condensed with another aromatic ring to obtain an effect of orienting liquid crystal molecules in a specific alignment.

The divalent aromatic group of Cy$^1$ can have a group corresponding to Hb-L$^1$- as a substituent group.

Further, Bl (preferably Cy$^1$, more preferably the divalent aromatic group of Cy$^1$) can contain a photosensitive group that changes its chemical structure when absorbing light energy.

Examples of the photosensitive groups include a photochromic group, a photo-dimerizable group (e.g., cinnamoyl group) and a photolytic group (e.g., imide group).

The photochromic group generally has an azobenzene structure, a hydrazono-β-ketoester structure or a spiropyran structure.

The photosensitive group preferably has a double bond selected from the group consisting of C=C, C=N or N=N. The double bond in trans-geometry is preferred to that in cis-geometry. The photosensitive group can have two or more double bonds, which are preferably conjugated.

A ring is preferably connected (optionally through a linking group) to one side of the double bond. Examples of the linking group between the double bond and the ring include —NH—, —O—, —CO— and a combination thereof. Preferably, the ring directly connects to the double bond without the linking group.

Examples of the rings include an aromatic ring (e.g., benzene ring, naphthalene ring) and a nitrogen-containing heterocyclic ring (e.g., pyridinium ring, benzopyridinium ring). If the ring is a nitrogen-containing heterocyclic ring, a carbon (not nitrogen) atom in the ring preferably connects to a carbon or nitrogen atom of the double bond. The ring is preferably an aromatic ring, and more preferably benzene ring.

The ring can have a substituent group. Examples of the substituent groups include a halogen atom (fluorine, chlorine, bromine), an alkoxy group (e.g., methoxy, hexyloxy), cyano, an alkyl group (e.g., methyl, butyl, hexyl, cyclohexyl) and an alkylamino group (e.g., dimethylamino). In the case that the ring is benzene ring, the substituent group is preferably connected at the para-position.

The other side of the double bond is connected to the structure of Bl (optionally through a linking group). Examples of the linking groups between the double bond and Bl include —NH—, —O—, —CO— and a combination thereof. Preferably, Bl directly connects to the double bond without the linking group.

A carbon atom contained in the double bond can have a substituent group. Examples of the substituent groups include an aryl group (e.g., phenyl) and cyano. However, the carbon atom in the double bond preferably has no substituent group (namely, the carbon atom in the double bond is preferably in the form of —CH=CH— or —CH=N—).

The photosensitive group most preferably is an aromatic azo group.

Examples of the photosensitive group (Ps) are shown below.

Ps1: 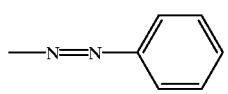

Ps2: 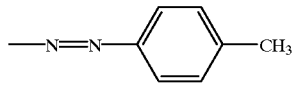

Ps3: 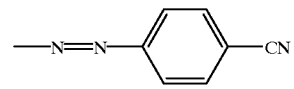

Ps4: 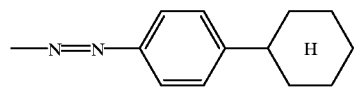

Ps5: 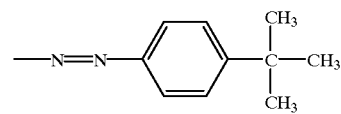

Ps6: 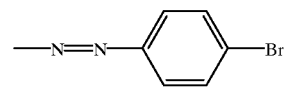

Ps7: —CH=CH—CO—O—C$_2$H$_5$

Ps8: 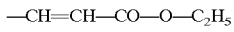

Ps9: 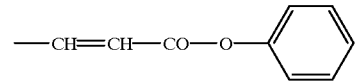

Ps10: 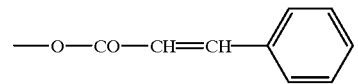

Ps11: 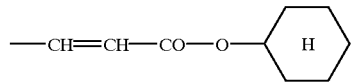

Ps12: 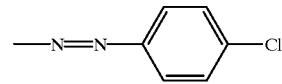

Ps13: 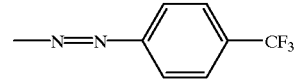

The divalent heterocyclic group preferably has a five-membered, six-membered or seven-membered ring, more preferably has a five-membered ring or six-membered ring, and most preferably has a six-membered ring. The heteroatom of the heterocyclic ring preferably is nitrogen, oxygen or sulfur.

The heterocyclic ring preferably is aromatic. The aromatic heterocyclic ring usually is an unsaturated heterocyclic ring. The aromatic heterocyclic ring preferably has a maximum number of double bonds.

Examples of the heterocyclic rings include furan ring, thiophene ring, pyrrole ring, pyrroline ring, pyrrolidone ring, oxazole ring, isoxazole ring, thiazole ring, isothiazole ring, imidazole ring, imidazoline ring, imidazolidine ring, pyrazole ring, pyrazoline ring, pyrazolidine ring, triazole ring, furazan ring, tetrazole ring, pyran ring, thiin ring, pyridine ring, piperidine ring, oxazine ring, morpholine ring, thiazine ring, pyridazine ring, pyrimidine ring, pyrazine ring, piperazine ring and triazine ring.

The heterocyclic ring can be condensed with another heterocyclic ring, an aliphatic ring or an aromatic hydrocarbon ring. Examples of the condensed rings include benzofuran ring, isobenzofuran ring, benzothiophene ring, indole ring, indoline ring, isoindole ring, benzoxazole ring, benzothiazole ring, indazole ring, benzimidazole ring, chromene ring, chroman ring, isochroman ring, quinoline ring, isoquinoline ring, cinnoline ring, phthalazine ring, quinazoline ring, quinoxaline ring, dibenzofuran ring, carbazole ring, xanthene ring, acridine ring, phenanthridine ring, phenanthroline ring, phenazine ring, phenoxazine ring, thianthrene ring, indolizine ring, quinolizine ring, quinuclidine ring, naphthyridine ring, purine ring and pterizine.

The divalent heterocyclic group can have a substituent group. Examples of the substituent groups are the same as those of the divalent substituted arylene group.

The divalent heterocyclic group can be connected at the hetero-atom to $L^2$ or the central cyclic group of $Cy^2$ in the case that $L^2$ is a single bond. The connecting hetero-atom can form a onium salt (e.g., oxonium salt, sulfonium salt, ammonium salt).

The cyclic structures of $Cy^1$ and $Cy^2$ (described below) can form a plane molecular structure as a whole. The alignment promoter can show a specific effect where the cyclic structures forms a plane molecular structure (i.e., discotic structure) as a whole.

Examples of $Cy^1$ are shown below. In the case that two or more groups of Hb-$L^1$- are attached to the divalent aromatic hydrocarbon group or the divalent heterocyclic group, one corresponds to the group defined in the formula (II) and the others are substituent groups of the divalent groups.

Cy101: 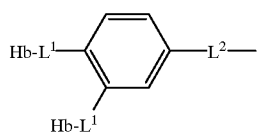

Cy102: 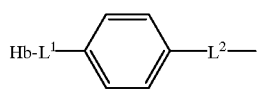

Cy103: 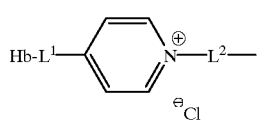

Cy104: 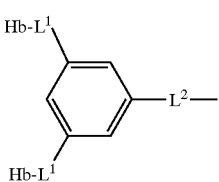

Cy105: 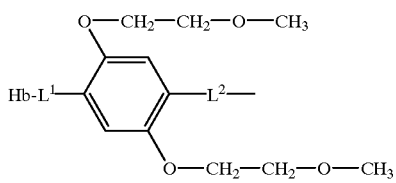

Cy106: 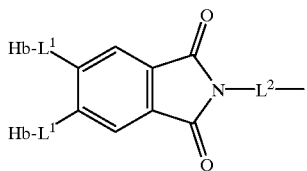

Cy107: 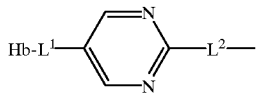

Cy108: 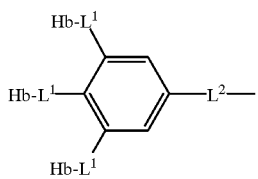

Cy109: 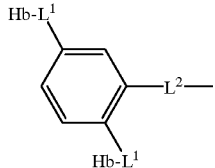

Cy110: 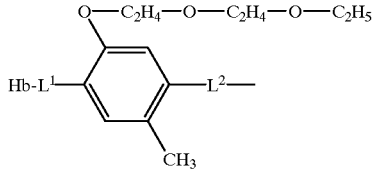

Cy111: 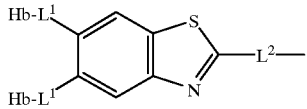

Cy112: 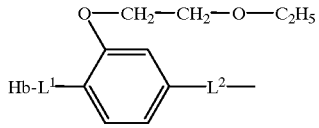

Cy113: 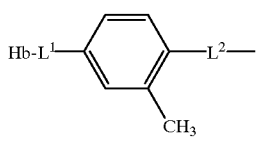

-continued
Cy114: 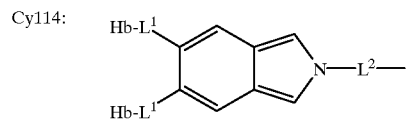
Cy115: 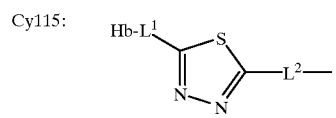
Cy116: 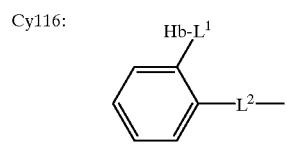
Cy117: 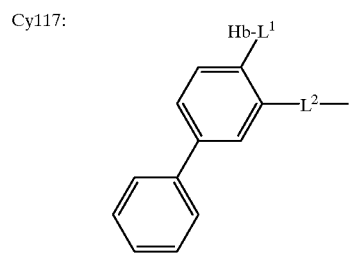
Cy118: 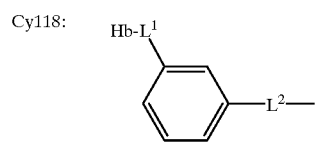
Cy119: 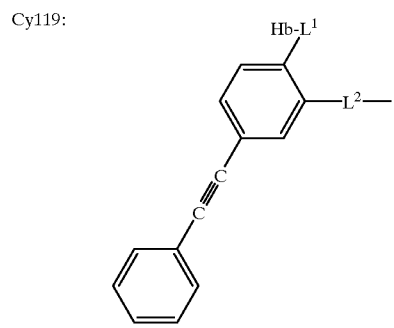
Cy120: 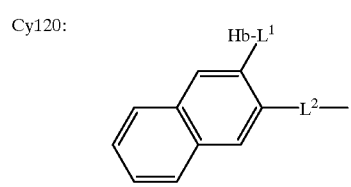
-continued
Cy121: 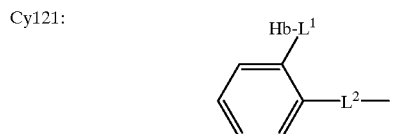
Cy122: 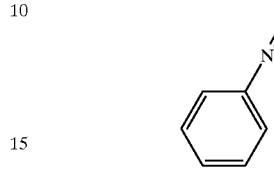
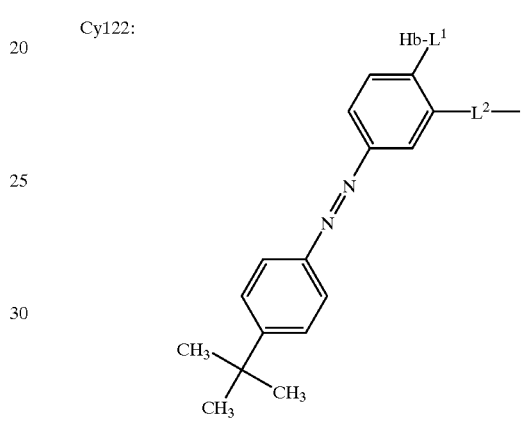
Cy123: 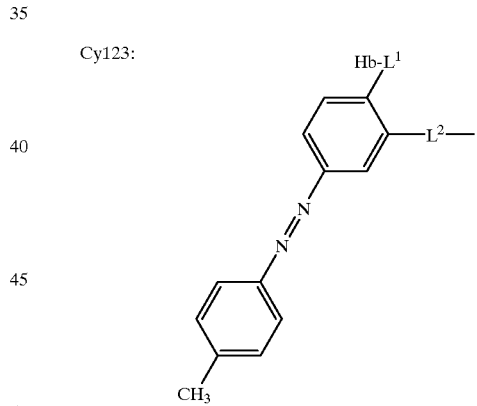
Cy124: 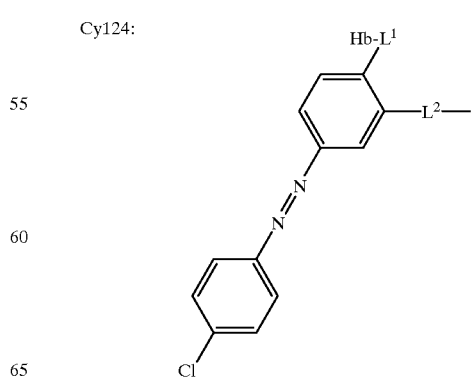

Cy125:

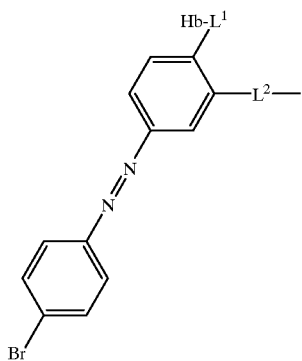

Cy126:

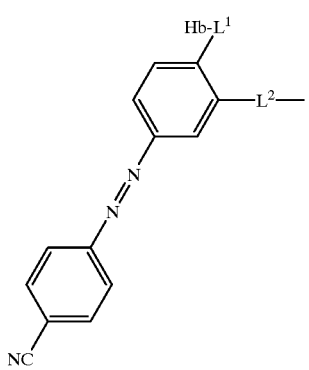

Cy127:

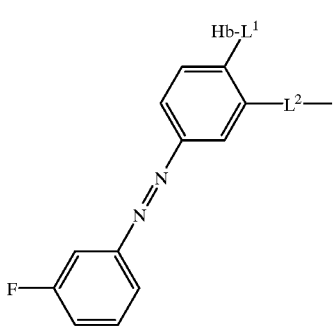

Cy128:

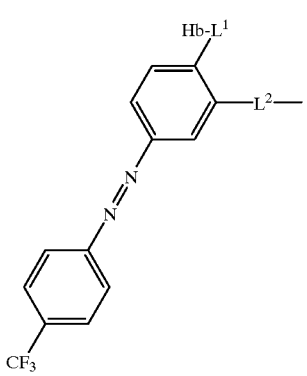

In the formula (II), $L^2$ is a single bond or a divalent linking group. The divalent linking group is preferably selected from the group consisting of an alkylene group, an alkenylene group, an alkynylene group, —O—, —S—, —CO—, —NR—, —SO₂— and a combination thereof. R is hydrogen or an alkyl group having 1 to 30 carbon atoms. $L^2$ preferably is a divalent linking group selected from the group consisting of —O—, —S—, —CO—, —NR—, —SO₂— and a combination thereof. R preferably is hydrogen or an alkyl group having 1 to 20 carbon atoms, more preferably is hydrogen or an alkyl group having 1 to 15 carbon atoms, and most preferably is hydrogen or an alkyl group having 1 to 12 carbon atoms.

The alkylene group preferably has 1 to 40 carbon atoms, more preferably has 1 to 30 carbon atoms, further preferably has 1 to 20 carbon atoms, furthermore preferably has 1 to 15 carbon atoms, and most preferably has 1 to 12 carbon atoms.

The alkenylene group or the alkynylene group preferably has 2 to 40 carbon atoms, more preferably has 2 to 30 carbon atoms, further preferably has 2 to 20 carbon atoms, furthermore preferably has 2 to 15 carbon atoms, and most preferably has 2 to 12 carbon atoms.

Examples of $L^2$ are shown below. In the examples, the left side is attached to $Cy^1$, and the right side is attached to $Cy^2$.

| L20: | Single bond |
|---|---|
| L21: | —S— |
| L22: | —NH— |
| L23: | —NH—SO₂—NH— |
| L24: | —NH—CO—NH— |
| L25: | —SO₂— |
| L26: | —O—NH— |
| L27: | —C≡C— |
| L28: | —CH=CH—S— |
| L29: | —CH₂—O— |
| L30: | —N(CH₃)— |
| L31: | —CO—O— |
| L32: | —CO—NH— |
| L33: | —NH—CO— |

In the formula (II), n is an integer of 2 to 12, preferably is an integer of 3 to 9, more preferably is an integer of 3 to 6, and most preferably is 3 or 4.

In the formula (II), $Cy^2$ is an n-valent cyclic group. $Cy^2$ preferably is an n-valent aromatic hydrocarbon group or an n-valent heterocyclic group, and more preferably is an n-valent aromatic hydrocarbon group.

Examples of the aromatic hydrocarbon rings of the n-valent aromatic hydrocarbon groups include benzene ring, indene ring, naphthalene ring, fluorene ring, phenanthrene ring, anthrathene ring and pyrene ring. Benzene ring and naphthalene ring are preferred, and benzene ring is more preferred.

The aromatic hydrocarbon group can have a substituent group. Examples of the substituent groups include an aliphatic group, an aromatic hydrocarbon group, a heterocyclic group, an alkoxy group (e.g., methoxy, ethoxy, methoxyethoxy), an aryloxy group (e.g., phenoxy), an arylazo group (e.g., phenyl azo), an alkylthio group (e.g., methylthio, ethylthio, propylthio), an alkylamino group (e.g., methylamino, propylamino), an acyl group (e.g., acetyl, propanoyl, octanoyl, benzoyl), an acyloxy group (e.g., acetoxy, pivaloyloxy, benzoyloxy), hydroxyl, mercapto, amino, carboxyl, sulfo, carbamoyl, sulfamoyl and ureido.

The n-valent heterocyclic group preferably has a five-membered, six-membered or seven-membered ring, more preferably has a five-membered ring or six-membered ring, and most preferably has a six-membered ring. The hetero-atom of the heterocyclic ring preferably is nitrogen, oxygen or sulfur.

The heterocyclic ring preferably is aromatic. The aromatic heterocyclic ring usually is an unsaturated heterocyclic ring. The aromatic heterocyclic ring preferably has a maximum number of double bonds.

Examples of the heterocyclic rings include furan ring, thiophene ring, pyrrole ring, pyrroline ring, pyrrolidone ring, oxazole ring, isoxazole ring, thiazole ring, isothiazole ring, imidazole ring, imidazoline ring, imidazolidine ring, pyrazole ring, pyrazoline ring, pyrazolidine ring, triazole ring, furazan ring, tetrazole ring, pyran ring, thiin ring, pyridine ring, piperidine ring, oxazine ring, morpholine ring, thiazine ring, pyridazine ring, pyrimidine ring, pyrazine ring, piperazine ring and triazine ring.

The heterocyclic ring can be condensed with another heterocyclic ring, an aliphatic ring or an aromatic hydrocarbon ring. However, the heterocyclic ring preferably is monocyclic.

The n-valent heterocyclic group can have a substituent group. Examples of the substituent groups are the same as those of the n-valent aromatic hydrocarbon group.

Examples of $Cy^2$ are shown below.

---

Cy201 (n = 4):

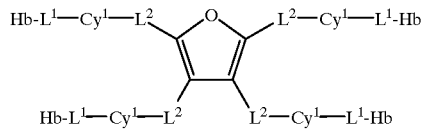

Cy202 (n = 4):

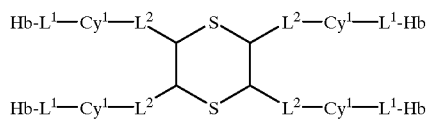

Cy203 (n = 4):

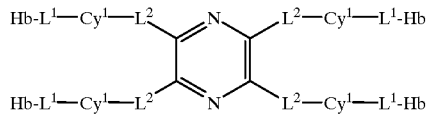

Cy204 (n = 3):

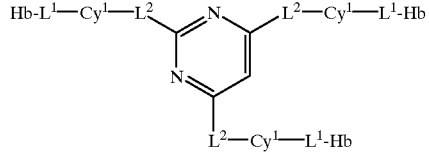

Cy205 (n = 3):

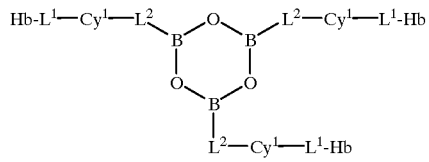

---

-continued

Cy206 (n = 3):

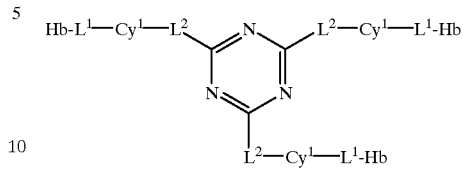

Cy207 (n = 3):

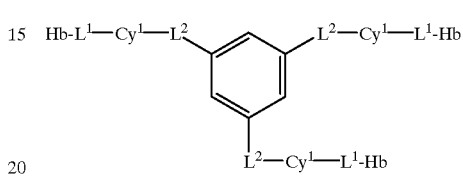

Cy208 (n = 2):

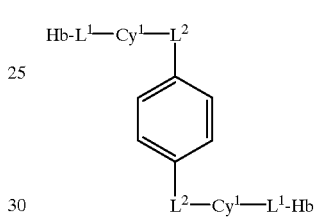

Cy209 (n = 2):

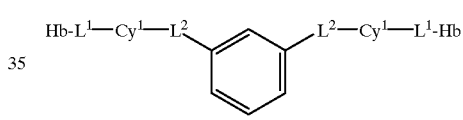

Cy210 (n = 2):

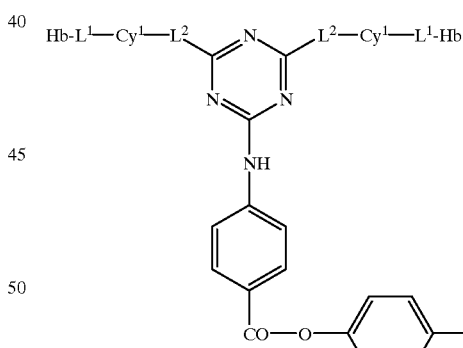

Cy211 (n = 2):

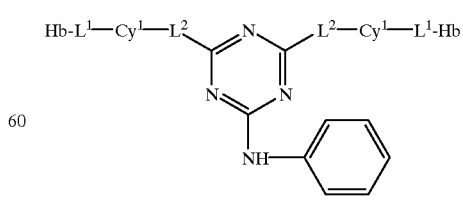

---

The alignment promoter is most preferably represented by the formula (III):

$$(Hb-L^1-Cy^1-L^2-)_n Ar \qquad (III)$$

In the formula (III), Hb is an aliphatic group having 6 to 40 carbon atoms or an aliphatic substituted oligosiloxanoxy group having 1 to 40 carbon atoms. The aliphatic group and the aliphatic substituted oligosiloxanoxy group are defined about the formula (I).

In the formula (III), $L^1$ is a single bond or a divalent linking group selected from the group consisting of an alkylene group, a fluorine-substituted alkylene group, —O—, —S—, —CO—, —NR—, —SO$_2$— and a combination thereof. R is hydrogen or an alkyl group having 1 to 30 carbon atoms. Examples of the divalent linking groups are the same as those described about $L^1$ and R in the formula (I).

In the formula (III), $Cy^1$ is a divalent aromatic group or a divalent heterocyclic group. $Cy^1$ in the formula (III) is the same as $Cy^1$ in the formula (II).

In the formula (III), $L^2$ is a single bond or a divalent linking group selected from the group consisting of an alkylene group, an alkenylene group, an alkynylene group, —O—, —S—, —CO—, —NR—, —SO$_2$— and a combination thereof. R is hydrogen or an alkyl group having 1 to 30 carbon atoms. Examples of the divalent linking groups are the same as those described about $L^2$ and R in the formula (II).

In the formula (III), n is an integer of 2, 3, 4 or 5, preferably is 3, 4 or 5, and more preferably is 3 or 4.

In the formula (III), and Ar is an n-valent aromatic hydrocarbon group. The aromatic hydrocarbon group is described about $Cy^2$ in the formula (II).

The alignment promoter is a compound consisting of the hydrophobic group (Hb), the linking group ($L^1$) and the bulky group (Bl) showing an excluded volume effect. There is no specific limitation on the combination thereof.

Examples of the alignment promoters are shown below.

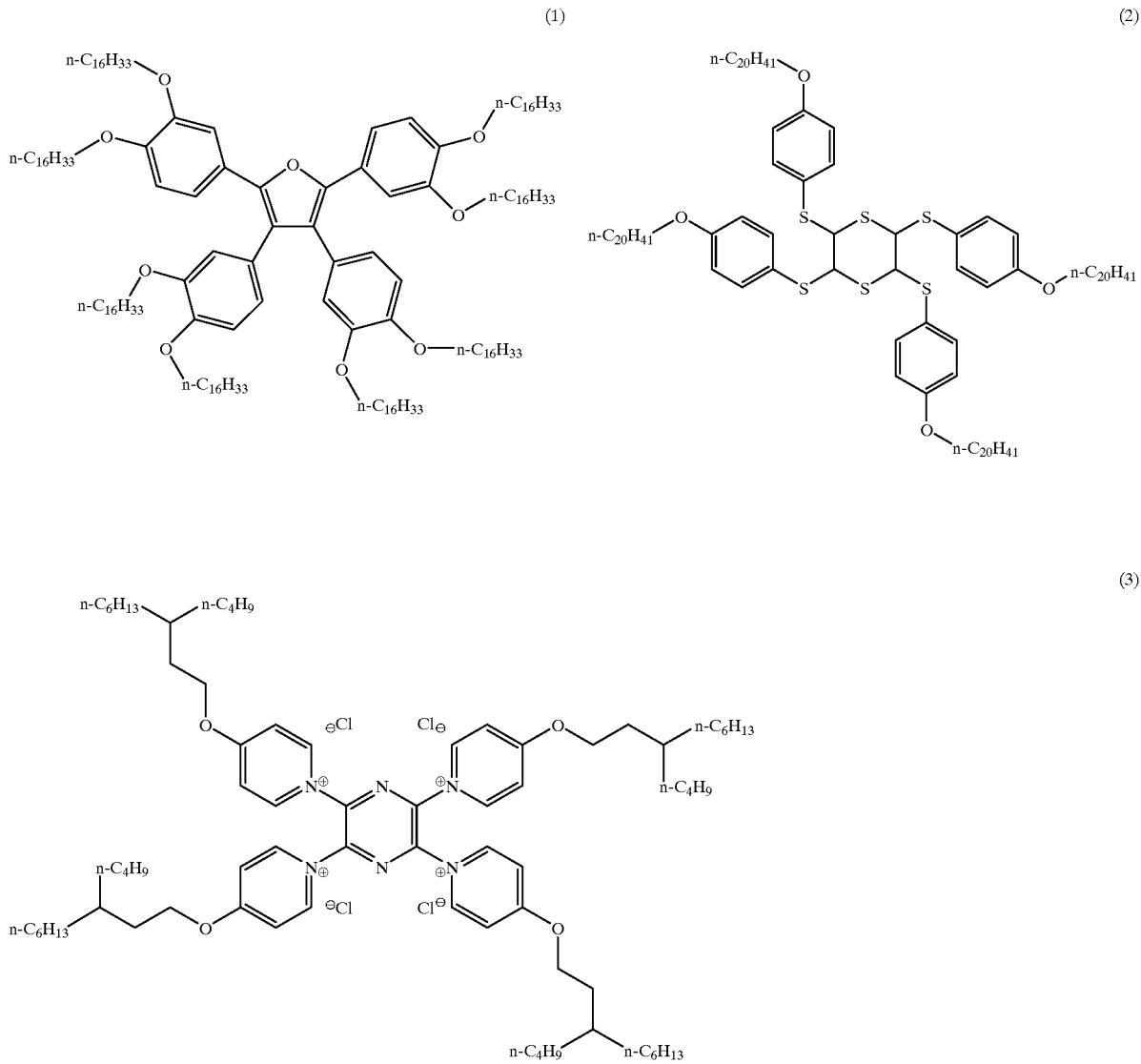

-continued
(4)
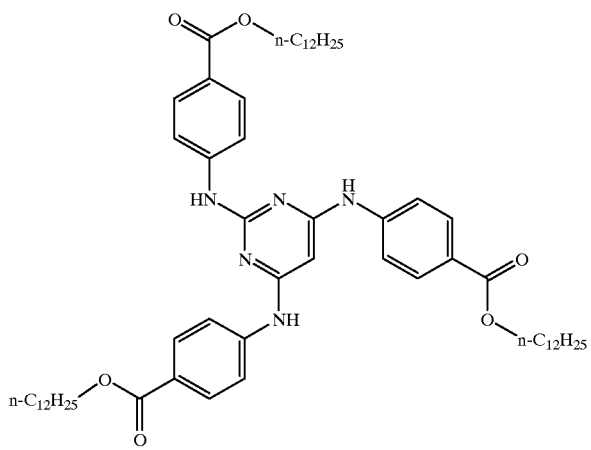
(5)
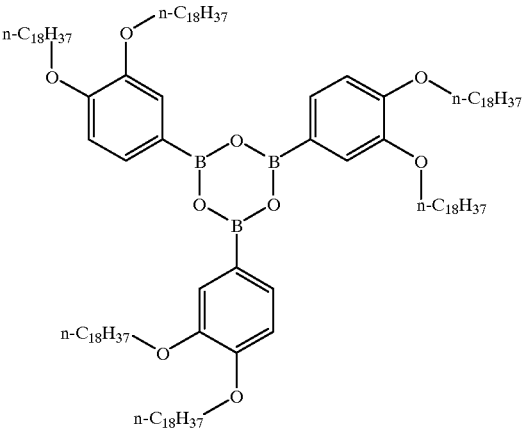
(6)
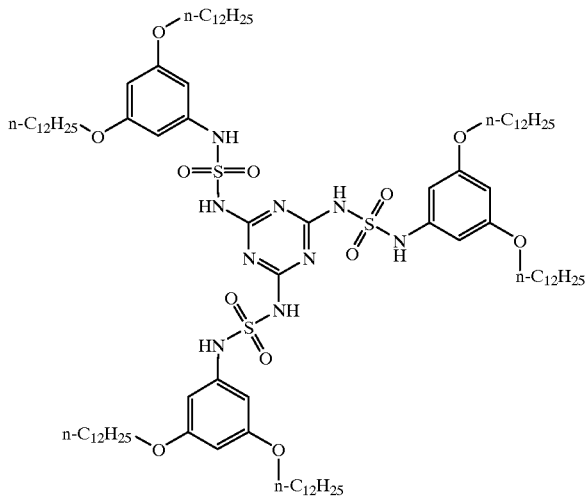
(7)
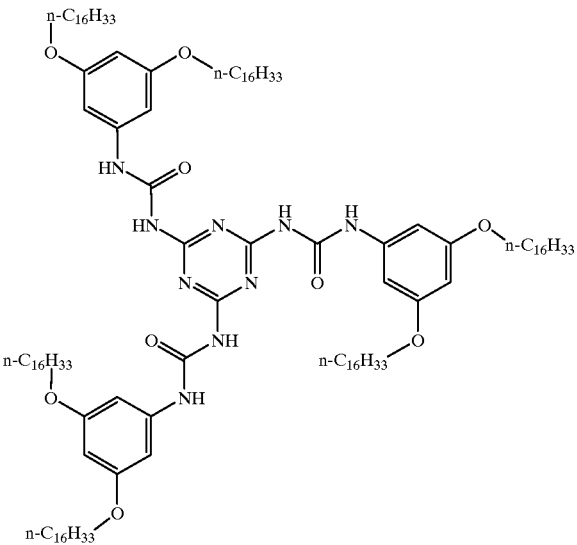
(8)
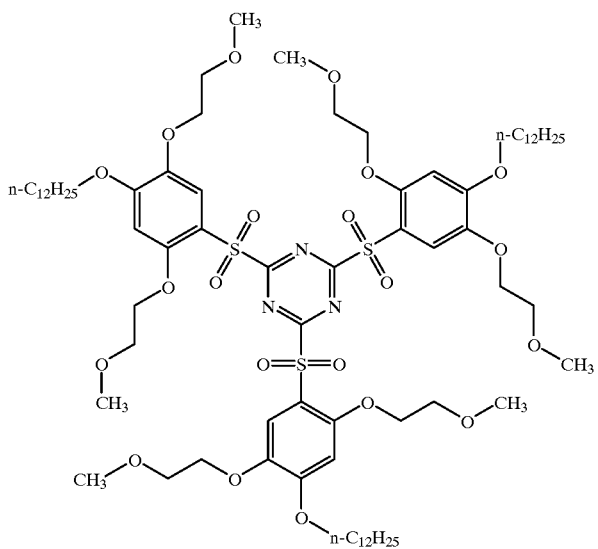
(9)
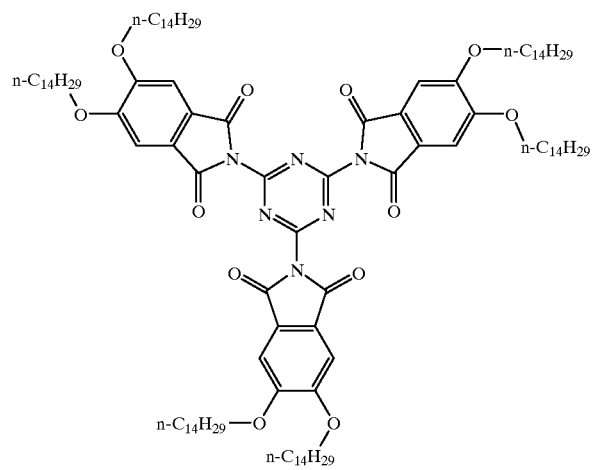

(10)
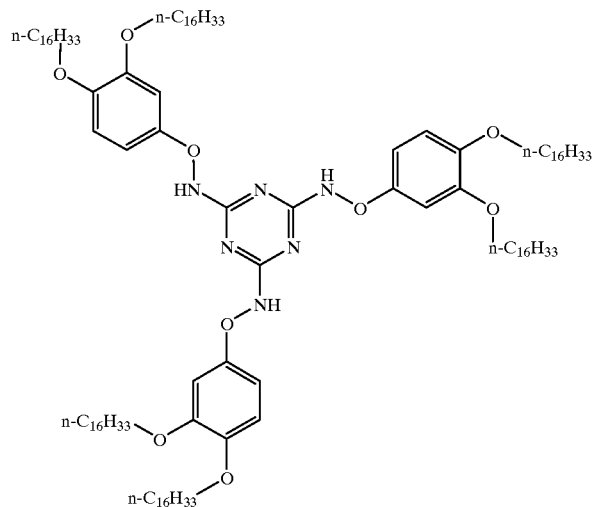
(11)
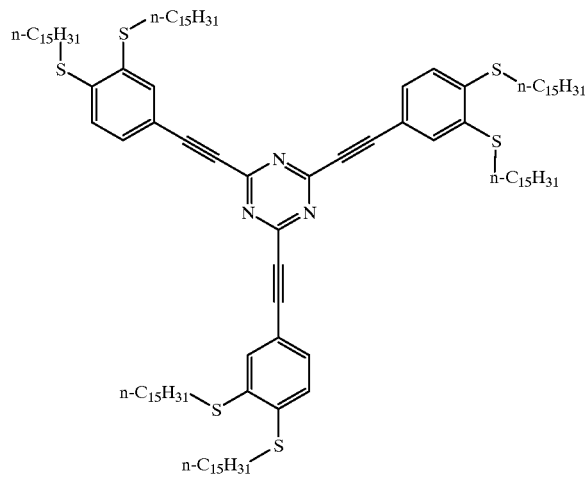
(12)
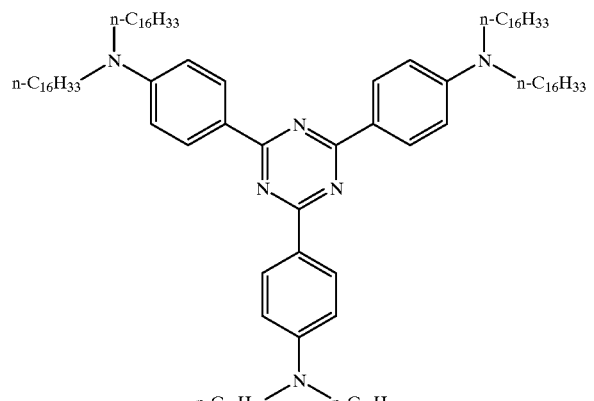
(13)
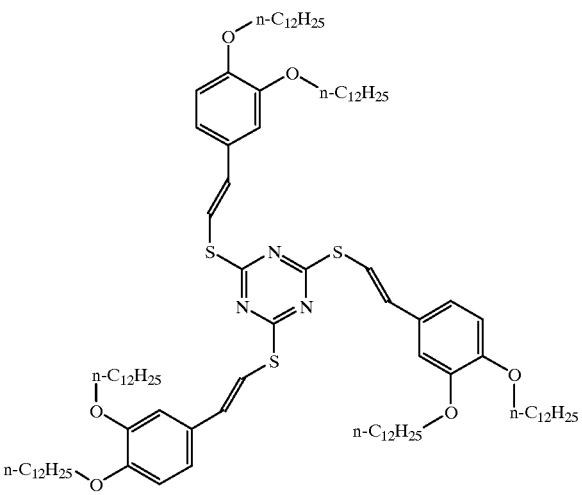
(14)
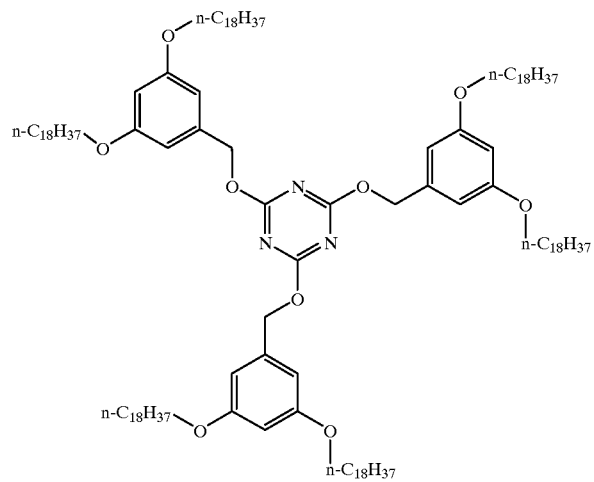
(15)
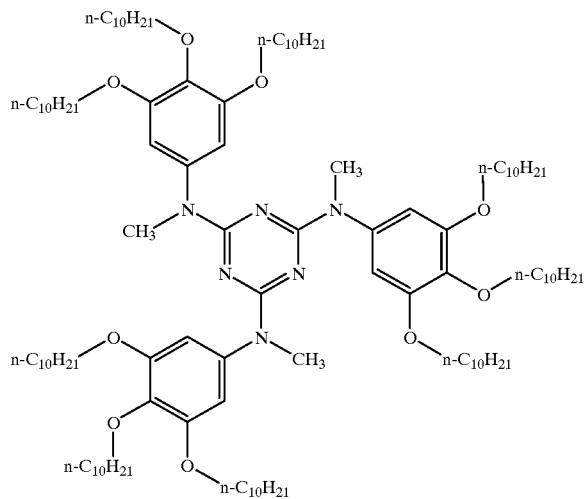

(16)
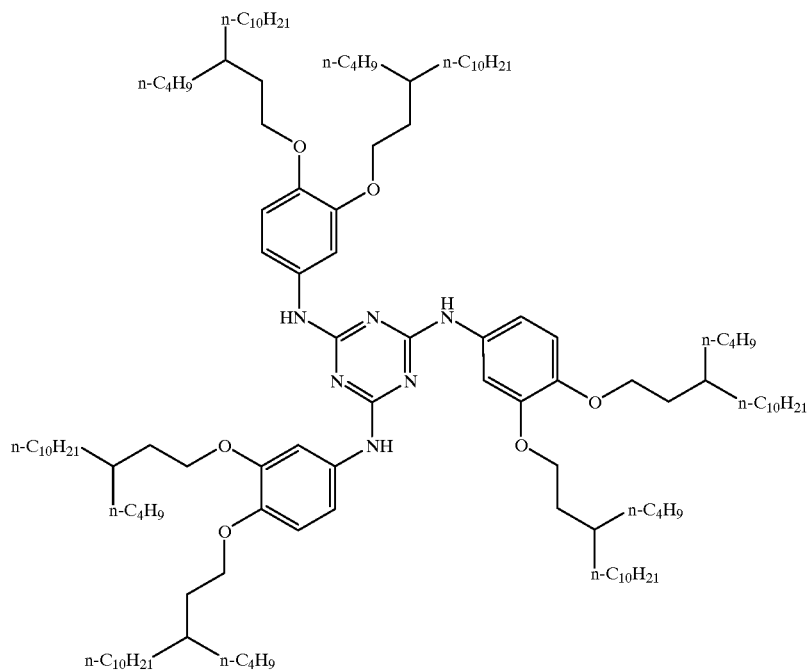
(17)
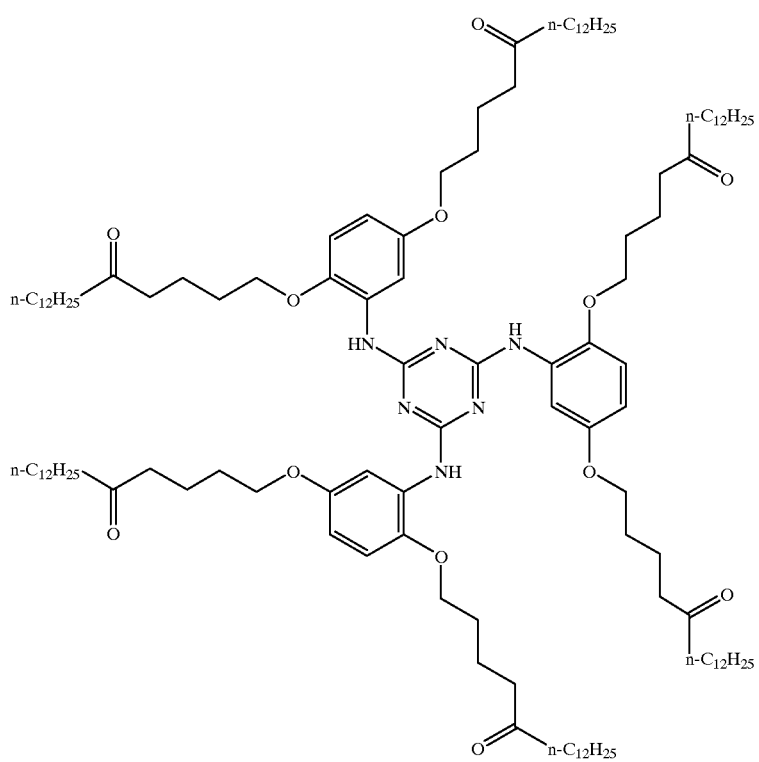

(18)
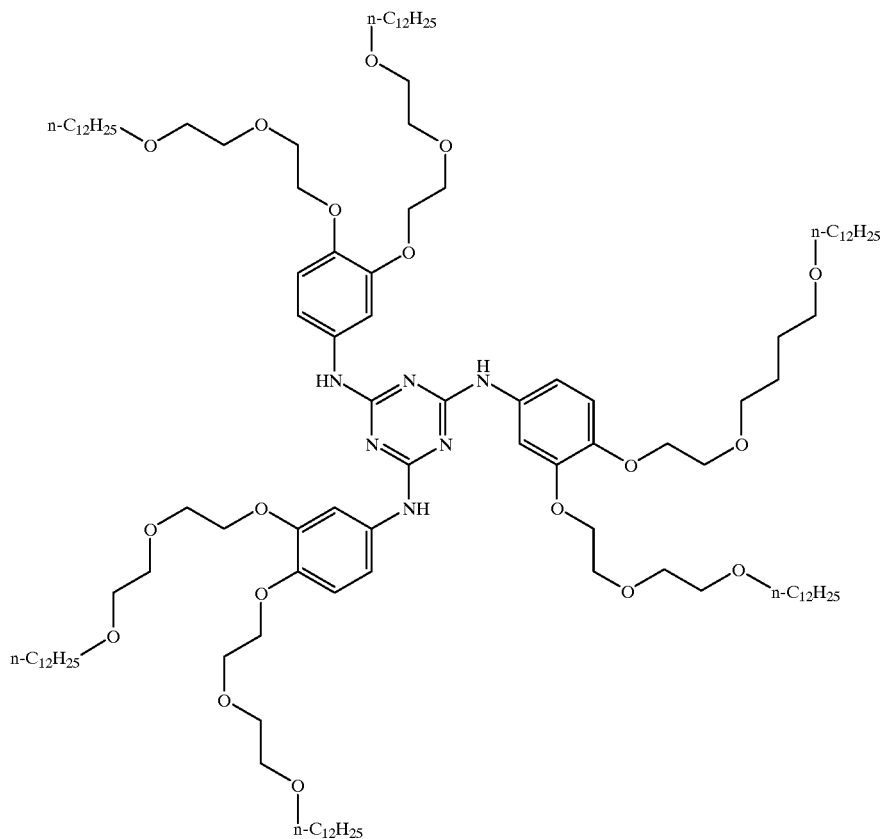
(19)
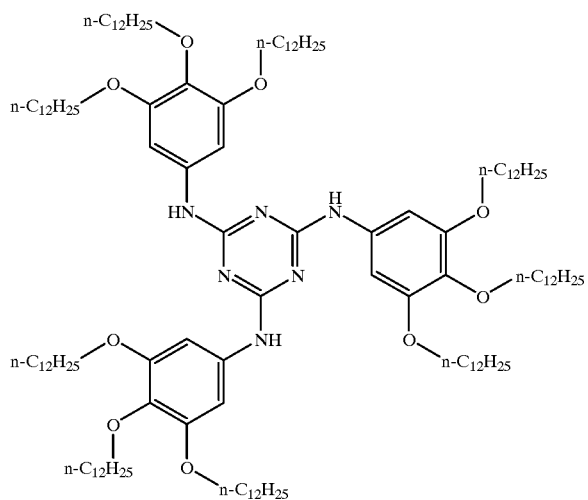
(20)
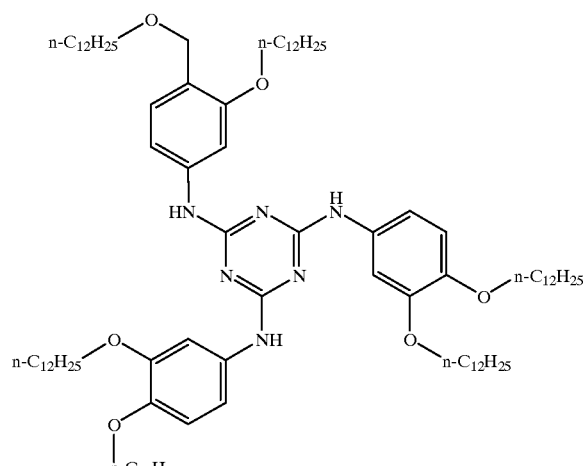

-continued
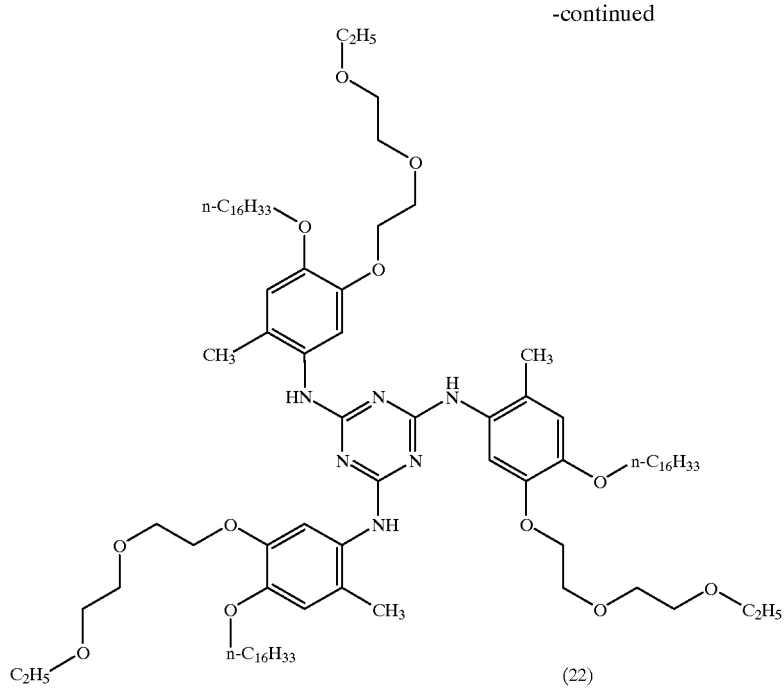
(21)
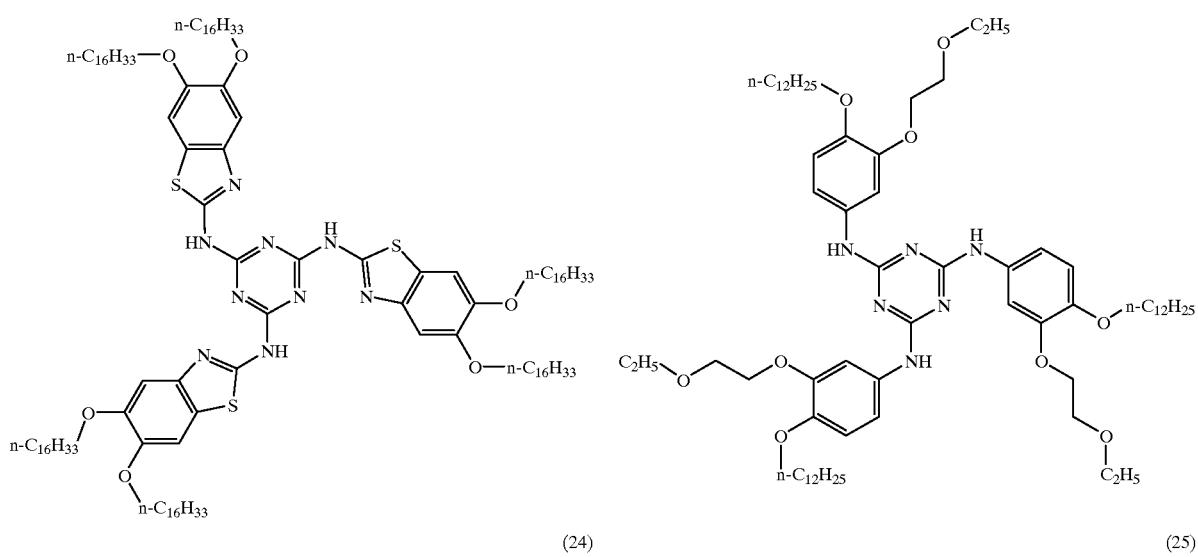
(22)
(23)
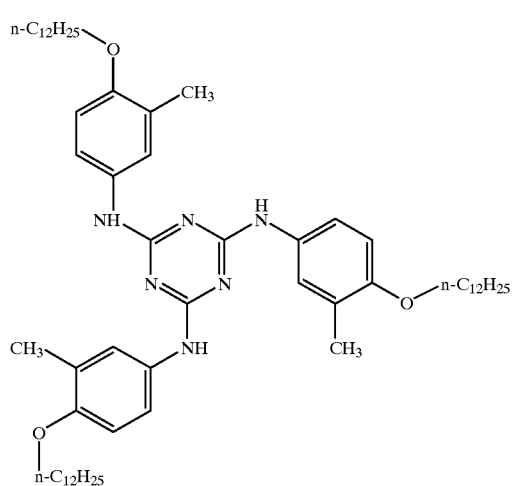
(24)
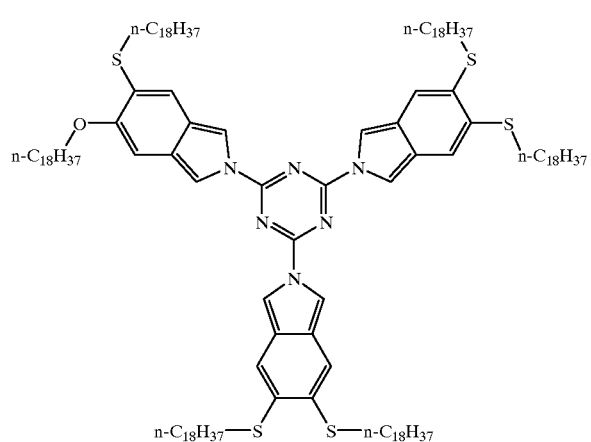
(25)

-continued
(26)
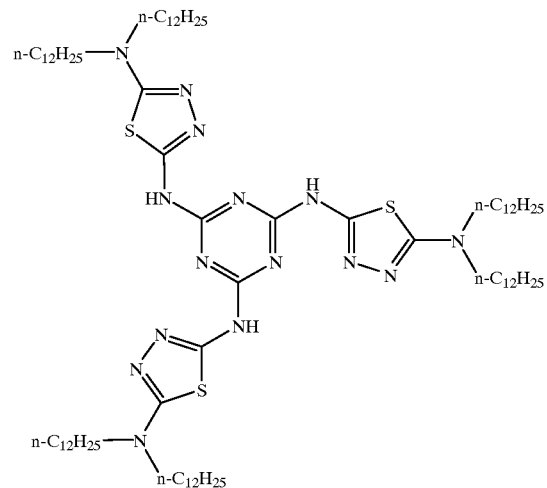
(27)
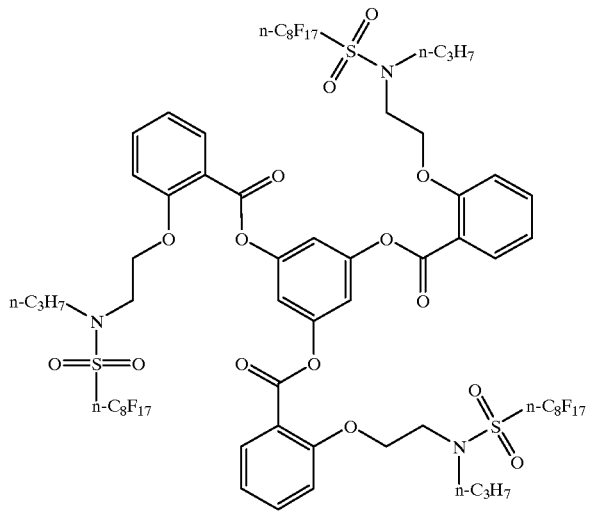
(28)
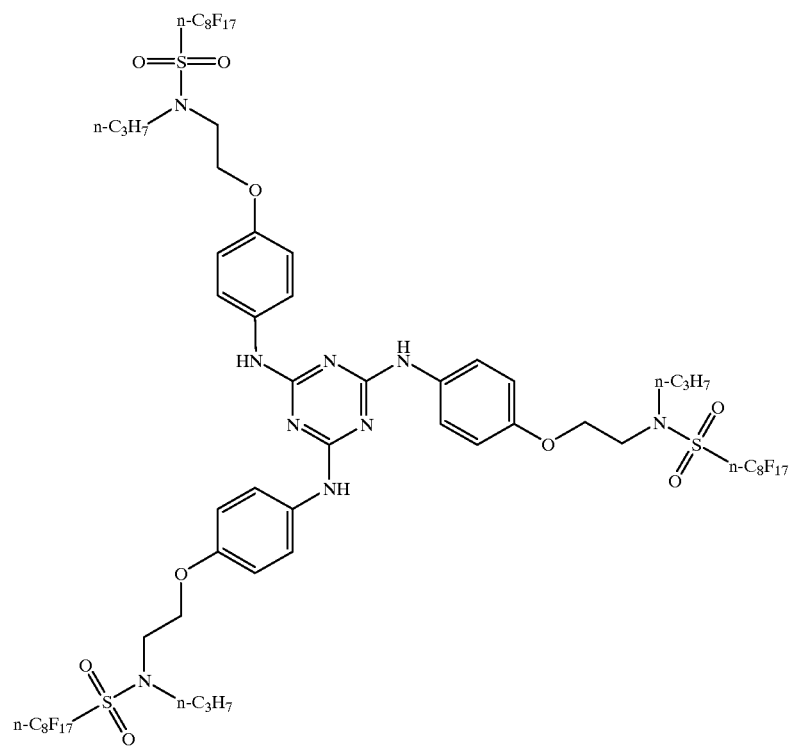

-continued
(29)
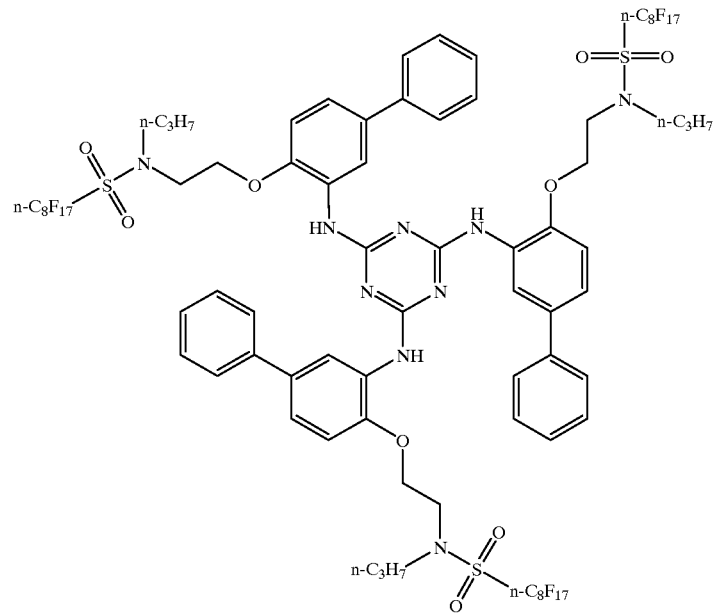
(30)
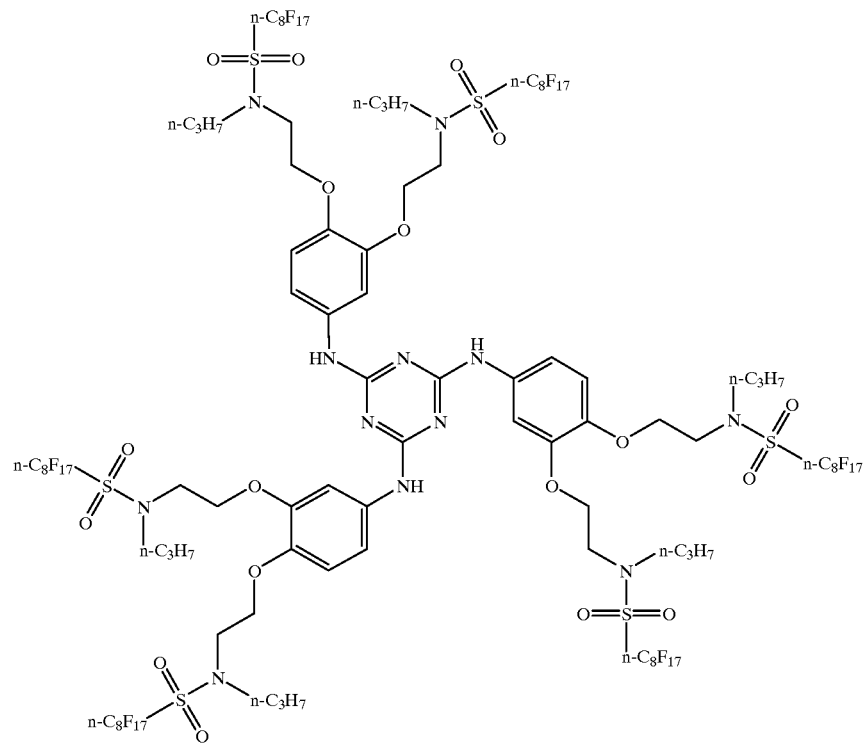

(31)
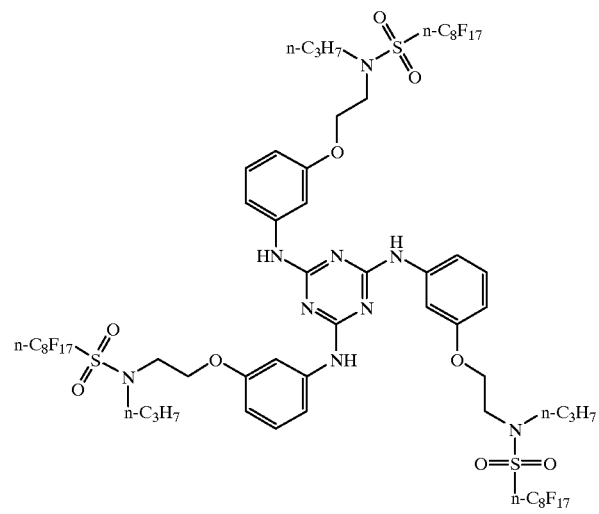
(32)
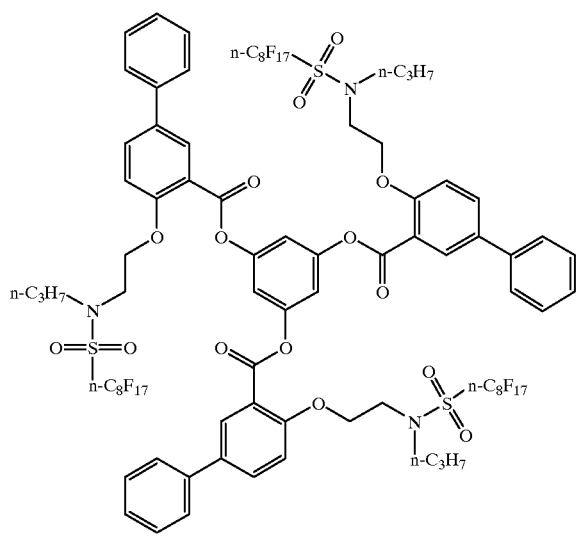
(33)
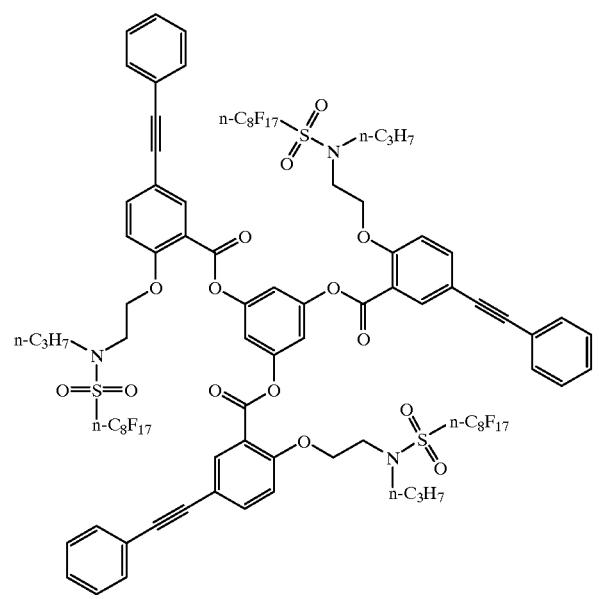
(34)
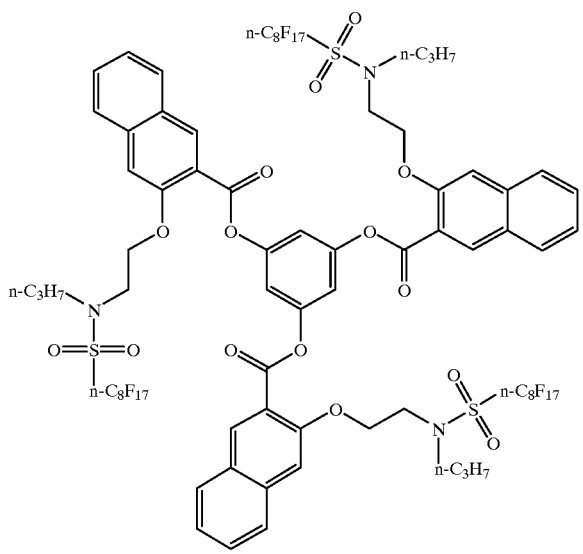

(35)
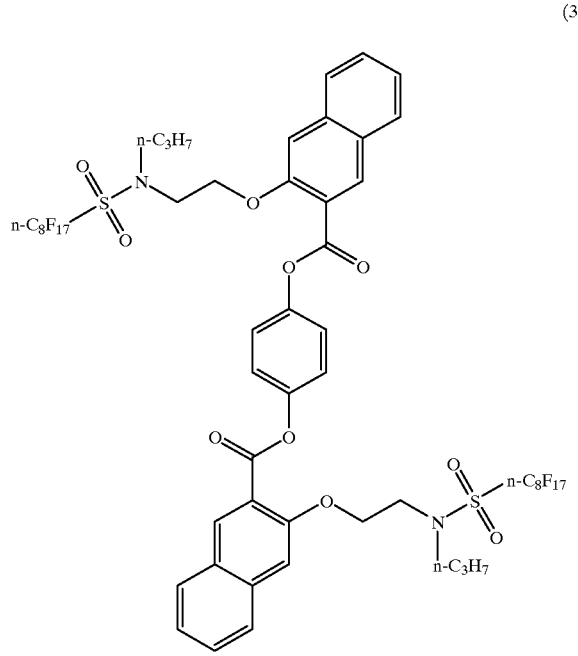
(36)
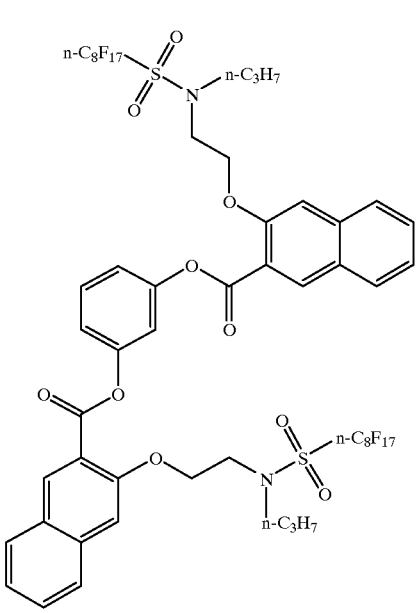
(37)
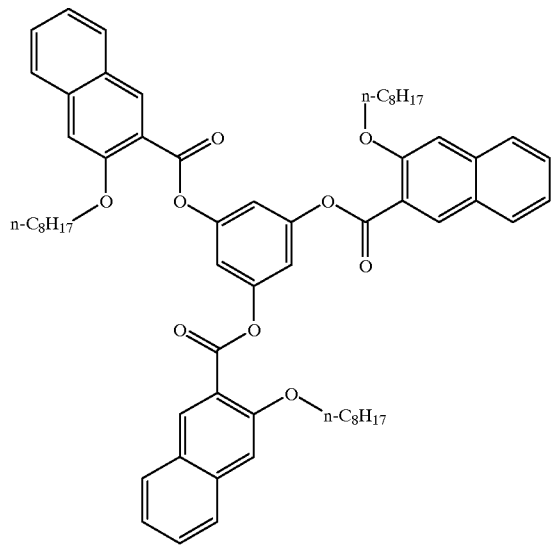
(38)
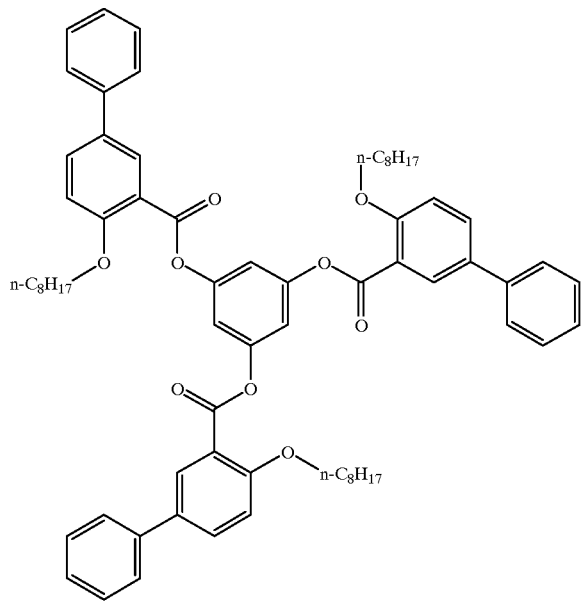

(39)
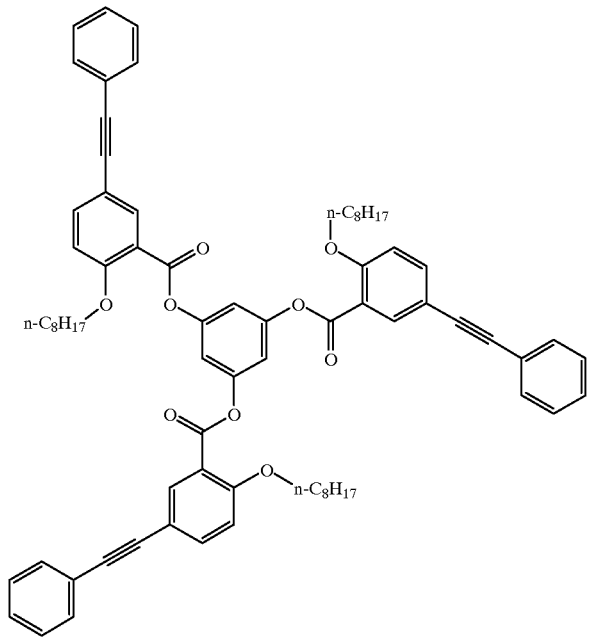
(40)
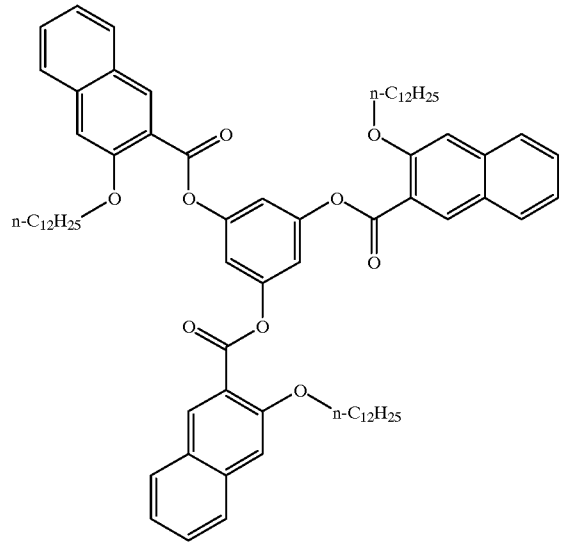
(41)
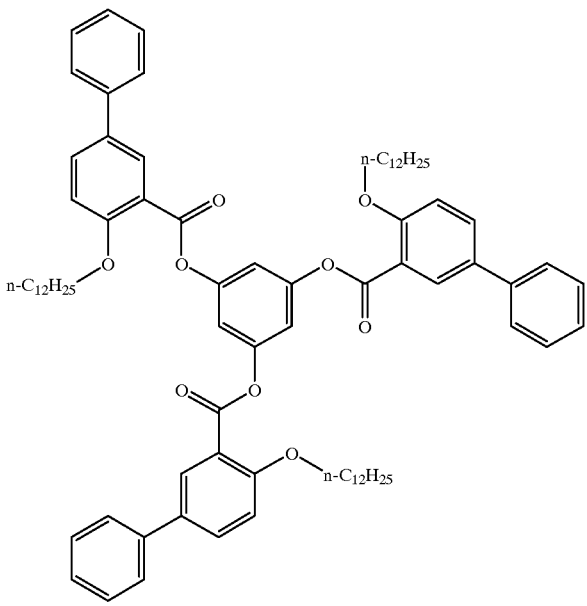
(42)
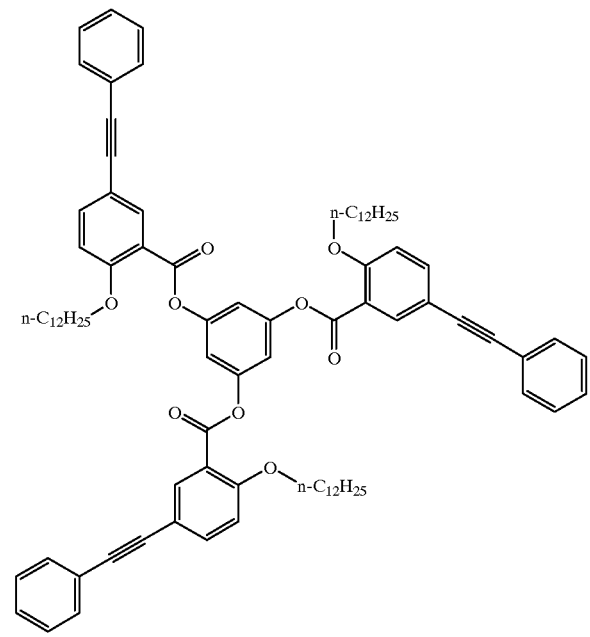

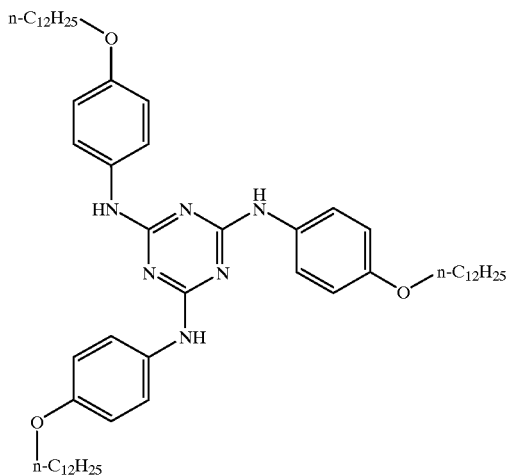
(43)
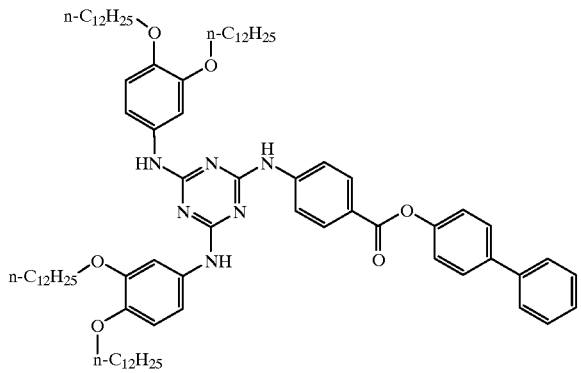
(44)
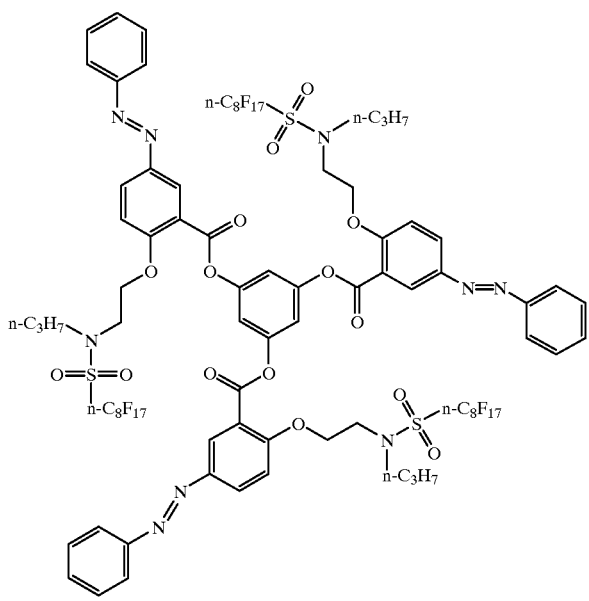
(45)
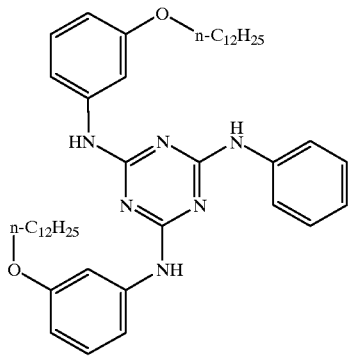
(46)
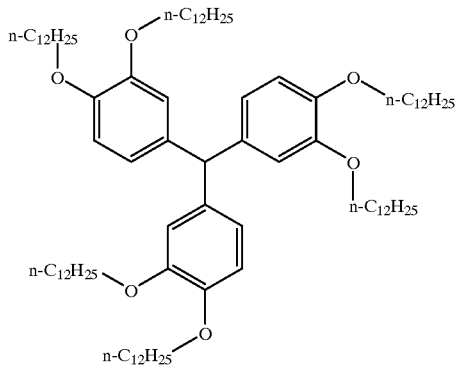
(47)

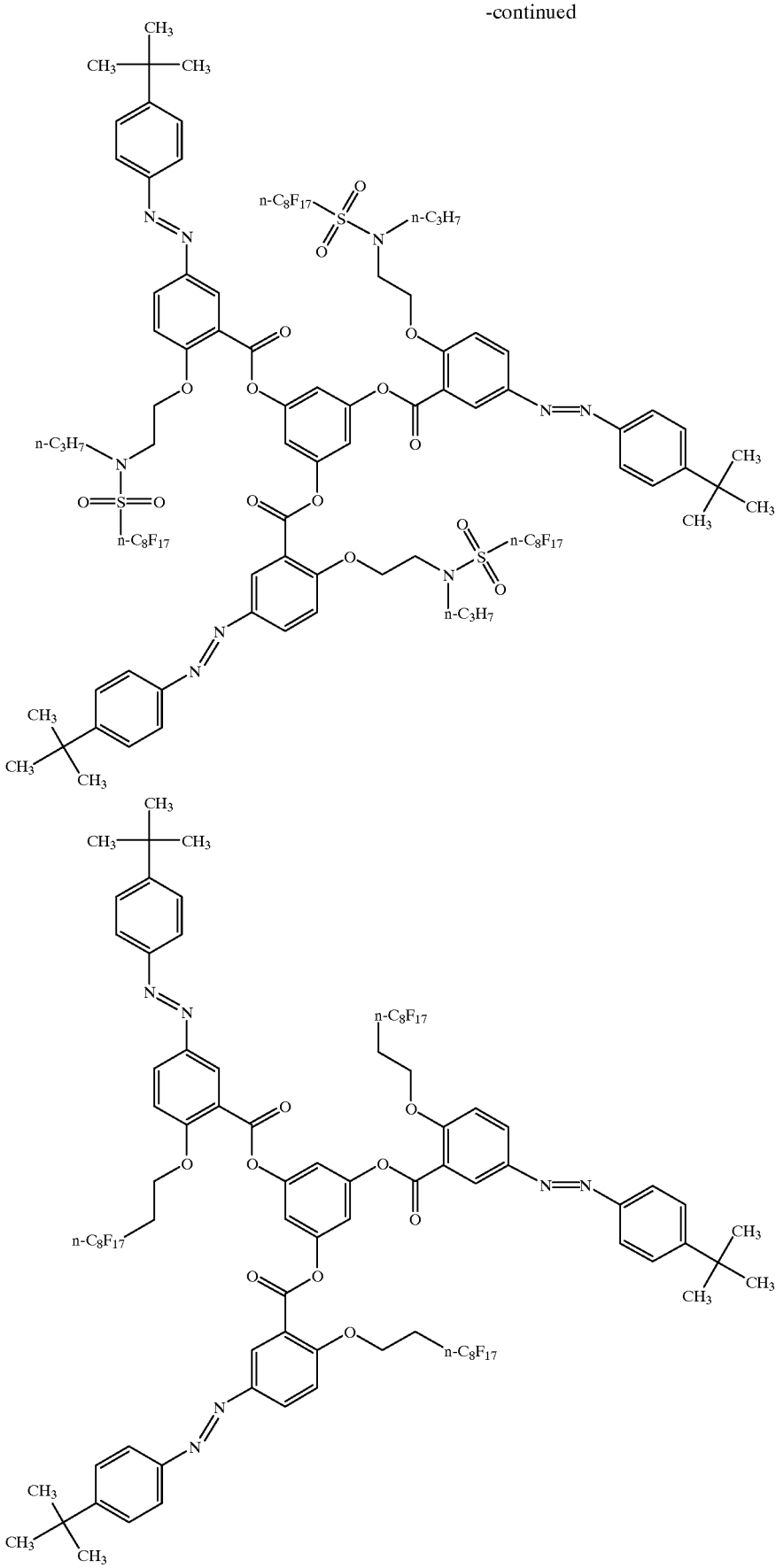

-continued
(50)
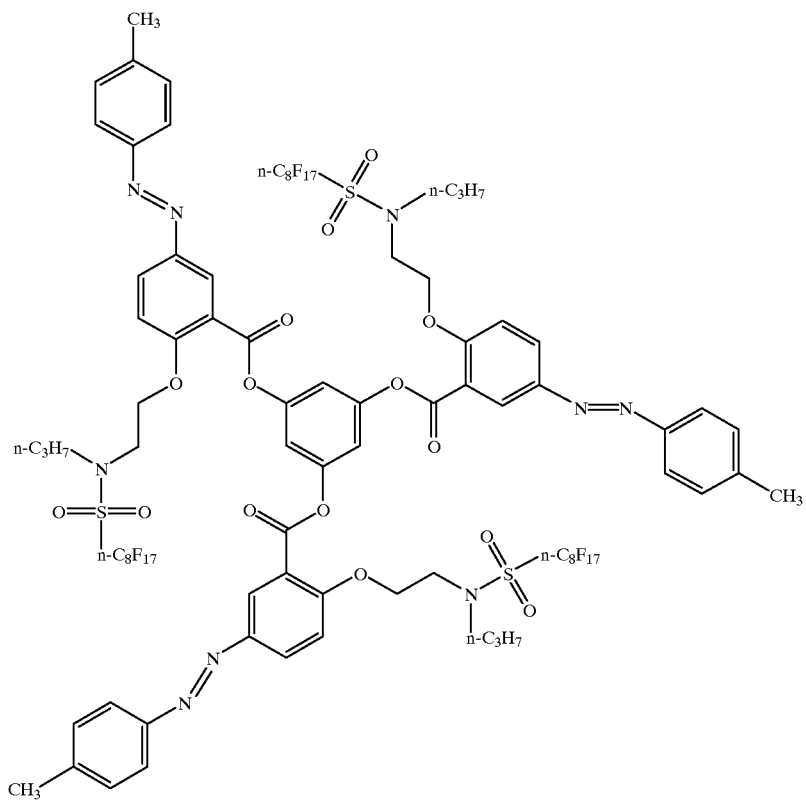
(51)
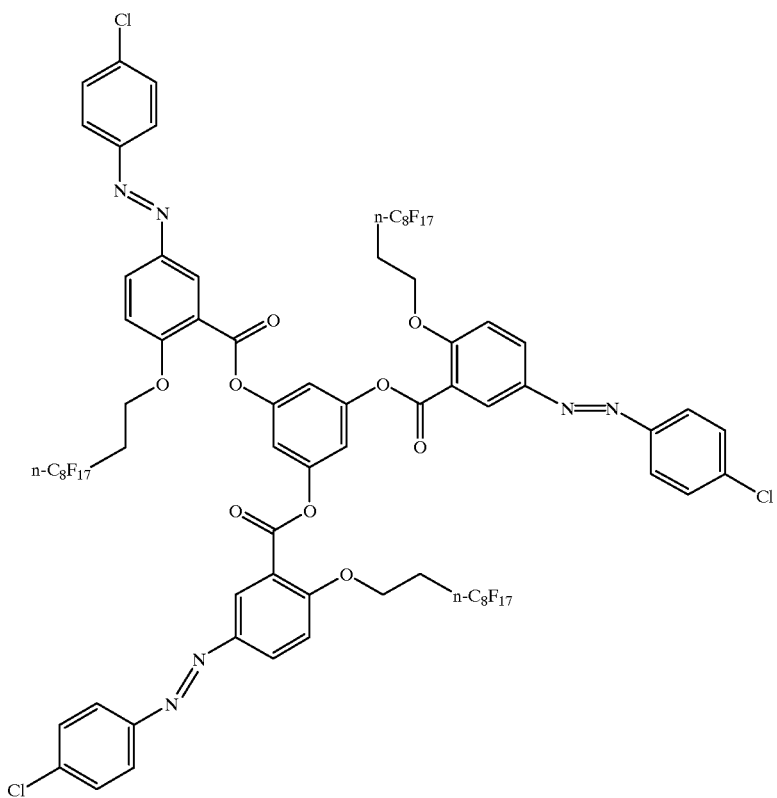

-continued
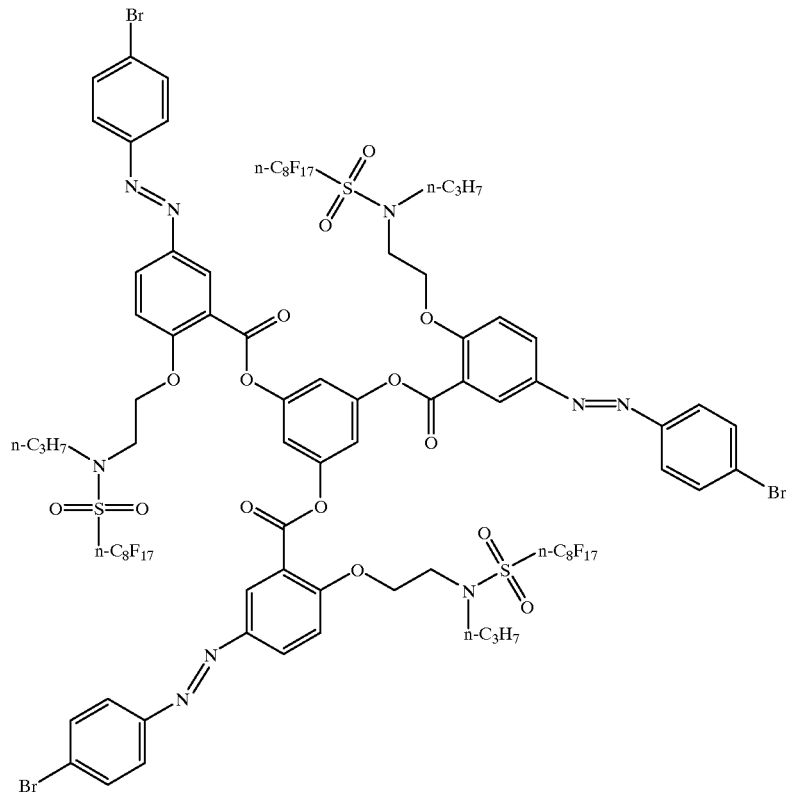
(52)
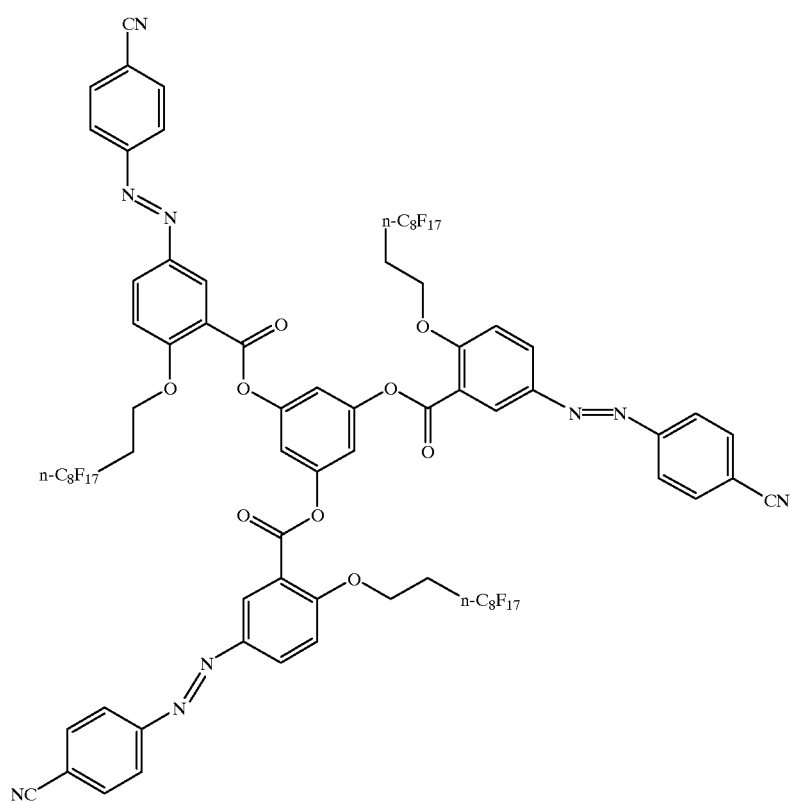
(53)

-continued
(54)
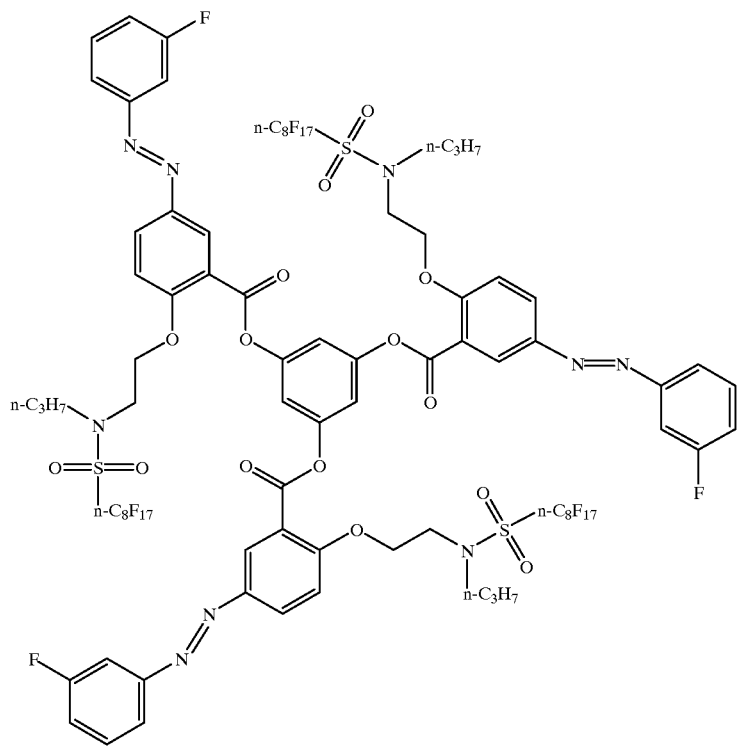
(55)
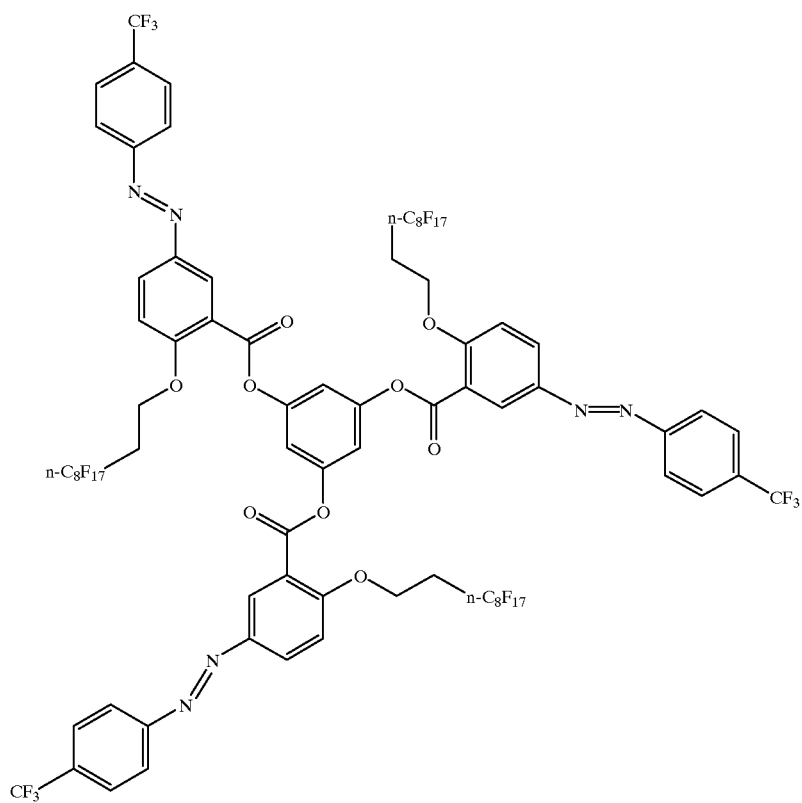

-continued
(56)
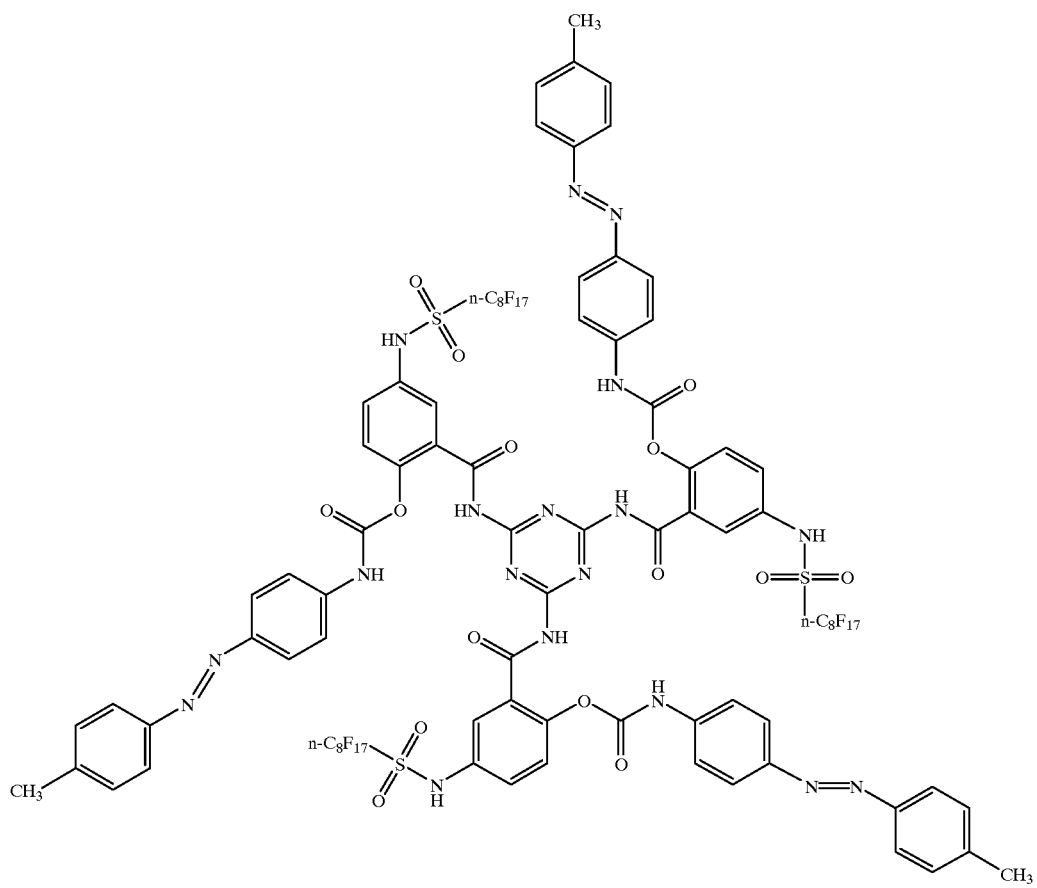
(57)
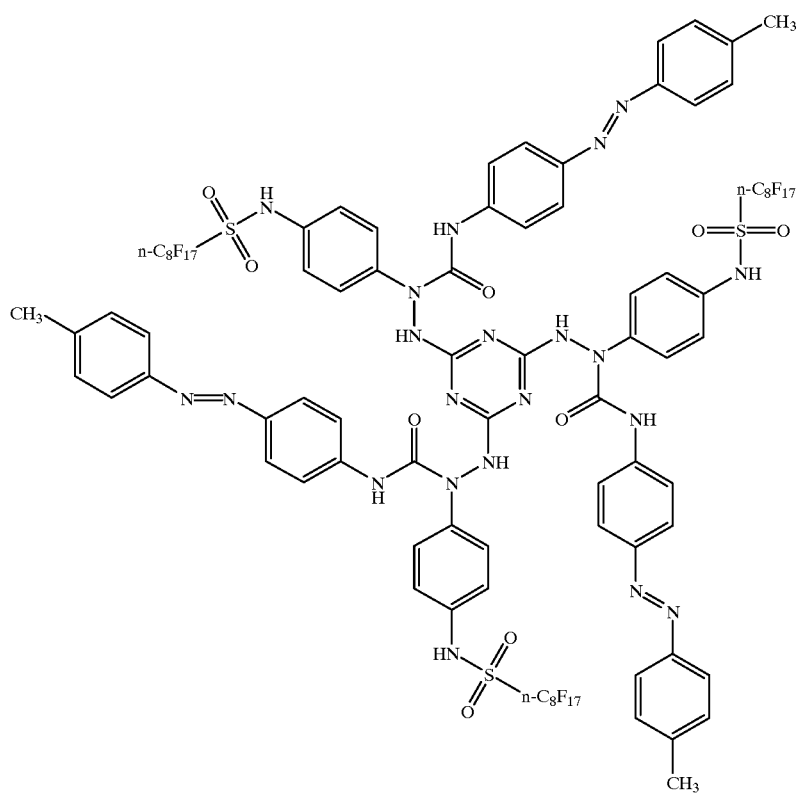

(58)
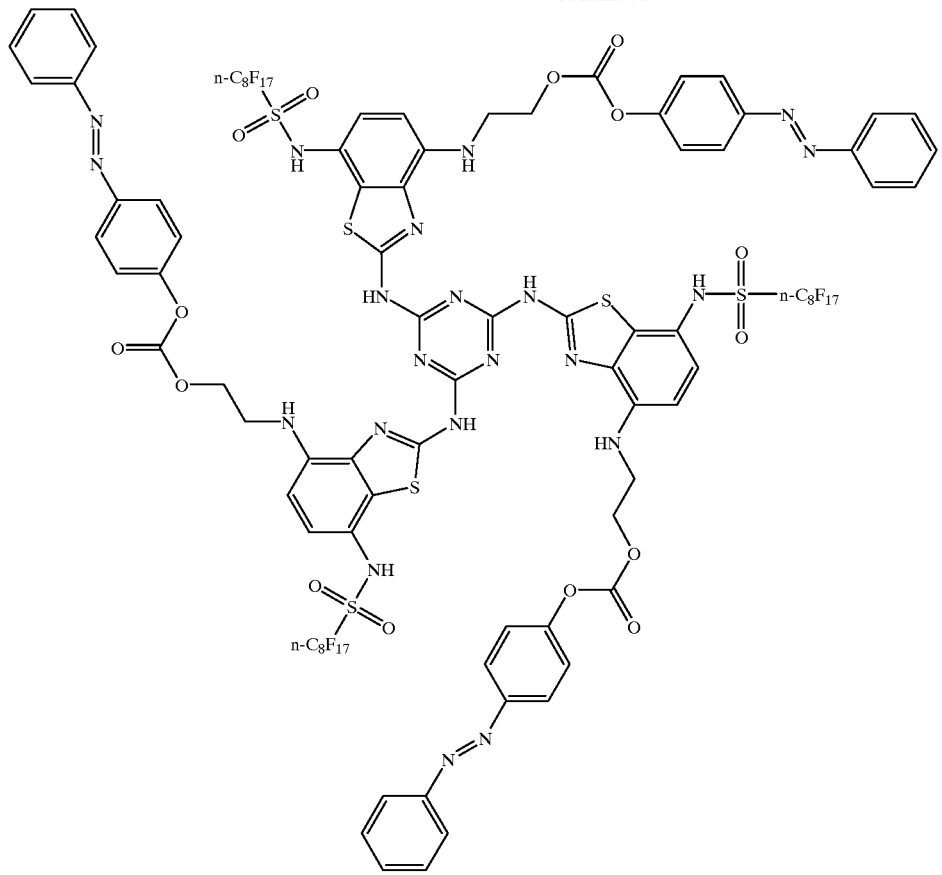
(59)
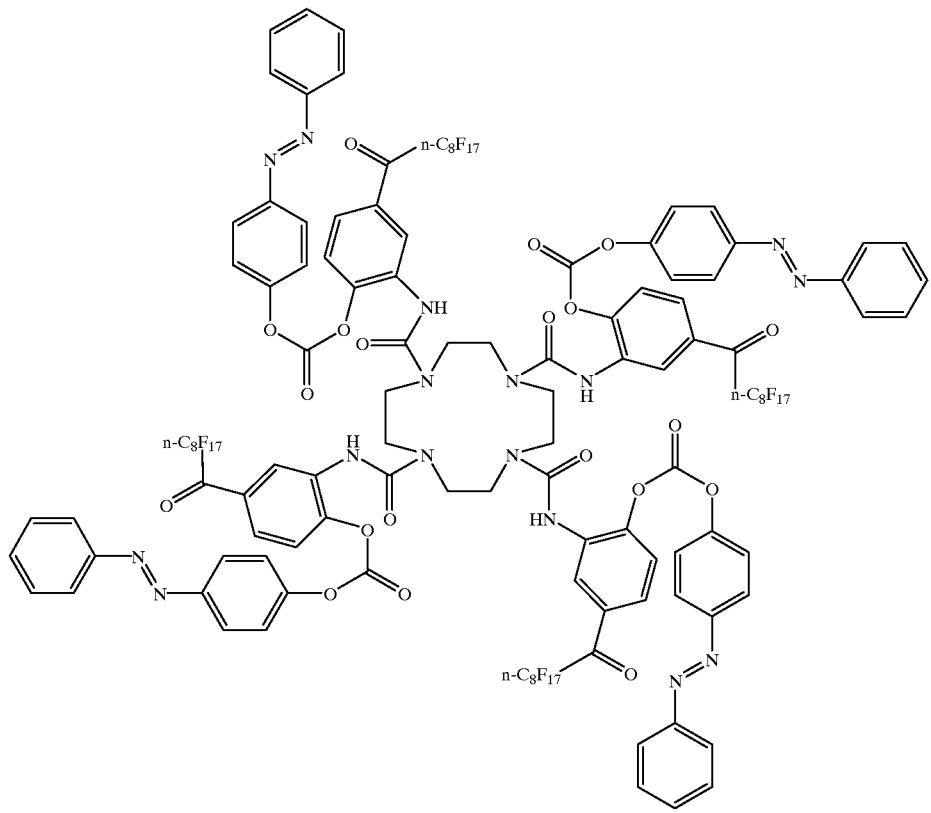

(60)
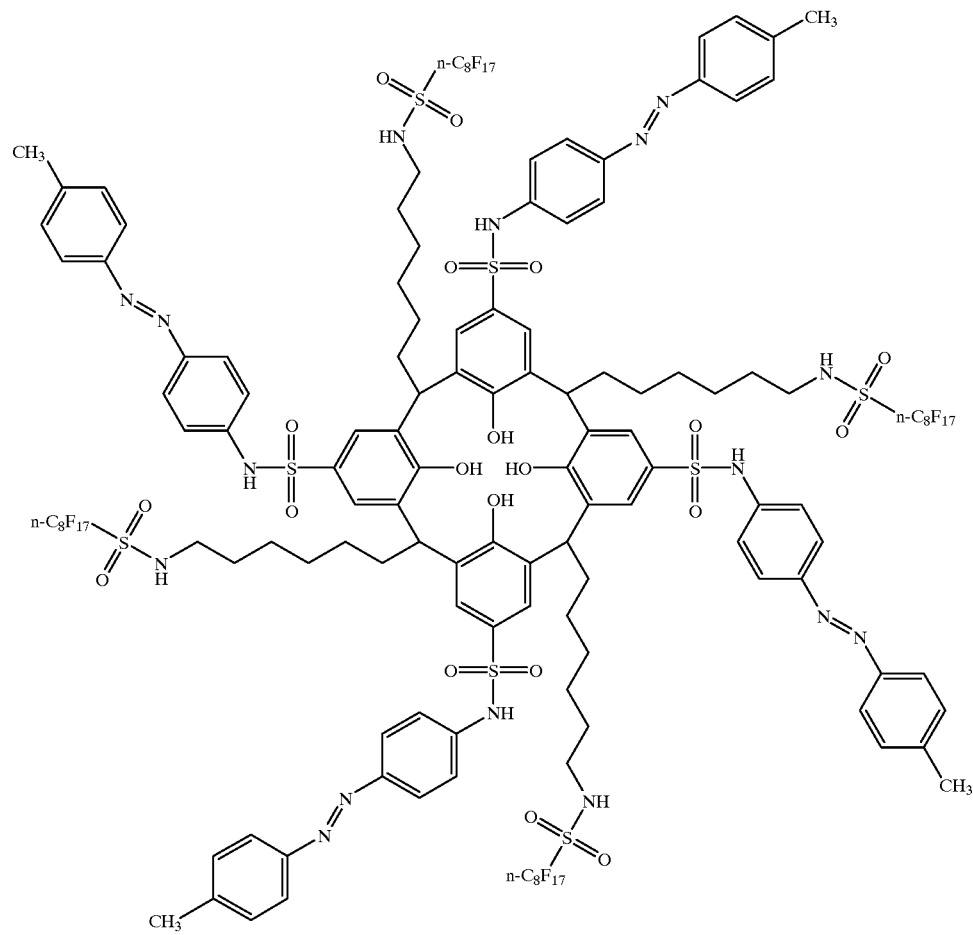
(61)
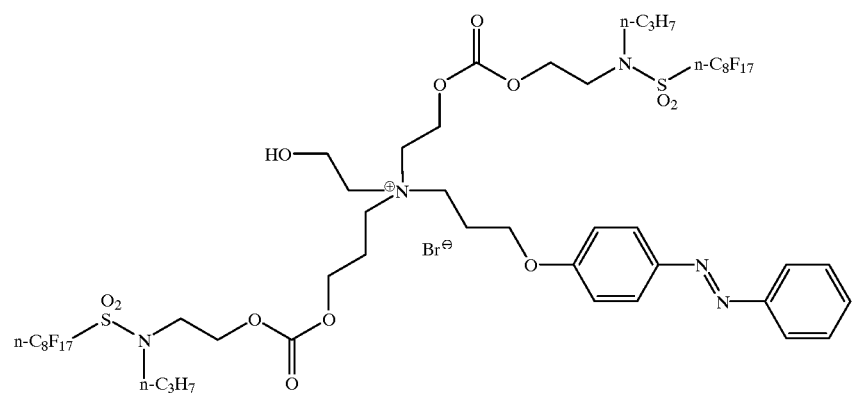
SYNTHESIS EXAMPLE 1
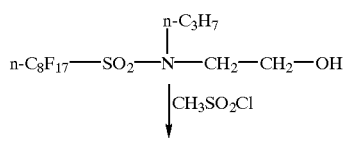
(A) 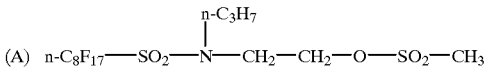
Synthesis of the Compound (A)
In a three-necked flask of 200 ml equipped with a stirring device, 34.9 g (0.06 mol) of a fluorine surface active agent (Megafac F-104, Dainippon Ink & Chemicals Inc.), 50 ml of tetrahydrofuran and 8.37 ml (0.06 mol) of triethylamine were placed, and stirred to obtain a solution. The solution was cooled to −5° C., and 4.64 ml (0.06 mol) of methanesulfonylchloride solution in 50 ml of tetrahydrofuran was dropwise added to the solution. The mixture was stirred for 1 hour at room temperature. The mixture was extracted and washed with ethyl acetate/saturated aqueous sodium chloride solution. The ethyl acetate phase was collected, and dried over anhydrous sodium sulfate. Ethyl acetate was removed under a reduced pressure to obtain 39.3 g of the compound (A). The yield was 99%. The compound (A) was not purified, and used at the next step.

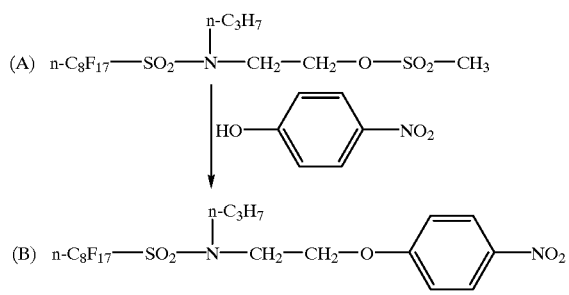

Synthesis of the Compound (B)

In a three-necked flask of 200 ml equipped with a stirring device, 7.4 g (0.053 mol) of p-nitrophenol, 39.3 g (0.059 mol) of the compound (A) and 100 ml of N,N-dimethylformamide were placed, and stirred to obtain a solution. To the solution, 29.5 g (0.21 mol) of potassium carbonate was added. The mixture was heated to 130° C., and stirred for 30 minutes. The mixture was cooled to room temperature, and extracted and washed with ethyl acetate/saturated aqueous sodium chloride solution. The ethyl acetate phase was collected, and dried over anhydrous sodium sulfate. Ethyl acetate was removed under a reduced pressure, and stirred and washed with 300 ml of methanol to obtain 26.9 g of the compound (B). The yield was 71%.

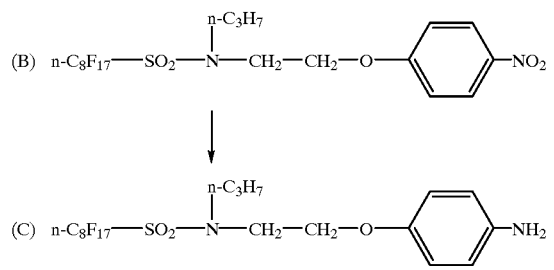

Synthesis of the Compound (C)

In a three-necked flask of 300 ml equipped with a stirring device and a reflux condenser, 8.48 g (0.152 mol) of reduced iron, 150 ml of isopropanol, 60 ml of water and 0.30 g (5.7 mmol) of ammonium chloride are placed, heated to 90° C., stirred and refluxed. To the mixture, 26.8 g (0.038 mol) was gradually added. The mixture was stirred for 2 hours while heating. To the mixture, 100 ml of tetrahydrofuran was added while heating. The mixture was filtrated with sellaite. The filtrate was extracted with ethyl acetate, and dried over anhydrous sodium sulfate. Ethyl acetate was removed under a reduced pressure to obtain 20.5 g of the compound (C) in a form of a viscous liquid. The yield was 80%.

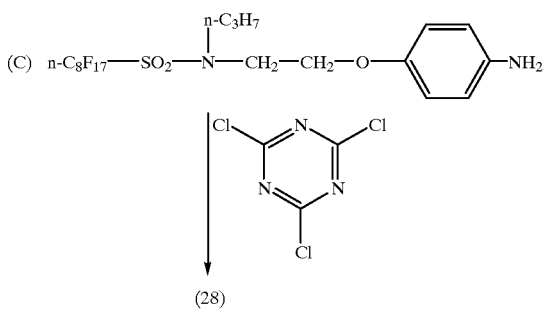

Synthesis of the Compound (28)

In a three-necked flask of 500 ml equipped with a stirring device and a reflux condenser, 20.4 g of the compound (C), 200 ml of methyl ethyl ketone, 2.03 g (0.011 mol) of cyanuric chloride and 13.8 g (0.10 mol) of potassium carbonate were placed, heated and stirred in a stream of nitrogen at 100° C. for 6 hours. The mixture was cooled to room temperature, extracted and washed with ethyl acetate/saturated aqueous sodium chloride solution. The ethyl acetate phase was collected, and dried over anhydrous sodium sulfate. After removing ethyl acetate under a reduced pressure, the product was recrystallized with 110 ml of acetone and 300 ml of isopropanol. The yield was 7.28 g (38%). The melting point was 227° C.

$^1$H-NMR (solvent: CDCl$_3$): 1.0 ppm. triplet, 3H; 1.3 ppm. multiplet, 2H; 3.4–4.0 ppm. multiplet, 4H; 4.2 ppm. triplet, 2H; 6.9 ppm. doublet, 2H; 7.5 ppm. doublet, 2H

SYNTHESIS EXAMPLE 2

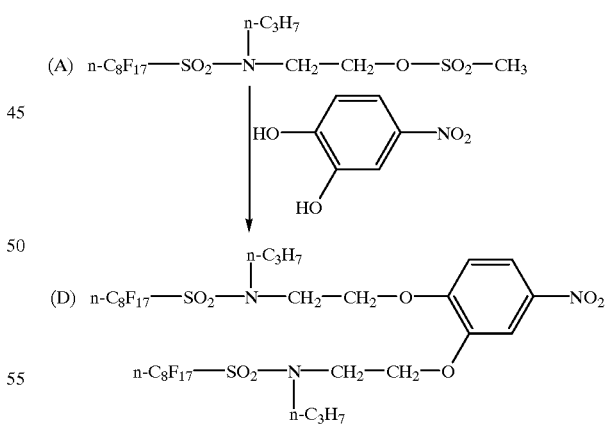

Synthesis of the Compound (D)

The compound (D) was synthesized in the same manner as in the synthesis of the compound (B) of Synthesis Example 1, except that nitrocatechol was used. The yield was 84%.

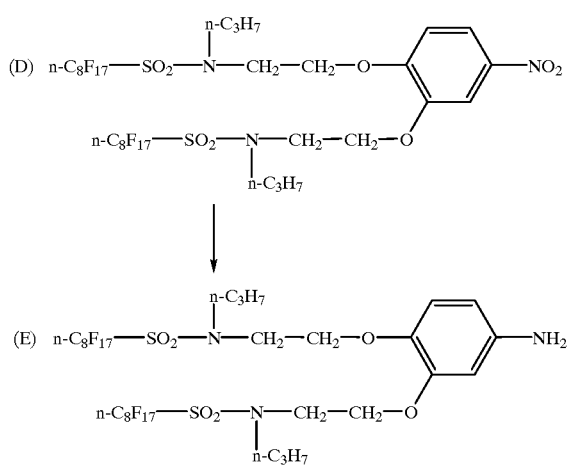

(30)

Synthesis of the Compound (E)

The compound (E) was synthesized in the same manner as in the synthesis of the compound (C) of the Synthesis Example 1, except that the obtained compound (D) was used.

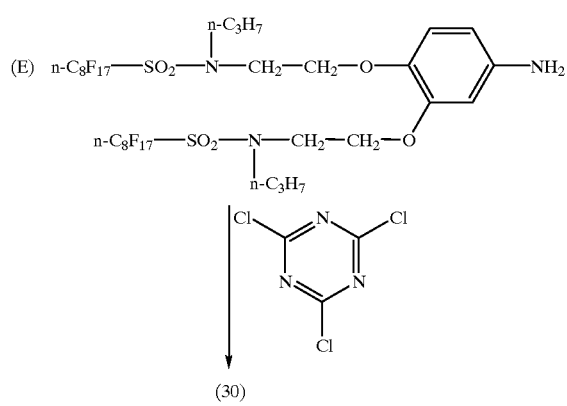

Synthesis of the Compound (30)

The compound (30) was synthesized in the same manner as in the synthesis of the compound (28) of the Synthesis Example 1, except that the obtained compound (E) was used. The compound (30) was purified through a column chromatography having silica gel as a solid phase, and using hexane/ethyl acetate (2/1) as a developing phase. The yield was 33%. The melting point was 81–83° C.

$^1$H-NMR (solvent: $CDCl_3$): 0.9 ppm. triplet, 6H; 1.6–1.8 ppm. multiplet, 4H; 3.4–3.6 ppm. multiplet, 8H; 4.2 ppm. triplet, 4H; 6.8–7.4 ppm. multiplet, 3H

SYNTHESIS EXAMPLE 3

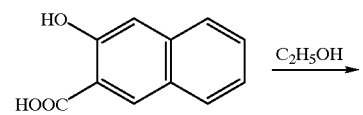 $\xrightarrow{C_2H_5OH}$

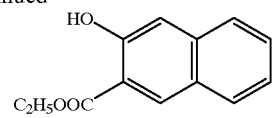

Synthesis of the Compound (F)

In 400 ml of ethanol, 20 g (0.11 mol) of 3-hydroxy-2-naphthoic acid and 19 g (0.1 mol) of p-toluene sulfonic acid were dissolved. The solution was heated and refluxed for 3 hours. The reaction solution was poured into 1 liter of water, and extracted with 1 liter of ethyl acetate. The organic phase was concentrated under a reduced pressure, and the concentrate was purified through a silica gel column chromatography using hexane/ethyl acetate (20/1) as a developing solvent to obtain 17 g (0.079 mol) of the compound (F).

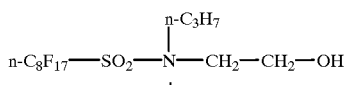

$\downarrow CH_3SO_2Cl$

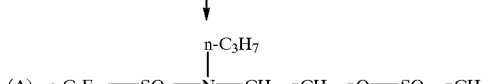

Synthesis of the Compound (A)

In 150 ml of tetrahydrofuran, 29 g (0.05 mol) of a fluorine surface active agent (Megafac F-104, Dainippon Ink & Chemicals Inc.) and 7.1 ml of triethylamine were dissolved. The solution was cooled to −5° C., and 4 ml (0.05 mol) of methanesulfonylchloride solution in 50 ml of tetrahydrofuran was dropwise added to the solution while keeping the temperature of not higher than 5° C. The mixture was stirred for 1 hour at room temperature. The mixture was poured into 1 liter of water, and extracted with 1 liter of ethyl acetate. The organic phase was concentrated under a reduced pressure to obtain the compound (A) as oil. The compound (A) was not purified, and used at the next step.

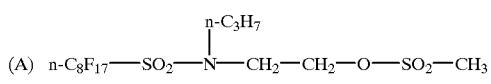

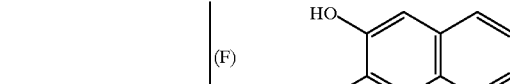

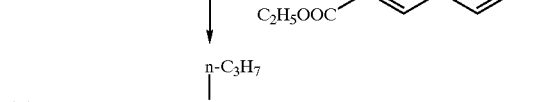

Synthesis of the Compound (G)

The compound (A) and 10 g (0.046 mol) of the compound (F) were dissolved in 100 ml of N,N-dimethylformamide. To the solution, 30 g (0.21 mol) of potassium carbonate was added. The mixture was heated and stirred at 120° C. for 3 hours. The reaction mixture was poured into 1 liter of water, and extracted with 1 liter of ethyl acetate. The organic phase was washed with 4% diluted hydrochloric acid, and concentrated under a reduced pressure. The concentrate was purified through a silica gel column chromatography (developing solution: hexane/ethyl acetate=10/1) to obtain 29 g (0.037 mol) of the compound (G).

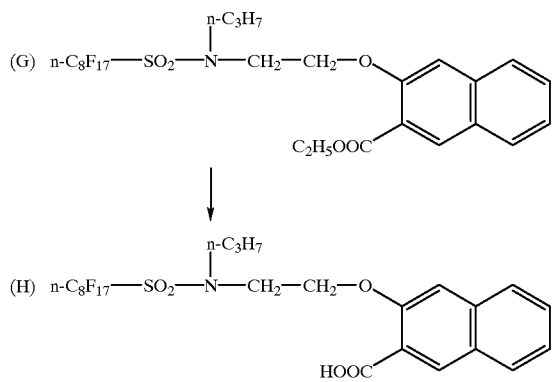

Synthesis of the Compound (H)

In 100 ml of ethanol, 29 g (0.037 g) of the compound (G) was dissolved. To the solution, 3 g (0.074 mol) of sodium hydroxide in 100 ml of water was added, and the mixture was heated and stirred at 80° C. for 1 hour. After the reaction mixture was cooled, 100 ml of diluted hydrochloric acid (1 mol per liter) was added to the reaction mixture. The mixture was extracted with 500 ml of ethyl acetate. The organic phase was concentrated under a reduced pressure. The concentrate was purified through a silica gel column chromatography (developing solution: hexane/ethyl acetate=4/1) to obtain 26 g (0.035 mol) of the compound (H).

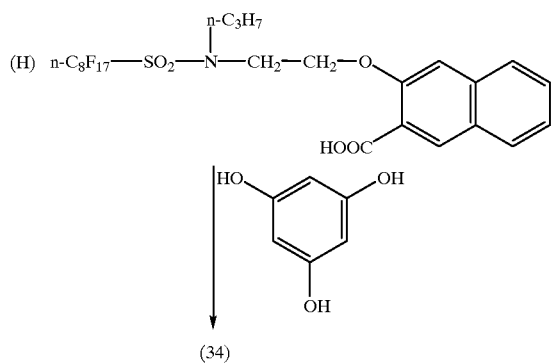

Synthesis of the Compound (34)

In 20 ml of tetrahydrofuran, 1.16 ml (0.015 mol) of methanesulfonyl chloride was dissolved. The solution was cooled to −5° C. To the solution, a solution of 11.3 g (0.015 mol) of the compound (H) and 2.8 ml (0.015 mol) of ethyldiisopropylamine in 10 ml of tetrahydrofuran was dropwise added while keeping the temperature of not higher than 5° C. The mixture was stirred at room temperature for 30 minutes. The mixture was cooled to 5° C. or lower. To the mixture, 2.8 ml (0.015 mol) of ethyldiisopropylamine and 0.3 g (2.4 mmol) of 4-N,N-dimethylaminopyridine. To the mixture, 10 ml of tetrahydrofuran solution of 0.74 g (4.6 mmol) of 1,3,5-trihydroxybenzene dihydrate anhydrated with sodium sulfate was dropwise added. The reaction mixture was stirred at room temperature for 3 hours, poured into 200 ml of water and extracted with 200 ml of ethyl acetate. The organic phase was concentrated under a reduced pressure. The concentrate was purified through a silica gel chlomatography (developing solution: hexane/ethyl acetate=6/1) to obtain 8.2 g (3.4 mmol) of the compound (34). The melting point was 113–116° C.

$^1$H-NMR (solvent: CDCl$_3$, TMS=0 ppm): 8.25 (d, 3H); 7.73 (d, 3H); 7.50 (d, 6H); 7.35 (d, 6H); 7.27 (s, 3H); 7.10 (s, 3H); 7.00 (d, 3H); 4.33 (bs, 6H); 3.40–4.20 (m, 12H); 1.50–1.90 (m, 6H); 0.88 (t, 9H)

SYNTHESIS EXAMPLE 4

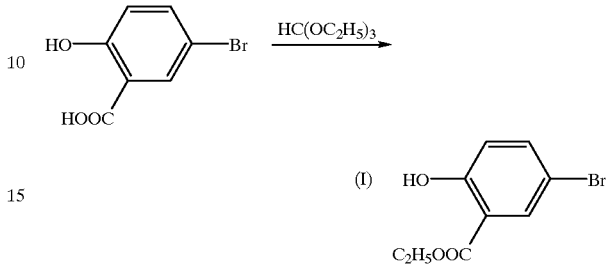

Synthesis of the Compound (I)

With 100 ml of ethyl orthoformate, 56 g (0.26 g) of 5-bromosalicylic acid was mixed. The mixture was heated and stirred at 140° C. for 3 hours. The reaction mixture was concentrated under a reduced pressure while heating to obtain 63 g (0.26 mol) of the compound (I).

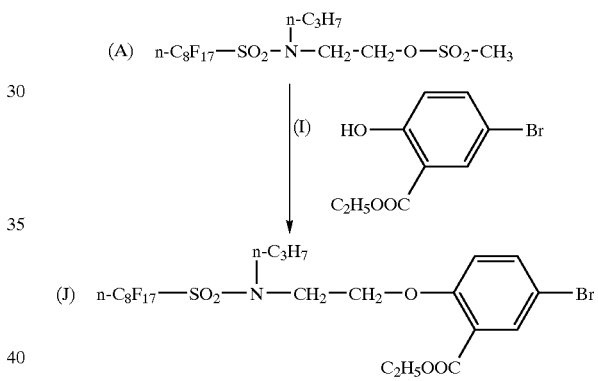

Synthesis of the Compound (J)

The compound (A) synthesized in Synthesis Example 3 and 13 g (0.053 mol) of the compound (I) were dissolved in 100 ml of N,N-dimethylformamide. To the solution, 30 g (0.21 mol) of potassium carbonate was added. The mixture was heated and stirred at 120° C. for 3 hours. The reaction mixture was poured into 1 liter of water, and extracted with 1 liter of ethyl acetate. The organic phase was wased with 4% diluted hydrochloric acid, and concentrated under a reduced pressure. The concentrate was purified through a silica gel column chromatography (developing solution: hexane/ethyl acetate=10/1) to obtain 41 g (0.05 mol) of the compound (J).

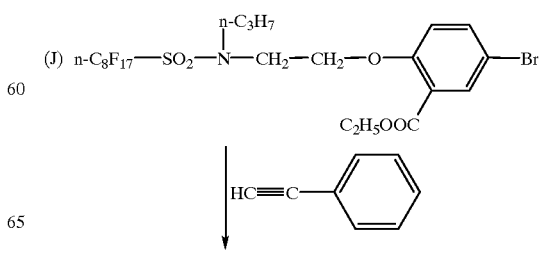

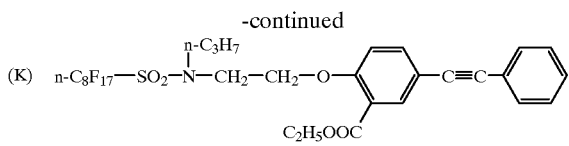

(K) n-C8F17—SO2—N(n-C3H7)—CH2—CH2—O—[aryl(C2H5OOC)]—C≡C—Ph

Synthesis of the Compound (K)

To 30 ml of triethylamine, 38.4 g (0.047 mol) of the compound (J) and 5.2 g (0.051 mol) of phenylacetylene were added, and the mixture was stirred to obtain a solution. To the solution, 0.1 g of palladium bistrifenylphosphine, 0.01 g of copper iodide and 0.2 g of triphenylphosphine were added. The mixture was stirred at 120° C. for 3 hours. The reaction mixture was poured into 500 ml of water, and 20 ml of concentrated hydrochloric acid was added. The mixture was extracted with 500 ml of ethyl acetate. The organic phase was concentrated under a reduced pressure to obtain the compound (K) as oil. The compound (K) was not purified, and used at the next step.

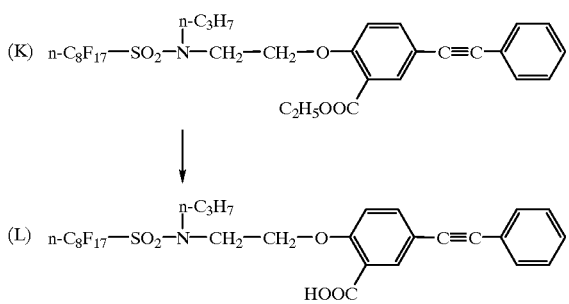

Synthesis of the Compound (L)

The compound (K) was dissolved in 200 ml of ethanol. To the solution, 12 g (0.3 mol) of sodium hydroxide in 200 ml of water was added, and the mixture was heated and stirred at 80° C. for 1 hour. After the reaction mixture was cooled, 200 ml of water and 30 ml of concentrated hydrochloric acid were added to the reaction mixture. The mixture was extracted with 500 ml of ethyl acetate. The organic phase was concentrated under a reduced pressure. The concentrate was purified through a silica gel column chromatography (developing solution: hexane/ethyl acetate=4/1) to obtain 28 g (0.035 mol) of the compound (L).

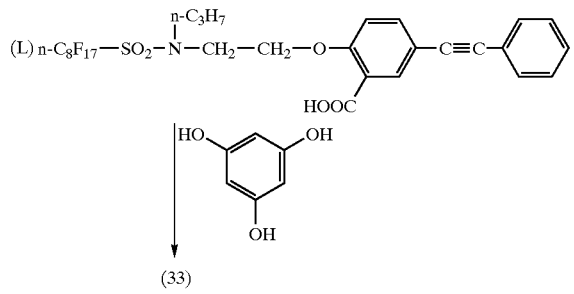

Synthesis of the Compound (34)

In 20 ml of tetrahydrofuran, 1.16 ml (0.015 mol) of methanesulfonyl chloride was dissolved. The solution was cooled to −5° C. To the solution, a solution of 12.1 g (0.015 mol) of the compound (L) and 2.8 ml (0.015 mol) of ethyldiisopropylamine in 10 ml of tetrahydrofuran was dropwise added while keeping the temperature of not higher than 5° C. The mixture was stirred at room temperature for 30 minutes. The mixture was cooled to 5° C. or lower. To the mixture, 2.8 ml (0.015 mol) of ethyldiisopropylamine and 0.3 g (2.4 mmol) of 4-N,N-dimethylaminopyridine. To the mixture, 10 ml of tetrahydrofuran solution of 0.74 g (4.6 mmol) of 1,3,5-trihydroxybenzene dihydrate anhydrated with sodium sulfate was dropwise added. The reaction mixture was stirred at room temperature for 3 hours, poured into 200 ml of water and extracted with 200 ml of ethyl acetate. The organic phase was concentrated under a reduced pressure. The concentrate was purified through a silica gel chlomatography (developing solution: hexane/ethyl acetate=6/1) to obtain 8 g (3.3 mmol) of the compound (33). The melting point was 148° C.

$^1$H-NMR (solvent: CDCl$_3$, TMS=0 ppm): 8.60 (s, 3H); 7.95 (d, 3H); 7.85 (d, 3H); 7.60 (t, 3H); 7.40–7.52 (m, 6H); 7.27 (s, 3H); 4.40 (bs, 6H); 3.72–4.10 (m, 6H); 3.56 (t, 6H); 1.50–1.90 (m, 6H); 0.80 (t, 9H)

SYNTHESIS EXAMPLE 5

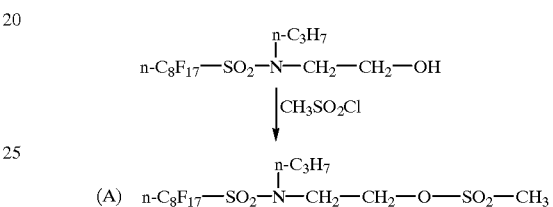

Synthesis of the Compound (A)

In 20 ml of tetrahydrofuran, 58.6 g of a fluorine surface active agent (Megafac F-104, Dainippon Ink & Chemicals Inc.) and 12.14 g of triethylamine were dissolved. The solution was stirred while cooled with ice. To the solution, 12.6 g of methanesulfonylchloride was added for 23 minutes. As a result, a white precipitate was observed, and the mixture was slightly exothermic. The completion of the reaction was confirmed by TLC, and the reaction solution was poured into a mixture of diluted hydrochloric acid and ethyl acetate. The organic phase was extracted, separated, and washed with a saturated aqueous sodium chloride solution. The organic phase was dried with magnesium sulfate, and concentrated to obtain the compound (A) as a white wax. The amount was 66.57 g (yield: almost quantitative). The molecular structure was confirmed with NMR and a mass spectrum.

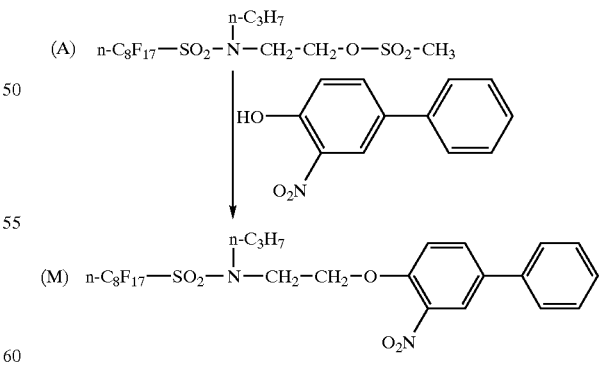

Synthesis of the Compound (M)

To 150 ml of dimethylformamide, 31.84 g of the compound (A) and 8.9 g of potassium carbonate were added. The mixture was heated at 100° C. for 5 hours. The completion of the reaction was confirmed by TLC, and the reaction solution was poured into a mixture of diluted hydrochloric acid and ethyl acetate. The organic phase was extracted, separated, and washed with a saturated aqueous sodium chloride solution. The organic phase was dried with magnesium sulfate, and concentrated to obtain the compound (M) as pale yellow crystals. The amount was 27.29 g (yield: 87%). The molecular structure was confirmed with NMR and a mass spectrum.

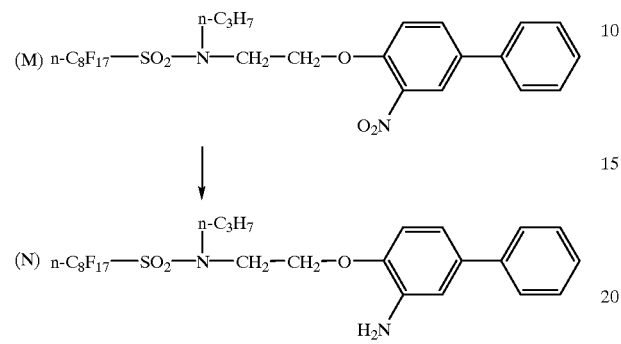

Synthesis of the Compound (N)

With 200 ml of isopropanol, 16 g of reduced iron, 1.6 g of ammonium chloride and 20 ml of water were mixed. The mixture was heated and refluxed in a steam bath while stirring. The compound (M) was gradually added to the mixture. The resulting mixture was heated and refluxed for 2.5 hours. The completion of the reaction was confirmed by TLC. The reaction solution was filtered with sellaite while keeping the heated temperature, and washed with tetrahydrofuran. The filtrate was concentrated to obtain the compound (N) as gray crystals. The amount was 16.56 g. The compound (N) was not purified, and used at the next step.

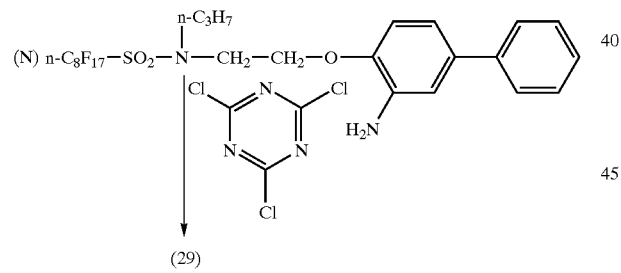

(29)

Synthesis of the Compound (29)

The compound (N), 3.59 g of potassium carbonate and 1.11 g of cyanuric chloride were added to 100 ml of methyl ethyl ketone. The mixture was heated and refluxed for 3 hours. The completion of the reaction was confirmed by TLC, and the reaction solution was poured into a mixture of diluted hydrochloric acid and ethyl acetate. The organic phase was extracted, separated, and washed with a saturated aqueous sodium chloride solution. The organic phase was dried with magnesium sulfate, and concentrated. The concentrate was purified through a silica gel column chromatography (developing solution: hexane/ethyl acetate=2/1) to obtain the compound (29) as viscous oil. The amount was 8.79 g. The molecular structure was confirmed with a mass spectrum.

SYNTHESIS EXAMPLE 6

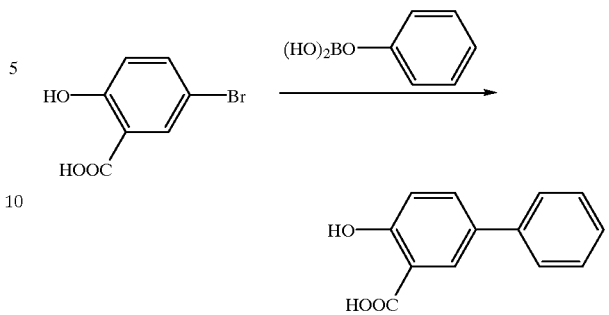

Synthesis of 5-phenylsalicylic acid

In 400 ml of water, 21.7 g of bromosalicylic acid, 13.41 g of phenyl borate and 15.28 g of potassium carbonate were dissolved. The solution was stirred at room temperature for 40 minutes. The completion of the reaction was confirmed by TLC, and the reaction solution was poured into a mixture of diluted hydrochloric acid and ethyl acetate. The organic phase was extracted, separated, and washed with a saturated aqueous sodium chloride solution. The organic phase was dried with magnesium sulfate, and concentrated. The concentrate was recrystallized with acetonitrile to obtain 5-phenylsalicyclic acid as colorless crystals. The amount was 18.58 g (yield: 87%). The molecular structure was confirmed with a mass spectrum.

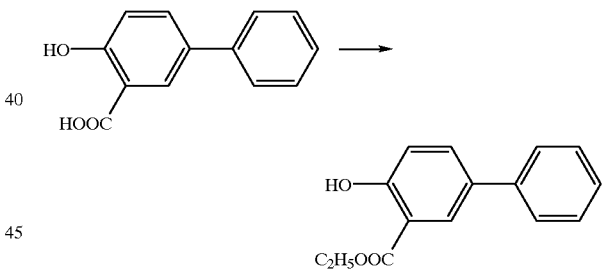

Synthesis of ethyl 5-phenylsalicylate

To 18.59 g of 5-phenylsalicylic acid, 350 ml of ethanol, 100 ml of toluene and 42 ml of concentrated sulfuric acid were added. The mixture was heated and refluxed for 14 hours. The almost completion of the reaction (in which the original materials almost disappear) was confirmed by TLC, and the reaction solution was poured into a mixture of diluted hydrochloric acid and ethyl acetate. The organic phase was extracted, separated, and washed with water and a saturated aqueous sodium chloride solution. The organic phase was dried with magnesium sulfate, and concentrated. The concentrate was recrystallized with ethanol to obtain ethyl 5-phenylalicylate as colorless crystals. The amount was 11.53 g (yield: 55%). The molecular structure was confirmed with NMR and a mass spectrum.

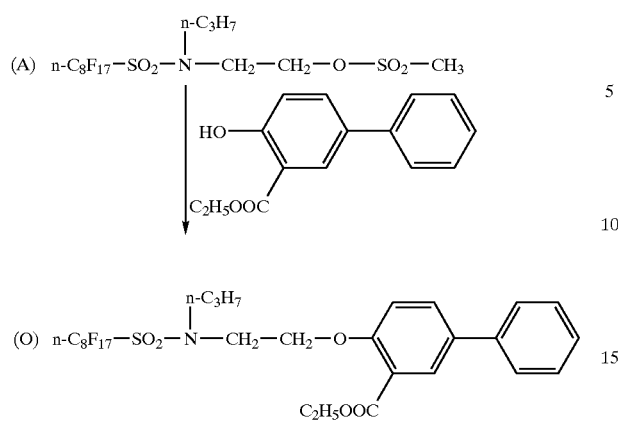

Synthesis of the Compound (O)

With 150 ml of dimethylformamide, 11.46 g of ethyl 5-phenylalicylate, 34.03 g of the compound (A) synthesized in the Synthesis Example 5 and 11.2 g of potassium carbonate were mixed. The mixture was heated and stirred at 100° C. The completion of the reaction was confirmed by TLC, and the reaction solution was poured into a mixture of diluted hydrochloric acid and ethyl acetate. The organic phase was extracted, separated, and washed with a saturated aqueous sodium chloride solution. The organic phase was dried with magnesium sulfate, and concentrated. The concentrate was recrystallized with acetonitrile to obtain the compound (O) as colorless crystals. The amount was 33.10 g (yield: 86%). The molecular structure was confirmed with NMR and a mass spectrum.

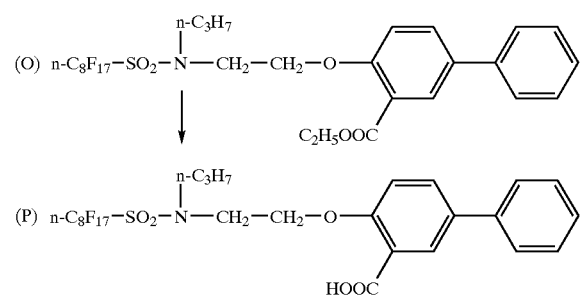

Synthesis of the Compound (P)

In 20 ml of tetrahydrofuran, 15.8 g of the compound (O) was dissolved. The solution was stirred while cooling with ice. To the solution, 4.0 g of sodium hydroxide dissolved in 20 ml of water was added. The reaction solution was heated at 60° C. and stirred for 2 hours. The completion of the reaction was confirmed by TLC. Diluted hydrochloric acid was dropwise added to the reaction solution. Precipitated crystals were filtered, and washed with water. The amount was 1.27 g (yield: quantitative).

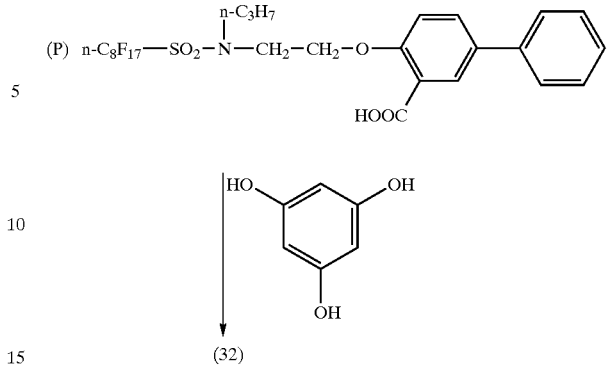

Synthesis of the Compound (32)

In 60 ml of methylene chloride, 7.03 g of the compound (P) was dissolved. One drop of dimethylformamide was added to the solution. To the solution, 1.2 ml of oxalyl chloride was dropwise added at room temperature in a stream of nitrogen. The reaction solution was heated and refluxed for 2.5 hours. The completion of the reaction was confirmed by TLC. Methylene chloride was removed from the solution under a reduced pressure at 60° C. The obtained white crystals were dissolved in 80 ml of tetrahydrofuran. To the solution, 0.38 g of 1,3,5-trihydroxybenzene and 5 ml of pyridine were added. The mixture was stirred at 60° C. for 6 hours. The reaction solution was poured into a mixture of diluted hydrochloric acid and ethyl acetate. The organic phase was extracted, separated, and washed with a saturated aqueous sodium chloride solution. The organic phase was dried with magnesium sulfate, and concentrated. The concentrate was purified through a silica gel column chromatography (developing solution: chloroform/hexane=4/3) to obtain the compound (32) as colorless crystals. The amount was 3.24 g (yield: 45%). The molecular structure was confirmed with NMR and a mass spectrum.

[Liquid Crystal Composition]

The liquid crystal composition comprises liquid crystal molecules and the alignment promoter. Two or more liquid crystal compounds can be used in combination. Two or more kinds of the alignment promoter can be used in combination.

The amount of the alignment promoter is in the range of 0.01 to 20 wt. %, and preferably in the range of 0.1 to 5 wt. % based on that of the liquid crystal molecules.

Discotic or rod-like liquid crystal molecules are preferably used as the liquid crystal molecules. The molecules preferably have polymerizable groups.

The discotic liquid crystal molecule is described in various documents (C. Destrade et al, Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal molecule is described in Japanese Patent Provisional Publication No. 8(1996)-27284.

For fixing the alignment, a polymerizable group should be bound to a discotic core of the discotic liquid crystal molecule to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic liquid crystal molecule having a polymerizable group (polymerizable discotic liquid crystal molecule) is preferably represented by the following formula:

$$D(-L-Q)_n$$

in which D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q). Triphenylene (D4) is particularly preferred.

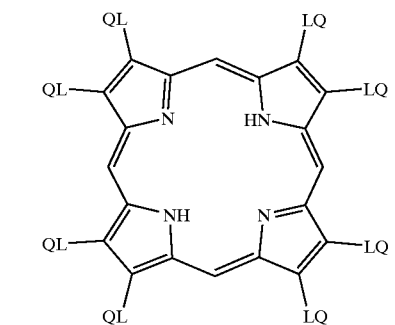
(D1)

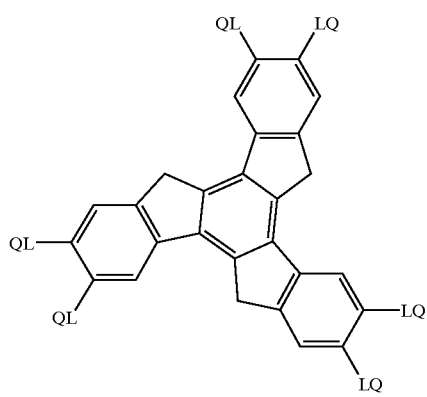
(D2)

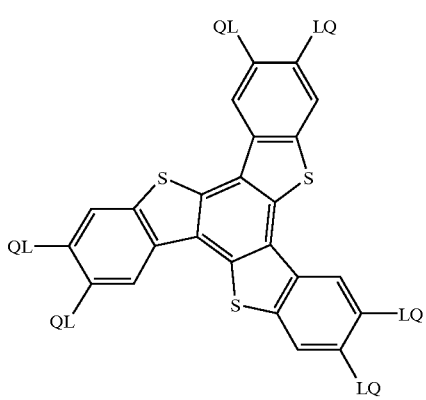
(D3)

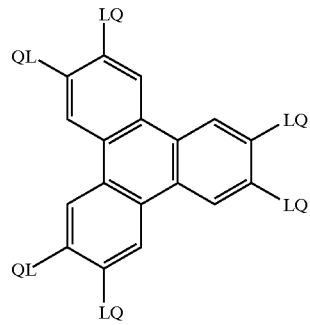
(D4)

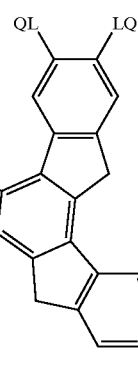
(D5)

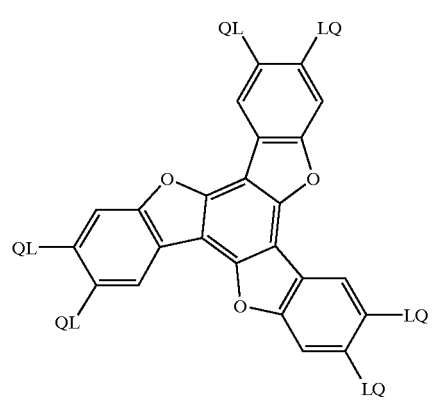
(D6)

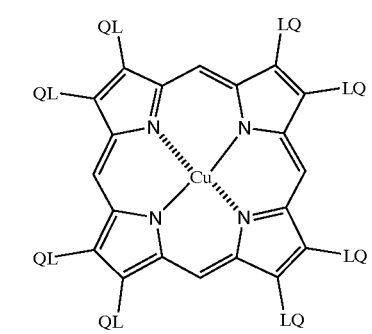
(D7)

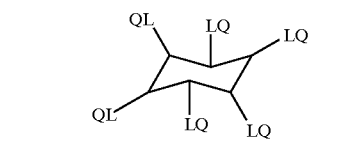
(D8)

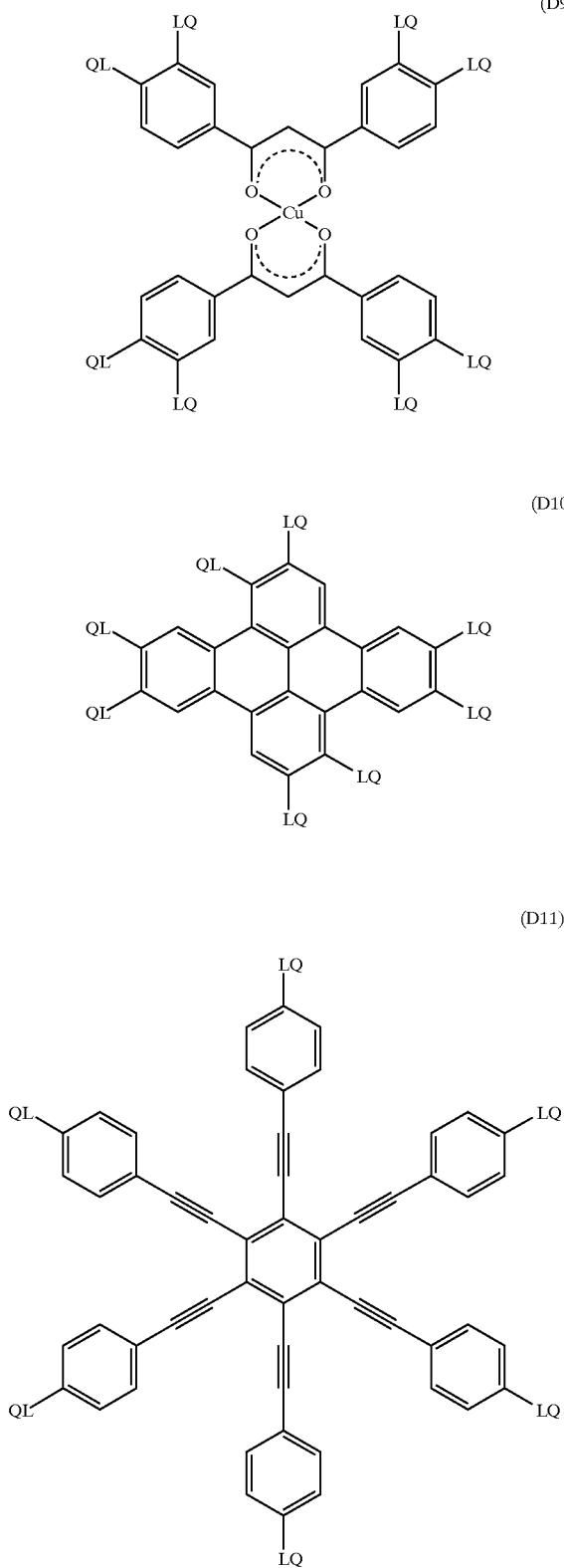
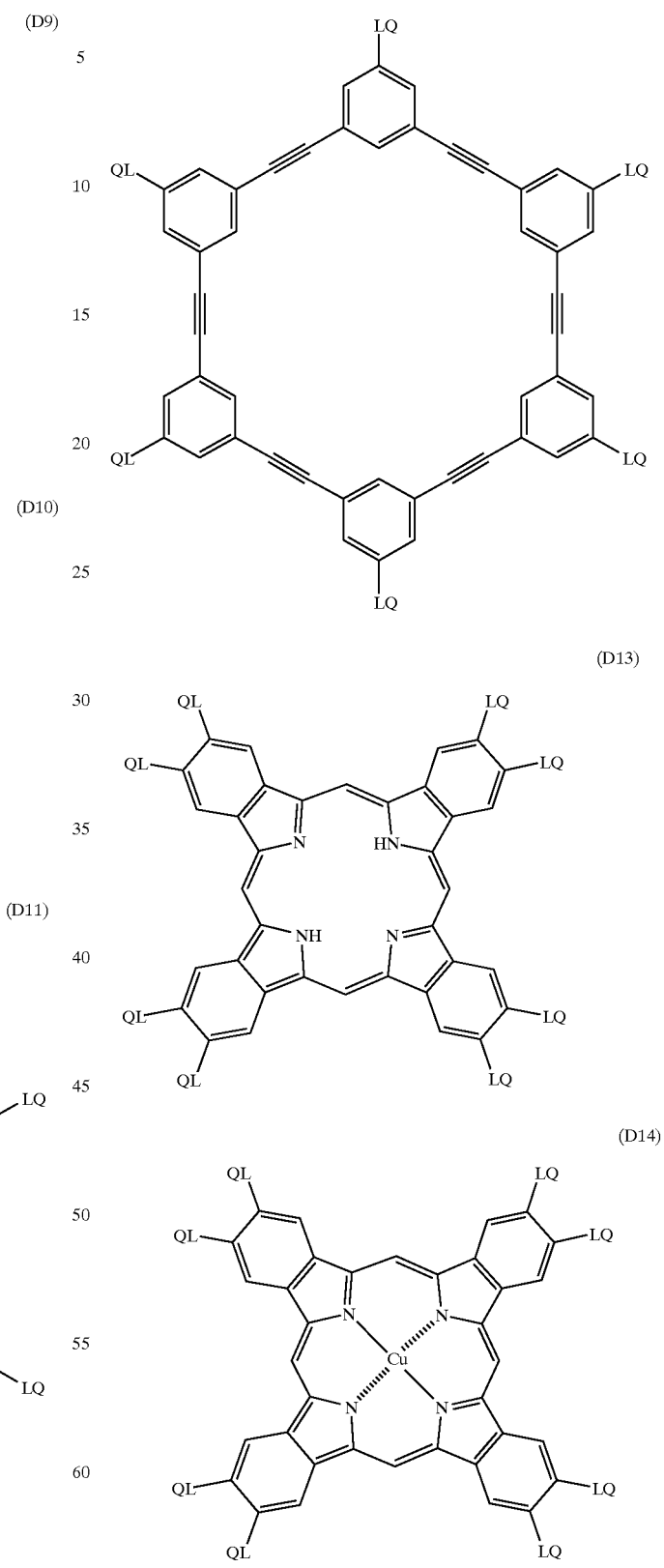

-continued (D15)

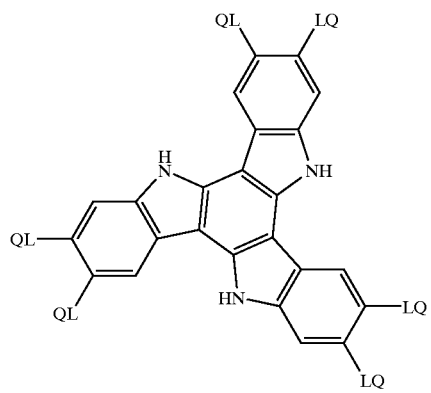

In the formula, the divalent linking group (L) is preferably selected from the group consisting of an alkylene group, an alkenylene group, an arylene group, —CO, —NH—, —O—, —S— and a combination thereof. L more preferably is a divalent linking group comprising at least two divalent groups selected from the group consisting of an alkylene group, an alkenylene group, an arylene group, —CO—, —NH—, —O— and —S—. L further preferably is a divalent linking group comprising at least two divalent groups selected from the group consisting of an alkylene group, an alkenylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group can have a substituent group (such as an alkyl group, a halogen atom, cyano, an alkoxy group, an acyloxy group).

Examples of the divalent linking groups (L) are shown below. In the examples, the left side is attached to the discotic core (D), and the right side is attached to the polymerizable group (Q). The AL means an alkylene group or an alkenylene group. The AR means an arylene group.

| | |
|---|---|
| L101: | —AL—CO—O—AL— |
| L102: | —AL—CO—O—AL—O— |
| L103: | —AL—CO—O—AL—O—AL— |
| L104: | —AL—CO—O—AL—O—CO— |
| L105: | —CO—AR—O—AL— |
| L106: | —CO—AR—O—AL—O— |
| L107: | —CO—AR—O—AL—O—CO— |
| L108: | —CO—NH—AL— |
| L109: | —NH—AL—O— |
| L110: | —NH—AL—O—CO— |
| L111: | —O—AL— |
| L112: | —O—AL—O— |
| L113: | —O—AL—O—CO— |
| L114: | —O—AL—O—CO—NH—AL— |
| L115: | —O—AL—S—AL— |
| L116: | —O—CO—AL—AR—O—AL—O—CO— |
| L117: | —O—CO—AR—O—AL—CO— |
| L118: | —O—CO—AR—O—AL—O—CO— |
| L119: | O—CO—AR—O—AL—O—AL—O—CO— |
| L120: | —O—CO—AR—O—AL—O—AL—O—AL—O—CO— |
| L121: | —S—AL— |
| L122: | —S—AL—O— |
| L123: | —S—AL—O—CO— |
| L124: | —S—AL—S—AL— |
| L125: | —S—AR—AL— |

The discotic liquid crystal molecules can be oriented in spirally twisted alignment by introducing an asymmetric carbon atom into AL (an alkylene group or an alkenylene group). Examples of AL containing asymmetric carbon atoms (AL*) are shown below. In the examples, the left side is adjacent to the discotic core (D), and the right side is adjacent to the polymerizable group (Q). The carbon atom (C) with the mark (*) is the asymmetric carbon atom. The optical activity can be either S or R.

| | |
|---|---|
| AL*1: | —CH$_2$CH$_2$—C*HCH$_3$—CH$_2$CH$_2$CH$_2$— |
| AL*2: | —CH$_2$CH$_2$CH$_2$—C*HCH$_3$—CH$_2$CH$_2$— |
| AL*3: | —CH$_2$—C*HCH$_3$—CH$_2$CH$_2$CH$_2$CH$_2$— |
| AL*4: | —C*HCH$_3$—CH$_2$CH$_2$CH$_2$CH$_2$CH$_2$— |
| AL*5: | —CH$_2$CH$_2$CH$_2$CH$_2$—C*HCH$_3$CH$_2$— |
| AL*6: | —CH$_2$CH$_2$CH$_2$CH$_2$CH$_2$—C*HCH$_3$— |
| AL*7: | —C*HCH$_3$—CH$_2$CH$_2$CH$_2$CH$_2$— |
| AL*8: | —CH$_2$—C*HCH$_3$—CH$_2$CH$_2$CH$_2$— |
| AL*9: | —CH$_2$CH$_2$—C*HCH$_3$—CH$_2$CH$_2$— |
| AL*10: | —CH$_2$CH$_2$CH$_2$—C*HCH$_3$—CH$_2$— |
| AL*11: | —CH$_2$CH$_2$CH$_2$CH$_2$—C*HCH$_3$— |
| AL*12: | —C*HCH$_3$—CH$_2$CH$_2$CH$_2$— |
| AL*13: | —CH$_2$—C*HCH$_3$—CH$_2$CH$_2$— |
| AL*14: | —CH$_2$CH$_2$—C*HCH$_3$—CH$_2$— |
| AL*15: | —CH$_2$CH$_2$CH$_2$—C*HCH$_3$— |
| AL*16: | —CH$_2$—C*HCH$_3$— |
| AL*17: | —C*HCH$_3$—CH$_2$— |
| AL*18: | —C*HCH$_3$—CH$_2$CH$_2$CH$_2$CH$_2$CH$_2$CH$_2$— |
| AL*19: | —CH$_2$—C*HCH$_3$—CH$_2$CH$_2$CH$_2$CH$_2$CH$_2$— |
| AL*20: | —CH$_2$CH$_2$—C*HCH$_3$—CH$_2$CH$_2$CH$_2$CH$_2$— |
| AL*21: | —CH$_2$CH$_2$CH$_2$—C*HCH$_3$—CH$_2$CH$_2$CH$_2$— |
| AL*22: | —C*HCH$_3$—CH$_2$CH$_2$CH$_2$CH$_2$CH$_2$CH$_2$CH$_2$— |
| AL*23: | —CH$_2$—C*HCH$_3$—CH$_2$CH$_2$CH$_2$CH$_2$CH$_2$CH$_2$— |
| AL*24: | —CH$_2$CH$_2$—C*HCH$_3$—CH$_2$CH$_2$CH$_2$CH$_2$CH$_2$— |
| AL*25: | —CH$_2$CH$_2$CH$_2$—C*HCH$_3$—CH$_2$CH$_2$CH$_2$CH$_2$— |
| AL*26: | —C*HCH$_3$—CH$_2$CH$_2$CH$_2$CH$_2$CH$_2$CH$_2$CH$_2$CH$_2$— |
| AL*27: | —CH$_2$—C*HCH$_3$—CH$_2$CH$_2$CH$_2$CH$_2$CH$_2$CH$_2$CH$_2$CH$_2$— |
| AL*28: | —CH$_2$—C*HCH$_2$CH$_3$— |
| AL*29: | —CH$_2$—C*HCH$_2$CH$_3$—CH$_2$— |
| AL*30: | —CH$_2$—C*HCH$_2$CH$_3$—CH$_2$CH$_2$— |
| AL*31: | —CH$_2$—C*HCH$_2$CH$_3$—CH$_2$CH$_2$CH$_2$— |
| AL*32: | —CH$_2$—C*H(n-C$_3$H$_7$)—CH$_2$CH$_2$— |
| AL*33: | —CH$_2$—C*H(n-C$_3$H$_7$)—CH$_2$CH$_2$CH$_2$— |
| AL*34: | —CH$_2$—C*H(OCOCH$_3$)—CH$_2$CH$_2$— |
| AL*35: | —CH$_2$—C*H(OCOCH$_3$)—CH$_2$CH$_2$CH$_2$— |
| AL*36: | —CH$_2$—C*HF—CH$_2$CH$_2$— |
| AL*37: | —CH$_2$—C*HF—CH$_2$CH$_2$CH$_2$— |
| AL*38: | —CH$_2$—C*HCl—CH$_2$CH$_2$— |
| AL*39: | —CH$_2$—C*HCl—CH$_2$CH$_2$CH$_2$— |
| AL*40: | —CH$_2$—C*HOCH$_3$—CH$_2$CH$_2$— |
| AL*41: | —CH$_2$—C*HOCH$_3$—CH$_2$CH$_2$CH$_2$— |
| AL*42: | —CH$_2$—C*HCN—CH$_2$CH$_2$— |
| AL*43: | —CH$_2$—C*HCN—CH$_2$CH$_2$CH$_2$— |
| AL*44: | —CH$_2$—C*HCF$_3$—CH$_2$CH$_2$— |
| AL*45: | —CH$_2$—C*HCF$_3$—CH$_2$CH$_2$CH$_2$— |

The polymerizable group (Q) is determined according to the polymerization reaction. Examples of the polymerizable groups (Q) are shown below.

$$—CH{=}CH_2 \quad (Q1)$$

$$—CH{=}CH—CH_3 \quad (Q2)$$

$$—CH{=}CH—C_2H_5 \quad (Q3)$$

$$—CH{=}CH—n\text{-}C_3H_7 \quad (Q4)$$

$$\underset{CH_3}{—\overset{|}{C}{=}CH_2} \quad (Q5)$$

-continued

—CH=C—CH₃  (Q6)
　　|
　　CH₃

—C≡CH  (Q7)

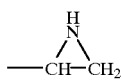  (Q8)

  (Q9)

—SH  (Q10)

—CHO  (Q11)

—OH  (Q12)

—CO₂H  (Q13)

—N=C=O  (Q14)

—NH₂  (Q15)

—SO₃H  (Q16)

—N=C=S  (Q17)

The polymerizable group (Q) preferably is an unsaturated polymerizable group (Q1 to Q7), an epoxyalkyl group (Q8) or an aziridinyl group (Q9), more preferably is an unsaturated polymerizable group, and most preferably is an ethylenically unsaturated group (Q1 to Q6).

In the formula, n is an integer of 4 to 12, which is determined according to the chemical structure of the discotic core (D). The 4 to 12 combinations of L and Q can be different from each other. However, the combinations are preferably identical.

Two or more kinds of the discotic liquid crystal molecules can be used in combination. For example, the molecules containing an asymmetric carbon atom in the divalent linking group (L) can be used in combination with those containing no asymmetric carbon atom. Further, the molecules having a polymerizable group (Q) can be used in combination with those having no polymerizable group (i.e., the molecules having a hydrogen atom in place of the polymerizable group (Q)). The liquid crystal molecules containing an asymmetric carbon atom and having no polymerizable group are particularly preferably used in combination with those having a polymerizable group and containing no asymmetric carbon atom. Practically, the former molecules function as a chiral agent rather than the discotic liquid crystal.

In place of introducing an asymmetric carbon atom into the divalent linking group of the discotic liquid crystal molecule, the molecules can also be oriented in spirally twisted alignment by adding an optical active compound containing an asymmetric carbon atom (i.e., chiral agent) into the optically anisotropic layer. Various natural or synthetic optical active compounds can be used as the chiral agent. The chiral agent can have a polymerizable group, which is the same as or similar to the polymerizable group of the discotic liquid crystal compound. The discotic liquid crystal molecules are fixed in the optically anisotropic layer by a polymerization reaction after the molecules are essentially vertically (homogeneously) aligned. The chiral agent having a polymerizable group can also be fixed by the same or a similar polymerization reaction.

Preferred examples of the rod-like liquid crystal molecules include azomethines, azoxy compounds, cyanobiphenyls, cyanophenyl esters, benzoic esters, cyclohexanecarbonic phenyl esters, cyanophenylcyclohexanes, cyano-substituted phenylpyrimidines, alkoxy-substituted phenylpyrimidines, phnyldioxanes, tolans and alkenylcyclohexylbenzonitrile.

A liquid crystal cell of a VA (vertical alignment) mode is a typical example of the cell in which rod-like liquid crystal molecules are essentially vertically aligned. A liquid crystal display comprising the liquid crystal cell of a VA (vertical aligned) mode is described in "Nikkei Microdevice (written in Japanese)" 136(1996), pp.147; Japanese Patent Provisional Publication No. 2(1990)-176625, and Japanese Patent No. 2,866,372.

The rod-like liquid crystal molecules preferably have a refractive index of birefringence in the range of 0.001 to 0.7. Also the rod-like liquid crystal molecules preferably have polymerizable groups. Examples of the polymerizable groups are the same as those (Q) for the discotic liquid crystal molecules.

The rod-like liquid crystal molecule preferably has a molecular structure nearly symmetric with respect to the minor axis. Accordingly, the molecule preferably has polymerizable groups at both ends.

Examples of the rod-like liquid crystal molecules are shown below.

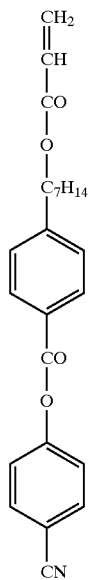

(N1)

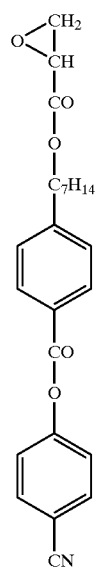 (N2)
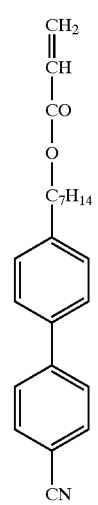 (N3)
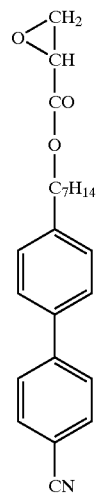 (N4)
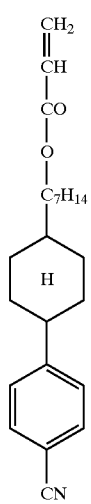 (N5)
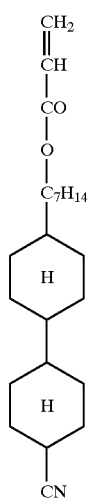 (N6)
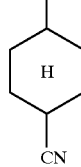 (N7)

(N8) 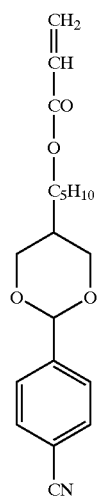
(N9) 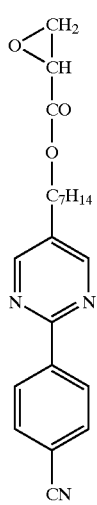
(N10) 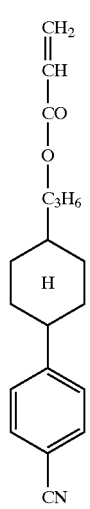
(N11) 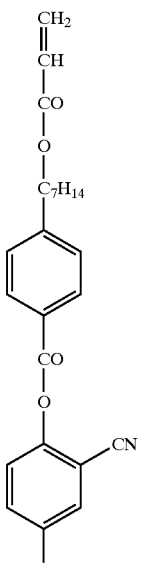
(N12) 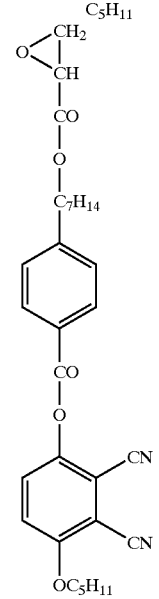
(N13) 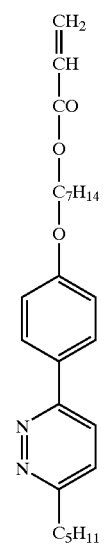

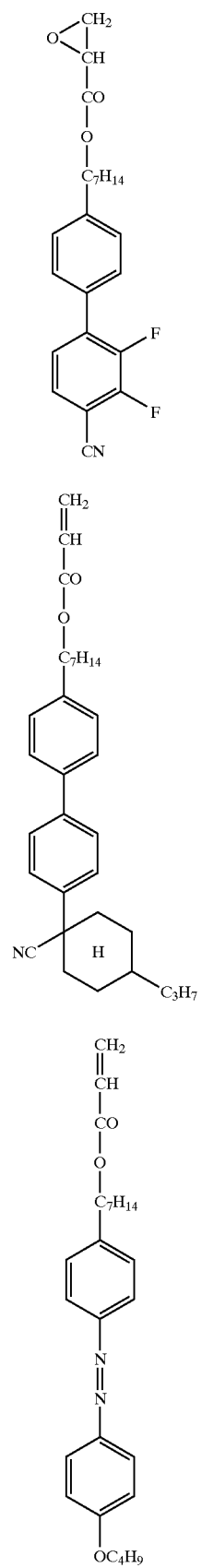
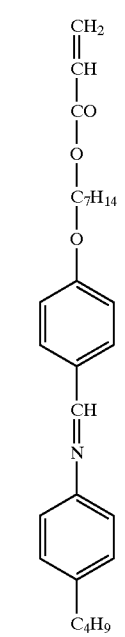
(N14)
(N15)
(N16)
(N17)
(N18)

(N19) 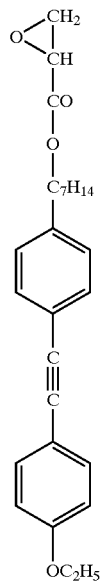
(N20) 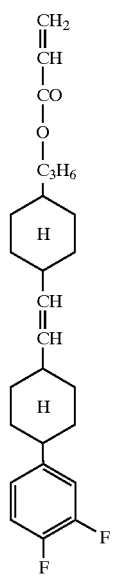
(N21) 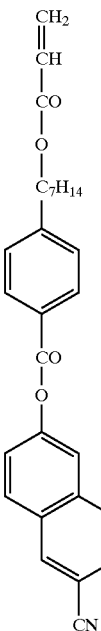
(N22)

(N23)
(N24)
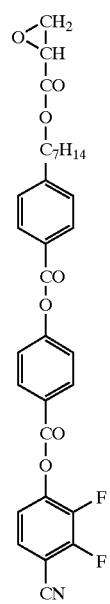
(N25)
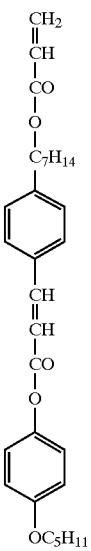
(N26)
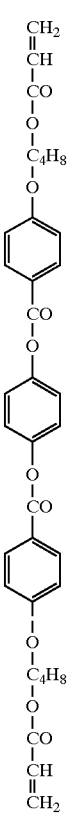

(N27)
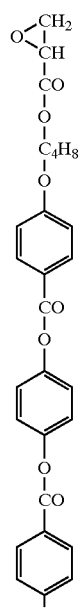
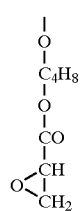
(N28)
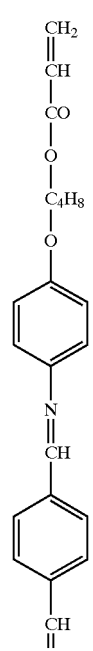
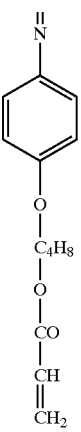
(N29)
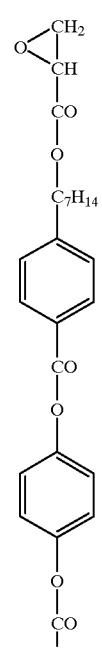
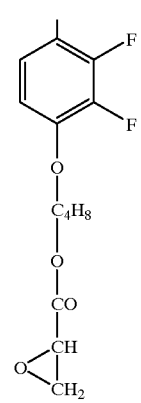

(N30)
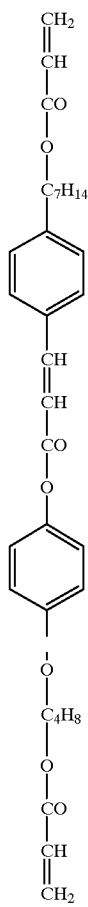
(N31)
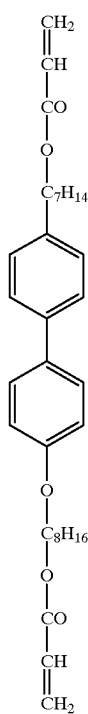
(N32)
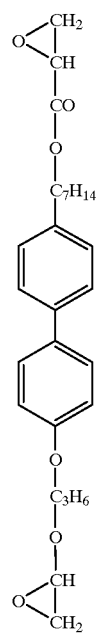
(N33)
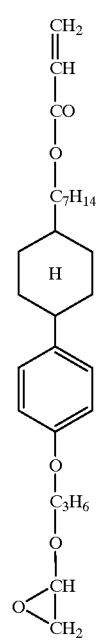

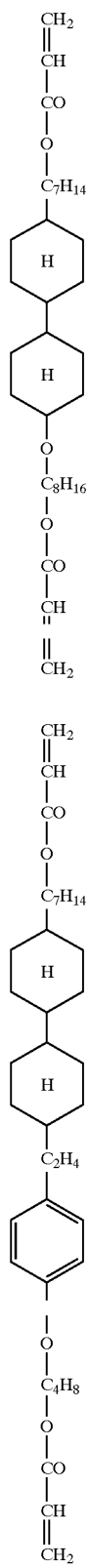
(N34)
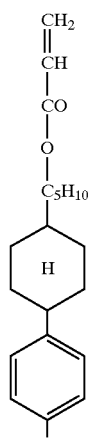
(N35)
(N36)
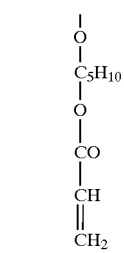
(N37)
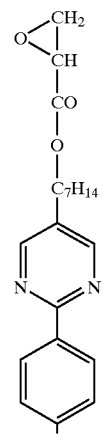
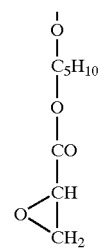

(N38) 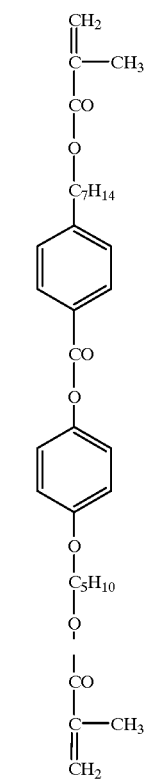
(N39) 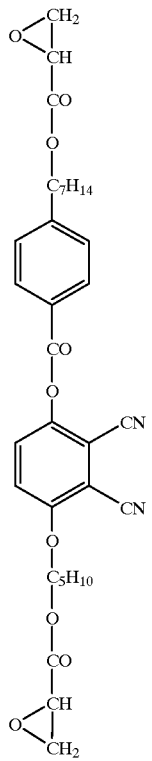
(N40) 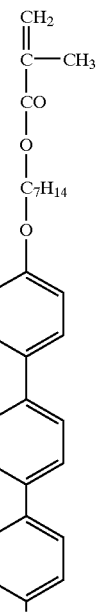
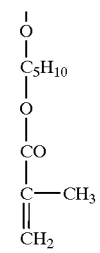
(N41) 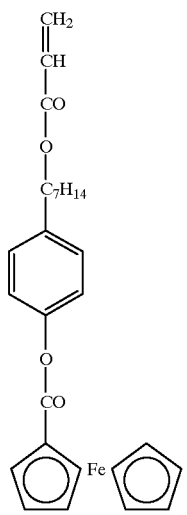

(N42)
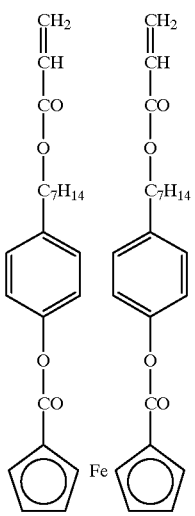
(N44)
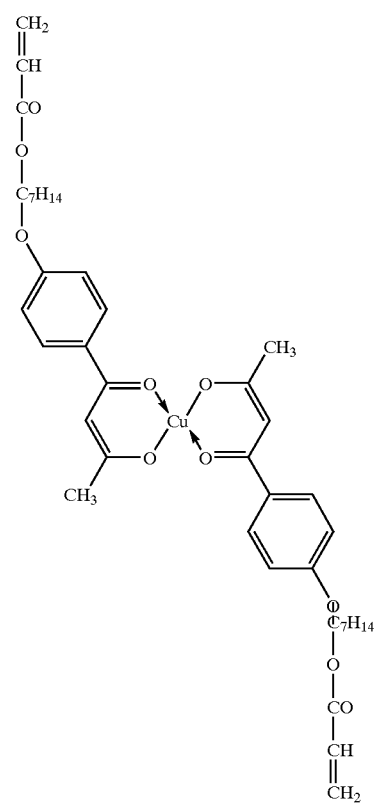
(N43)
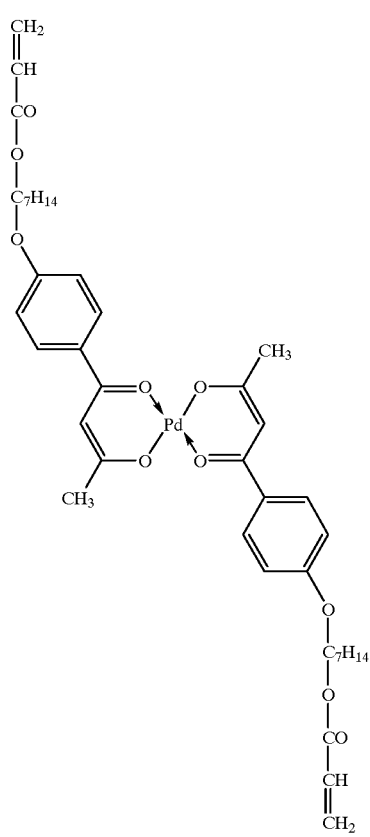
(N45)
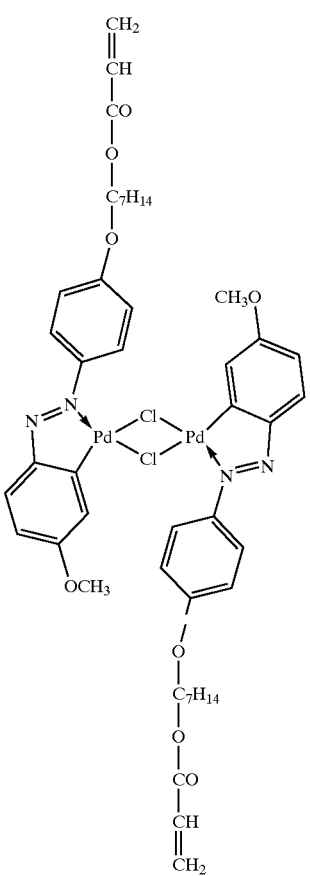

(N46)
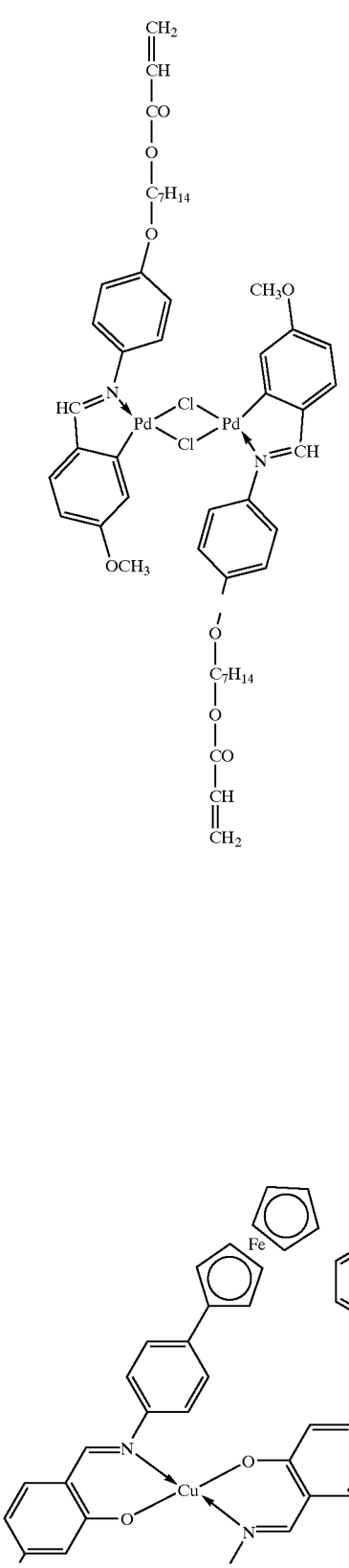
(N47)
(N48)
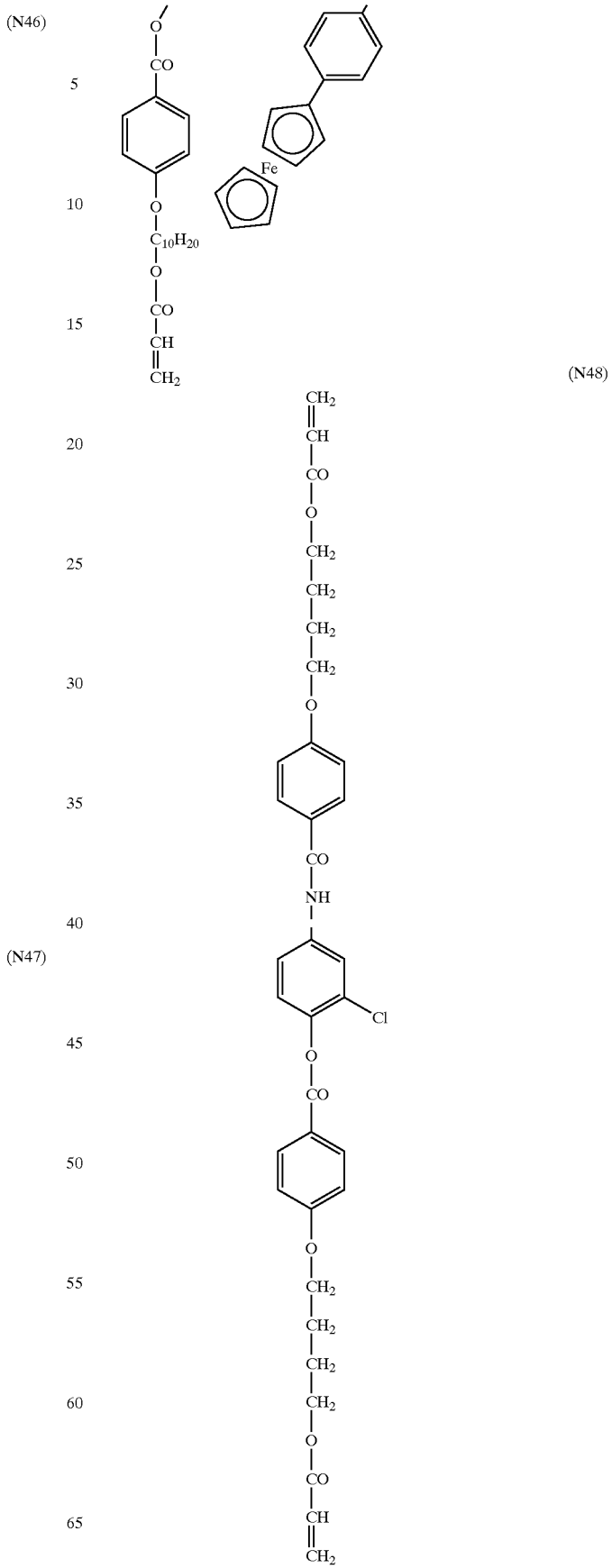

(N49)
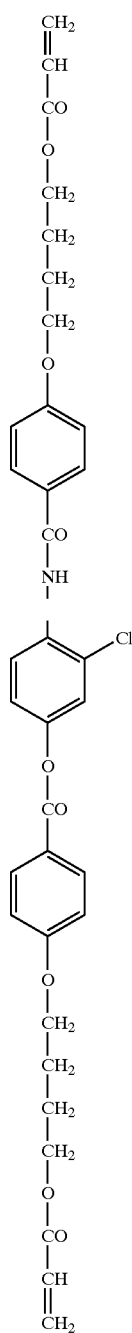
(N50)
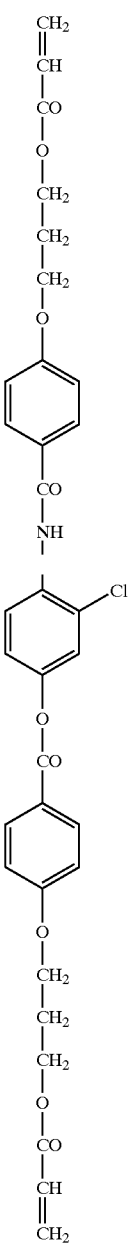

-continued
(N51)
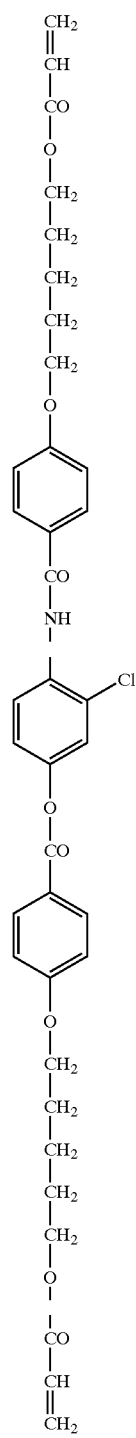
(N52)
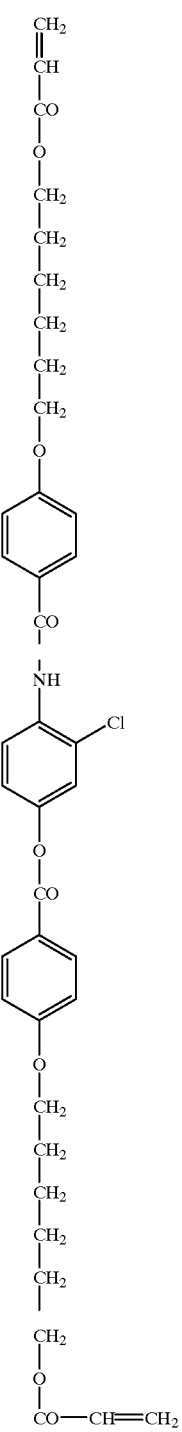

-continued
(N53)
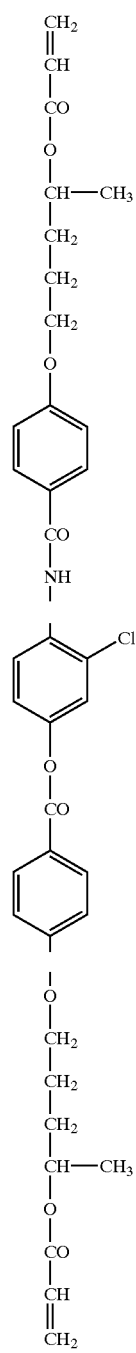
-continued
(N54)

(N55)
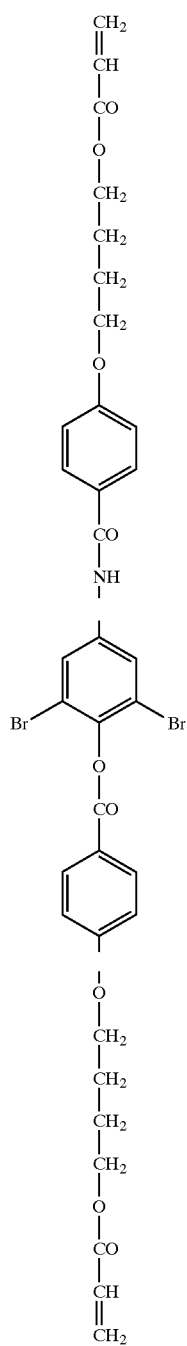
(N56)
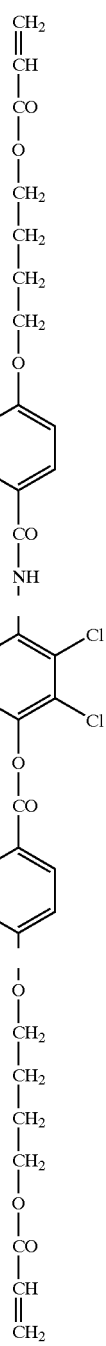

-continued
(N57)
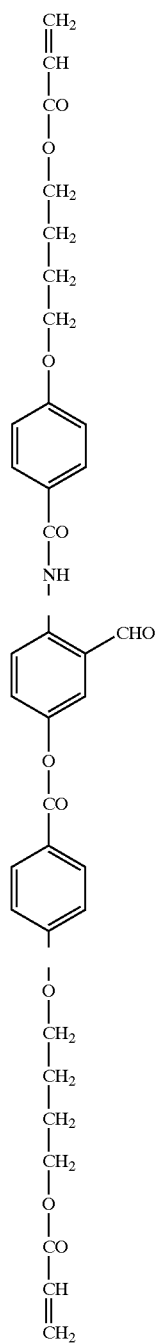
(N58)
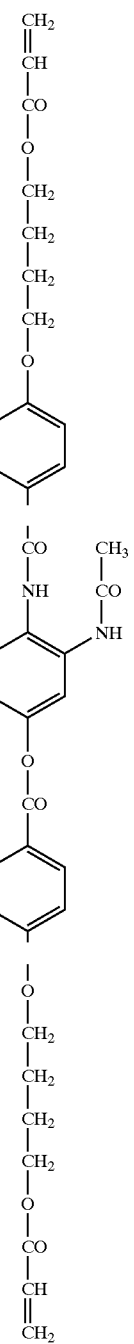

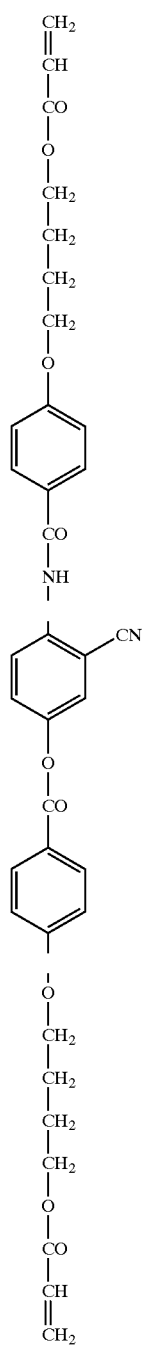 (N59)
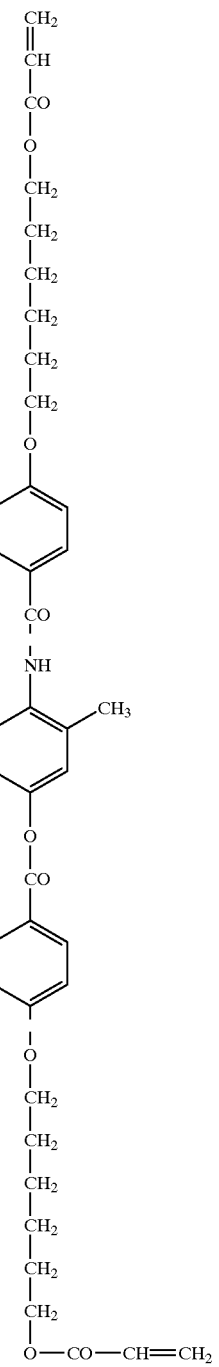 (N60)

-continued
(N61)
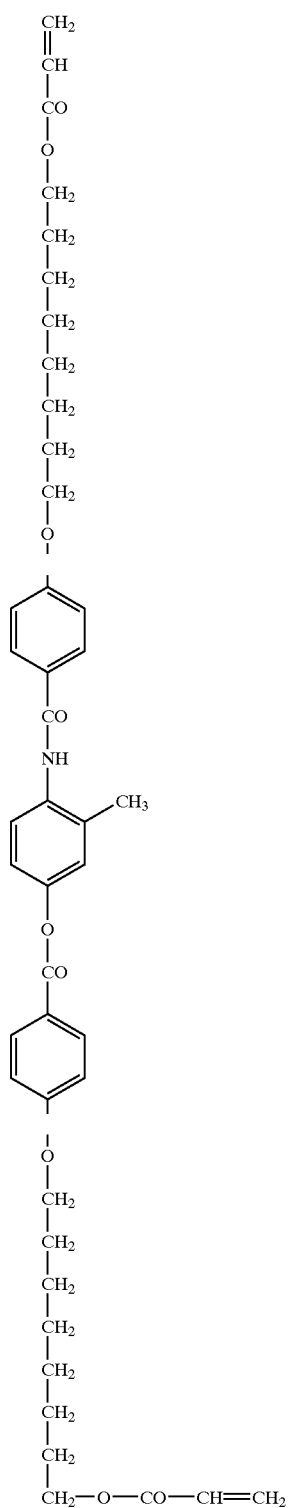
(N62)
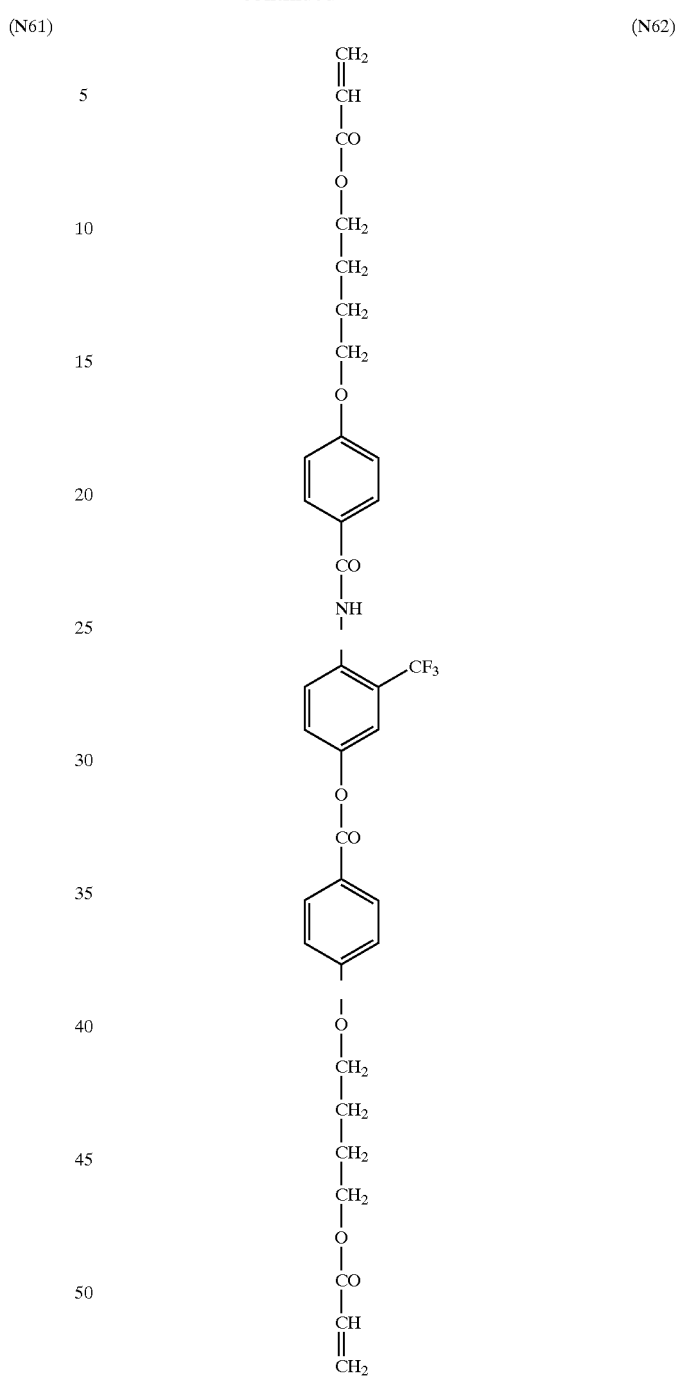

(N63)
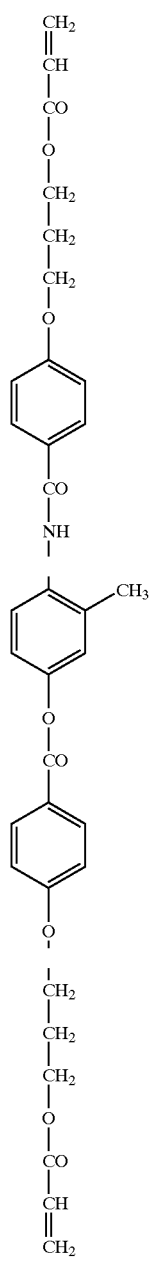
(N64)
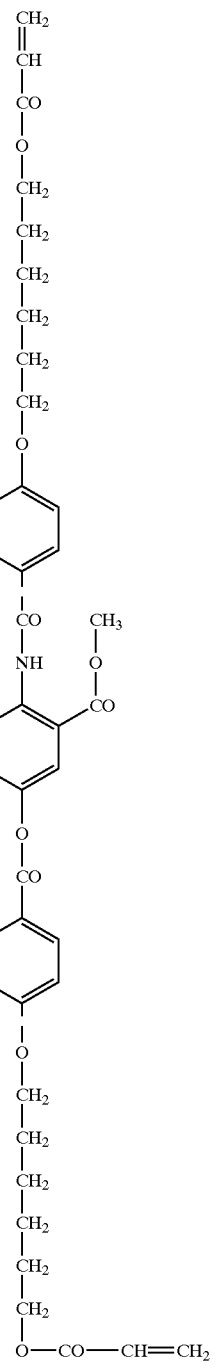

(N65)
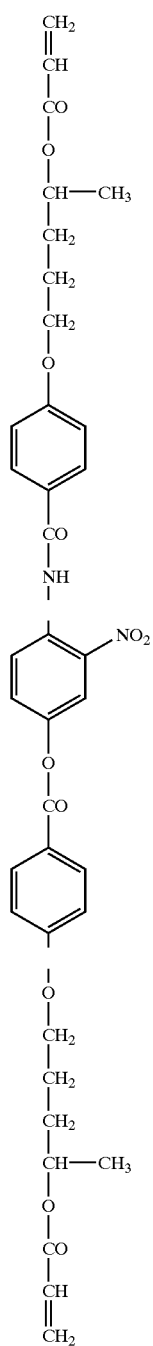
(N66)
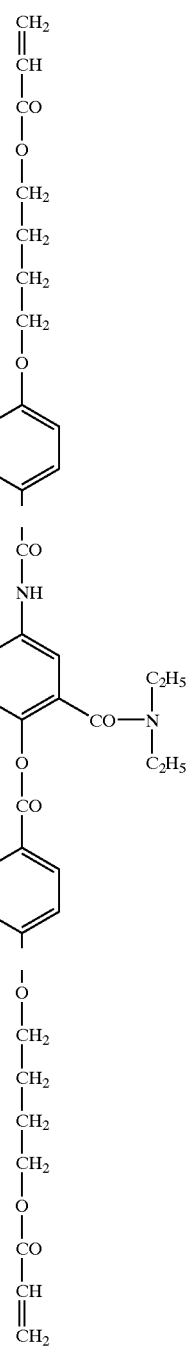

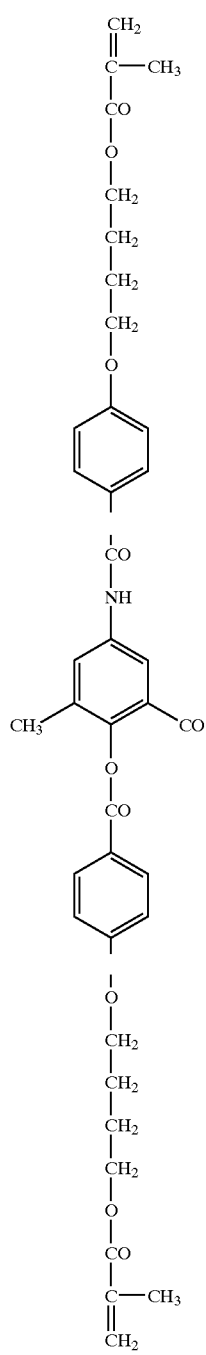 (N67)
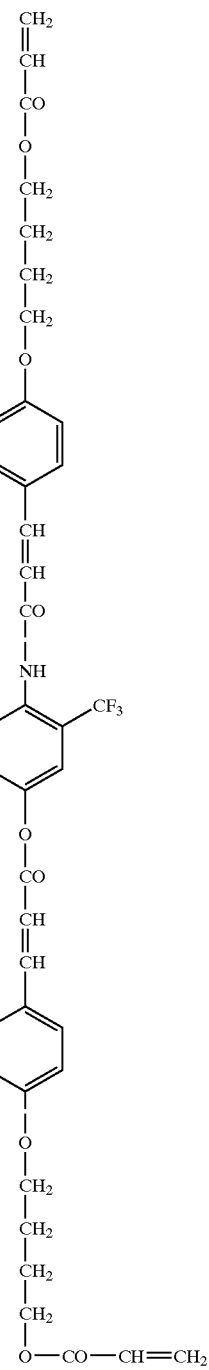 (N68)

(N69)
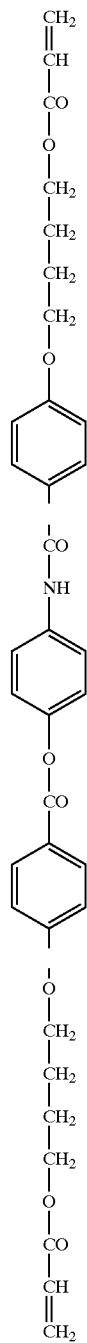
(N70)
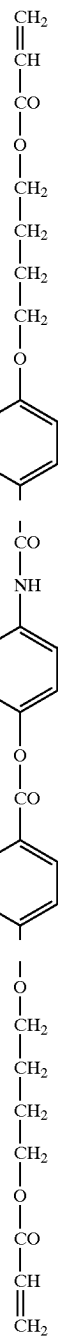

(N71)
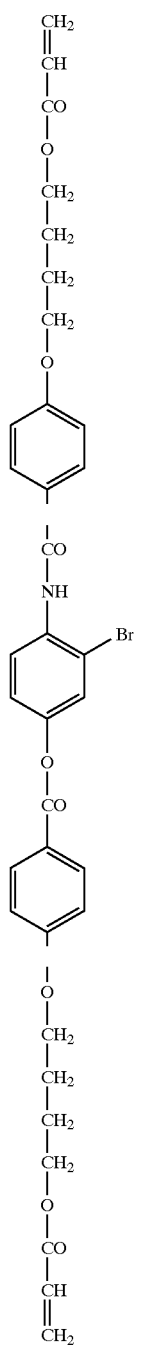
(N72)
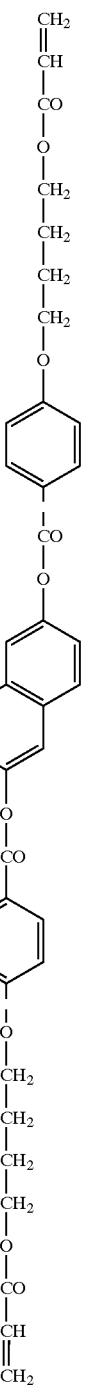

-continued (N73)

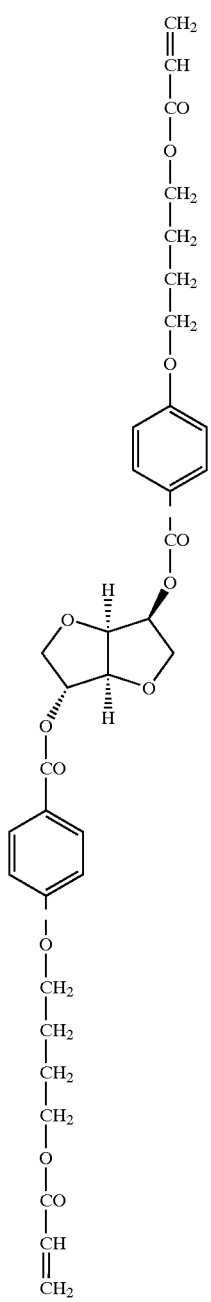

In addition to the liquid crystal molecules and the alignment promoter, the liquid crystal composition can contain, if needed, a solvent, a compound having an asymmetric carbon, a polymerization initiator (described below) and other additives (e.g., cellulose esters).

As the solvent, organic solvents are preferred. Examples of the organic solvents include amides (e.g., dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

[Optically Anisotropic Element]

The optically anisotropic element can be produced by applying the liquid crystal composition onto an orientation layer to form a liquid crystal layer. The composition can be coated according to a conventional coating method such as an extrusion coating method, a direct gravure coating method, a reverse gravure coating method, a die coating method or a bar coating method.

The liquid crystal molecules are preferably oriented by heating the liquid crystal layer on the orientation layer.

In the case that the alignment promoter contains a photosensitive group, the aligning direction can be controlled by applying light mono-directionally onto the liquid crystal layer after the liquid crystal molecules are oriented. The light includes X-rays, electron beams, ultraviolet rays, visible light and infrared rays (heat rays). Ultraviolet rays are particularly preferred. The wavelength of the ultraviolet rays is preferably different from that for the polymerization initiator (described below), and hence an optical filter absorbing the ultraviolet rays activating the polymerization initiator may be used.

Preferred light sources include a low pressure mercury lamps (germicidal lamp, fluorescent chemical lamp, black lamp), a high-pressure discharge lamp (high pressure mercury lamp, metal halide lamp) and a short-arc discharge lamp (extra-high pressure mercury lamp, xenon lamp, mercury xenon lamp).

For controlling the alignment, the light is applied onto the liquid crystal layer as mono-directionally as possible. The term "mono-directionally" means that the direction of light projecting onto the plane of the liquid crystal layer is kept unitary. The light may be applied horizontally or vertically to the plane.

The amount of light for exposure is in the range of preferably 50 to 6,000 mJ/cm$^2$, more preferably 100 to 2,000 mJ/cm$^2$. The light is preferably applied with the liquid crystal layer heated, and thereby the alignment can be controlled in a short time. The temperature for heating is preferably in the range of 40 to 250° C.

The liquid crystal molecules are preferably fixed while the alignment is maintained. The liquid crystal molecules are fixed preferably by a polymerization reaction of the polymerizable groups (Q). The polymerization reaction can be classified into a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with an ultraviolet ray.

The exposure energy is preferably in the range of 20 to 50,000 mJ per cm$^2$, and more preferably in the range of 100 to 800 mJ per cm². The light irradiation can be conducted while the layer is heated to accelerate the photo polymerization reaction.

The liquid crystal layer has a thickness preferably in the range of 0.1 to 50 μm, more preferably 1 to 30 μm, and most preferably in the range of 5 to 20 μm.

The amount of the alignment promoter in the liquid crystal layer is preferably in the range of 0.005 to 0.5 g/m², more preferably 0.01 to 0.45 g/m², further preferably 0.02 to 0.40 g/m², and most preferably 0.03 to 0.35 g/m².

In preparation of an optical compensatory sheet for a liquid crystal display of STN mode, discotic liquid crystal molecules in the optically anisotropic layer are aligned at an average inclined angle in the range of 50° to 90°. The inclined angle is preferably uniform. However, the inclined angle can be continuously changed along the thickness of the optical anisotropic layer.

The twist angle of the discotic liquid crystal molecules is preferably similar to a twist angle of a liquid crystal cell of an STN mode, which is usually in the range of 180° to 360°, and preferably in the range of 180° to 270°. The difference between the twist angles is preferably not larger than 10°. In the case that one optical compensatory sheet is used in a liquid crystal display, the twist angle of the discotic liquid crystal molecules is preferably in the range of 180° to 360°. In the case that two optical compensatory sheets are used in a liquid crystal display, the twist angle of the discotic liquid crystal molecules is preferably in the range of 90° to 180°. In a liquid crystal display of an STN mode, a wavelength dependency of the birefringence ($\Delta n(\lambda)$) of an optically anisotropic layer is preferably similar to a wavelength dependency of the birefringence of a liquid crystal cell of an STN mode.

The formed optically anisotropic layer is heated so that the discotic liquid crystal molecules may be arranged essentially in mono domain alignment at an average inclined angle in the range of 50° to 90°. The temperature in this heating process preferably satisfies the following formula (T1):

$$T_{NI}-0.5\times(T_{NI}-T_{CN})\leq T<T_{NI} \tag{T1}$$

In the formula, T is the temperature (° C) in the heating process; $T_{NI}$ is the nematic-isotropic transition temperature (° C.) of the discotic liquid crystal molecules, and $T_{CN}$ is the crystal-nematic transition temperature (° C) of the discotic liquid crystal molecules. In the case that a columnar phase appears, $T_{CN}$ is the crystal-columnar phase transition temperature (° C.).

It is more preferred for the temperature (T) to satisfy the following formula (T2), and further preferably it satisfies the following formula (T3).

$$T_{NI}-0.3\times(T_{NI}-T_{CN})\leq T<T_{NI} \tag{T2}$$

$$T_{NI}-0.2\times(T_{NI}-T_{CN})\leq T<T_{NI} \tag{T3}$$

The nematic-isotropic transition temperature ($T_{NI}$) and the crystal-nematic transition temperature ($T_{CN}$) depend on not only the used discotic liquid crystal molecules but also the other components of the optically anisotropic layer. Accordingly, before forming the optically anisotropic layer, the transition temperatures must be determined by a preliminary experiment with another optically anisotropic layer comprising the same components as the aimed layer. The layer for the preliminary experiment is heated and observed with a polarizing microscope to determine the transition temperatures.

[Orientation Layer]

The orientation layer can be formed by rubbing treatment of an organic compound (preferably a polymer), oblique evaporation of an inorganic compound, formation of a micro groove layer, or stimulation of an organic compound (e.g., ω-tricosanoic acid, dioctadecylmethylammonium chloride, methyl stearate) according to a Langmuir-Blodgett method. Further, the aligning function of the orientation layer can be activated by applying an electric or magnetic field to the layer or irradiating the layer with light. The orientation layer is preferably formed by rubbing a polymer. The rubbing treatment can be conducted by rubbing a layer containing the aforementioned polymer with paper or cloth several times along a certain direction.

The polymer for the orientation layer is determined according to the aimed alignment (particularly the aimed average inclined angle) of the liquid crystal molecules.

For aligning the liquid crystal molecules horizontally (in an average inclined angle of 0 to 50°), a polymer which does not lower the surface energy of the orientation layer (namely, a polymer usually used for the orientation layer) is preferred.

For aligning the liquid crystal molecules vertically (in an average inclined angle of 50 to 90°), a polymer which lowers the surface energy of the orientation layer is preferred. In order to lower the surface energy, a hydrocarbon group having 10 to 100 carbon atoms is preferably introduced to the side chain of the polymer.

Documents describing optical compensation sheets comprising the liquid crystal molecules for various display modes are known, and concrete examples of the polymer for each display mode are disclosed in these documents.

The orientation layer preferably has a thickness of 0.01 to 5 μm, more preferably 0.05 to 1 μm.

After the liquid crystal molecules are aligned by the orientation layer and fixed with the alignment maintained to form an optically anisotropic layer, the optically anisotropic layer can be transferred to a support. The aligned and fixed discotic liquid crystal molecules can keep the alignment without the orientation layer.

Alignment in an average inclined angle of less than 5° C. can be obtained without rubbing treatment nor the orientation layer. However, even in that case, an orientation layer which chemically combines with the liquid crystal molecules on the interface can be provided, so as to improve adhesion between the molecules and the support (Japanese Patent Provisional Publication No. 9(1997)-152509). Such orientation layer does not need the rubbing treatment.

In the case that two liquid crystal layers are provided on the same side of the transparent support, the layer beforehand provided on the support can function as the orientation layer for the other layer provided thereon.

In place of an orientation layer whose aligning function is given by rubbing treatment, an orientation layer whose aligning function is given by applying light monodirectionally may be used. Such orientation layer is made from photochromic compounds or photosensitive polymers.

A photochromic compound is a compound whose structure is changed by light and thereby whose behavior toward light (e.g., color) is changed. This change is generally reversible.

Examples of the photochromic compound for a liquid crystal cell include azobenzene compounds (disclosed in K. Ichimura et al., Langmuir, vol. 4, page 1214 (1988); K. Aoki et al., Langmuir, vol. 8, page 1007 (1992); Y. Suzuki et al., Langmuir, vol. 8, page 2601 (1992); K. Ichimura et al., Appl. Phys. Lett, vol. 63, No. 4, page 449 (1993); K. Ishizuki et al., Langmuir, vol. 9, page 3298 (1993); K. Ishizuki et al., Langmuir, vol. 9, page 857 (1993)), hydrazono-β-ketoester compounds (disclosed in S. Yamamura et al., Liquid Crystals, vol. 13, No. 2, page 189 (1993)), stilbene compounds (disclosed in K. Ichimura et al., Kobunshironbunshu (written in Japanese), vol. 47, No. 10, page 771 (1990)) and spiropyran compounds (disclosed in K. Ichimura et al., Chemistry Letters, page 1063 (1992); K. Ichimura et al., Thin Solid Films, vol. 235, page 101 (1993)).

The photochromic compound particularly preferably contains a double bond of C=C, C=N or N=N. The photochromic compound containing the double bond comprises the following essential parts (1) and (2) and the following optional parts (3) to (5).

(1) a double bond of C=C, C=N or N=N,
(2) rings which directly or indirectly connect to both sides of the double bond (1),
(3) an optional linking group between (1) and (2),
(4) an optional substituent group connecting to a carbon atom in the double bond (1), and
(5) an optional substituent group connecting to the rings (2).

The double bond (1) in trans-geometry is preferred to that in cis-geometry. The photochromic compound may have two or more double bonds, which are preferably conjugated.

Examples of the ring (2) include benzene ring, naphthalene ring and a nitrogen-containing heterocyclic ring (e.g., pyridinium ring, benzopyridinium ring). If the ring is a nitrogen-containing heterocyclic ring, a carbon (not nitrogen) atom in the ring preferably connects to a carbon or nitrogen atom of the double bond (1). The ring is preferably benzene ring.

Examples of the linking group (3) include —NH— and —CO—. However, the photochromic compound preferably has no linking group (3), and hence it is preferred for the double bond (1) to connect directly to the ring (2).

Examples of the substituent group (4) include an aryl group (e.g., phenyl) and cyano. However, the carbon atom in the double bond (1) preferably has no substituent group (namely, the carbon atom in the double bond (1) is preferably in the form of —CH=CH— or —CH=N—).

Examples of the substituent group (5) include an alkoxy group (e.g., methoxy, hexyloxy), cyano, an alkyl group (e.g., methyl, butyl, hexyl, cyclohexyl) and an alkylamino group (e.g., dimethylamino). In the case that the ring is benzene ring, the substituent group is preferably connected at the para-position. As described below, if the photochromic compound is chemically combined with polymer, functional groups for that chemical combination are introduced into the compound as the substituent groups (5).

The photochromic compound must be fixed on the surface of the support, and preferably is chemically combined with polymer to be fixed.

The polymer combined with the photochromic compound is preferably a hydrophilic polymer (e.g., gelatin, polyvinyl alcohol, poly(meth)acrylate). Polyvinyl alcohol is particularly preferred.

The reaction between the photochromic compound and the polymer is determined according to the kind of the polymer (particularly, the kind of the functional groups in the polymer). If the polymer has hydroxyl groups (e.g., if the polymer is polyvinyl alcohol), the reaction between acid halides and hydroxyl groups can be used.

Preferably, the polymer used for the orientation layer further has functional groups which align liquid crystal molecules essentially vertically (namely, which realize homogeneous alignment of discotic liquid crystal molecules or homeotropic alignment of rod-like liquid crystal molecules).

For aligning the liquid crystal molecules essentially vertically, it is important to lower the surface energy of the orientation layer. The surface energy is practically lowered by functional groups in the polymer so as to stand the liquid crystal molecules. A hydrocarbon group having 10 to 100 carbon atoms is effective in lowering the surface energy. The hydrocarbon group is preferably introduced to the side chain of the polymer in order to settle on the surface of the orientation layer.

The hydrocarbon group is an aliphatic group, an aromatic group or a combination thereof. The aliphatic group may have a cyclic, branched or straight chain structure, and is preferably an alkyl group (including a cycloalkyl group) or an alkenyl group (including an cycloalkenyl group). The hydrocarbon group may have a substituent group not showing strong hydrophilic property (such as a halogen atom). The hydrocarbon group has preferably 10 to 100 carbon atoms, more preferably 10 to 60 carbon atoms, and most preferably 10 to 40 carbon atoms.

The main chain of the polymer preferably has a polyvinyl alcohol structure.

A denatured polyvinyl alcohol comprising a hydrocarbon group having 10 or more carbon atoms can align discotic liquid crystal molecules essentially vertically (homogeneously). The hydrocarbon group is an aliphatic group, an aromatic group or a combination thereof. The aliphatic group may have a cyclic, branched or straight chain structure, and is preferably an alkyl group (including a cycloalkyl group) or an alkenyl group (including an cycloalkenyl group). The hydrocarbon group may have a substituent group not showing strong hydrophilic property (such as a halogen atom). The hydrocarbon group has preferably 10 to 100 carbon atoms, more preferably 10 to 60 carbon atoms, and most preferably 10 to 40 carbon atoms.

The denatured polyvinyl alcohol contains a repeating unit comprising the hydrocarbon group having 10 or more carbon atoms in an amount of preferably 2 to 80 mol %. more preferably 3 to 70 mol %.

The denatured polyvinyl alcohol is preferably represented by the following formula (PV):

-(VAL)$_x$-(HyC)$_y$-(VAc)$_z$-(Pc)$_q$- (PV)

in which VAL is a repeating unit of vinyl alcohol; HyC is a repeating unit comprising a hydrocarbon group having 10 or more carbon atoms; VAc is a repeating unit of vinyl acetate; Pc is a repeating unit chemically combined with a photochromic compound; x represents 20 to 95 mol % (preferably 25 to 90 mol %); y represents 0 to 80 mol % (preferably 2 to 70 mol %); z represents 0 to 30 mol % (preferably 2 to 20 mol %); and q represents 0 to 30 mol % (preferably 2 to 20 mol %).

The repeating unit (HyC) comprising a hydrocarbon group having 10 or more carbon atoms is preferably represented by the following formula (HyC-I) or (HyC-II).

(HyC-I)

-continued

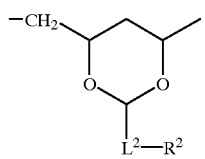
(HyC-II)

in which L¹ is a divalent linking group selected from the group consisting of —O—, —CO—, —SO$_2$—, —NH—, an alkylene group, an arylene group and a combination thereof; L² is a single bond or a divalent linking group selected from the group consisting of —O—, —CO—, —SO$_2$—, —NH—, an alkylene group, an arylene group and a combination thereof; and each of R¹ and R² is independently a hydrocarbon group having 10 or more carbon atoms.

Examples of the combined divalent linking group are shown below.

| | |
|---|---|
| L201: | —O—CO— |
| L202: | —O—CO-alkylene-O— |
| L203: | —O—CO-alkylene-CO—NH— |
| L204: | —O—CO-alkylene-NH—SO$_2$-arylene-O— |
| L205: | -arylene-NH—CO— |
| L206: | -arylene-CO—O— |
| L207: | -arylene-CO—NH— |
| L208: | -arylene-O— |
| L209: | —O—CO—NH-arylene-NH—CO— |

The repeating unit (Pc) chemically combined with a photochromic compound is preferably represented by the following formula (Pc-I) or (Pc-II).

(Pc-I)

-CH$_2$-CH-
       |
       L¹-Z¹

(Pc-II)

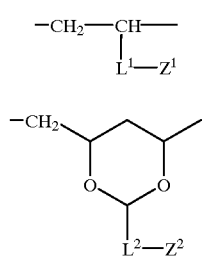

in which L¹ is a divalent linking group selected from the group consisting of —O—, —CO—, —SO$_2$—, —NH—, an alkylene group, an arylene group and a combination thereof; L² is a single bond or a divalent linking group selected from the group consisting of —O—, —CO—, —SO$_2$—, —NH—, an alkylene group, an arylene group and a combination thereof; and each of Z¹ and Z² is independently a monovalent photosensitive group derived from a photochromic compound.

Examples of the combined divalent linking group are the same as those for (HyC-I) and (HyC-II).

Examples of the monovalent photosensitive group (Z¹ or Z²) derived from a photochromic compound are shown below.

(Z-1)
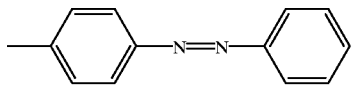

(Z-2)
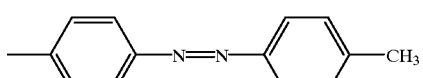

(Z-3)
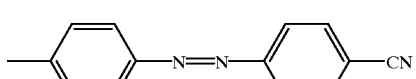

(Z-4)
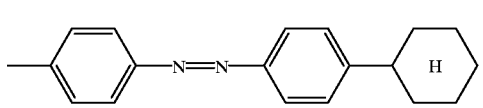

(Z-5)
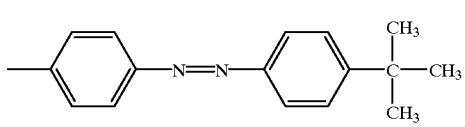

(Z-6)
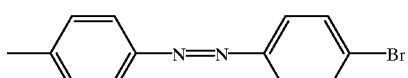

(Z-7)
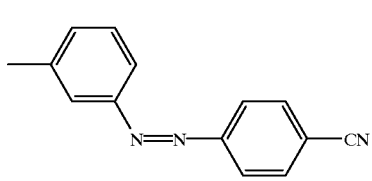

(Z-8)
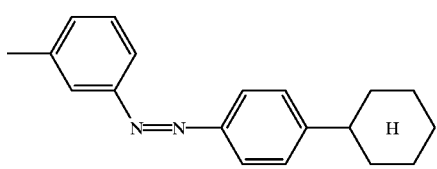

(Z-9)
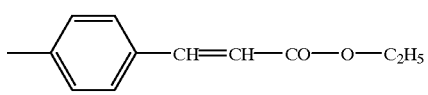

-continued (Z-10)
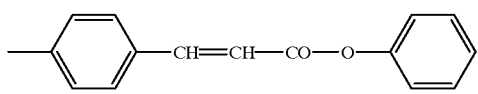

(Z-11)
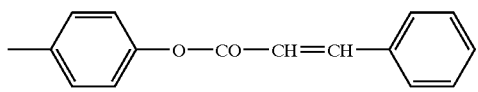

(Z-12)
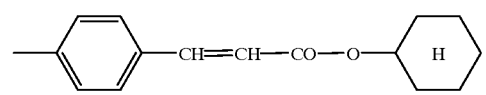

The polymerization degree of the polymer used in the orientation layer formed by light irradiation is preferably in the range of 200 to 5,000, more preferably in the range of 300 to 3,000. The molecular weight of the polymer is preferably in the range of 9,000 to 200,000, more preferably in the range of 13,000 to 130,000.

Two or more kinds of polymers may be used in combination.

If parallel rays are obliquely applied onto the liquid crystal layer with the layer heated, both of the aligning function of the orientation layer and the function of the alignment promoter are activated to align the liquid crystal molecules homogeneously. In that case, the aligning function is activated on both interfaces (the interface facing the orientation layer and the opposite interface facing air) by obliquely applying the identical rays, and hence the liquid crystal molecules placed between the interfaces are homogeneously aligned in the same inclined angles.

[Transparent Support]

The optically anisotropic element may have a transparent support, which is a glass plate or a polymer film. The support is preferably made of a polymer film. Here the term "transparent" means that light transmittance is not less than 80%.

Usually, an optically isotropic polymer film is used as the support. The term "optically isotropic" means that a retardation in plane (Re) of the film is preferably less than 10 nm, and more preferably less than 5 nm. In the optically isotropic transparent support, retardation along a thickness direction (Rth) is also preferably less than 10 nm, more preferably less than 5 nm. The Re and Rth retardation values are defined by the following formulas:

$Re=(nx-ny)\times d$ $Rth=[\{(nx+ny)/2\}-nz]\times d$ in which each of nx and ny is a refractive index in plane; nz is a refractive index along a thickness direction; and d is a thickness of a transparent support.

In some cases, an optically anisotropic polymer film is used as the support. If so, the support is preferably an optically uniaxial or biaxial. The uniaxial support may be either optically positive (i.e., the refractive index parallel to the optical axis is larger than that vertical to the axis) or optically negative (i.e., the refractive index parallel to the optical axis is smaller than that vertical to the axis). If the support is optically biaxial, the indexes nx, ny and nz are different from each other (i.e., nx≠ny≠nz).

The Re (retardation in plane) of the optically anisotropic support is preferably in the range of 10 to 1,000 nm, more preferably 15 to 300 nm, most preferably 20 to 200 nm. The Rth (retardation along a thickness direction) is preferably in the range of 10 to 1,000 nm, more preferably 15 to 300 nm, most preferably 20 to 200 nm.

Material for the support is determined according to whether the support is optically isotropic or not. The optically isotropic support is generally made of glass or cellulose ester, and in contrast the optically anisotropic support generally made of synthetic polymers (e.g., polycarbonate, polysulfone, polyethersulfone, polyacrylate, polymethacrylate and norbornene resin). Further, an optically anisotropic cellulose ester film (having high retardation values) can be also used. The optically anisotropic cellulose ester film can be prepared by (1) using a retardation increasing agent, (2) lowering the content of acetic acid in cellulose acetate or (3) using the cooling dissolution method (described in European Patent No. 0,911,656 A2).

The support of polymer film is preferably formed by a solvent casting method.

For preparing the optically anisotropic support, a polymer film is preferably stretched.

The optically uniaxial support is preferably produced by usual uniaxial or biaxial stretching.

On the other hand, the optically biaxial support is preferably produced by unbalance biaxial stretching. The procedure of unbalance biaxial stretching comprises the steps of stretching a film along one direction to expand by a certain extent (e.g., 3 to 100%, preferably 5 to 30%) and then stretching the film vertically to the direction of the first stretching to expand by a more extent than that in the first stretching (e.g., 6 to 200%, preferably 10 to 90%). In the procedure, the film may be stretched along the two vertical directions at the same time.

The direction of stretching (direction of high extension in the case of unbalance biaxial stretching) is preferably essentially parallel to the slow axis in plane of the stretched film. Here "essentially parallel" means that the angle between the stretching direction and the slow axis is preferably in the range of less than 10°, more preferably less than 5°, most preferably less than 3°.

The transparent support has a thickness preferably in the range of 10 to 500 μm, and more preferably in the range of 50 to 200 μm.

The transparent support can be subjected to a surface treatment (e.g., glow discharge treatment, corona discharge treatment, ultraviolet (UV) treatment, flame treatment) to improve adhesion to a layer formed on the support (e.g., adhesive layer, orientation layer, optically anisotropic layer). The support may contain UV absorber.

An adhesive layer (undercoating layer) can be provided on the transparent support. Japanese Patent Provisional Publication No. 7(1995)-333433 describes the adhesive layer. The adhesive layer has a thickness preferably in the range of 0.1 to 2 μm, more preferably 0.2 to 1 μm.

[Liquid Crystal Display]

The optically anisotropic element can be used as an optical compensatory sheet for liquid crystal displays of various modes. Examples of the display modes include TN (twisted nematic) mode, IPS (in plane switching) mode, FLC (ferroelectric liquid crystal) mode, OCB (optically compensatory bend) mode, STN (super twisted nematic) mode, VA (vertically aligned) mode, ECB (electrically controlled birefringence) mode and HAN (hybrid aligned nematic) mode. Optical compensatory sheets for these modes are known, and the optically anisotropic element of the invention can be applied for these optical compensatory sheets.

EXAMPLE 1

A commercially available polyimide orientation layer (LX-1400, Hitachi Chemical Du pont) was formed on a glass plate, and subjected to a rubbing treatment.

The compound (27) was added to the rod-like liquid crystal molecule (N26) in an amount (concentration) set forth in Table 1. The mixture was diluted with chloroform to about 15 wt. %. The diluted mixture was dropped on the orientation layer, and spin-coated at a rotating rate set forth in Table 1. The glass plate was placed on a hot plate at 120° C. The alignment (initial orientation) of the rod-like liquid crystal molecule was observed with a polarizing microscope.

The temperature at which the mixture is isotropic (iso point) was measured. The mixture was heated at a temperature of higher than the iso point, and the alignment at 120° C. (heated orientation) of the rod-like liquid crystal molecule was observed with a polarizing microscope.

The results are set forth in Table 1.

TABLE 1

| Amount | Iso | 1,000 rpm | | 300 rpm | |
|---|---|---|---|---|---|
| of (27) | point | Initial | Heated | Initial | Heated |
| None | 164.9° C. | Dual | Dual | — | — |
| 0.023% | 164.9° C. | Dual | Mono | Island | Mono |
| 0.047% | 165.0° C. | Dual* | Mono | Mono | Mono |
| 0.17% | 164.7° C. | Mono** | Mono** | — | — |
| 0.49% | 164.2° C. | Mono** | Mono** | — | — |
| 0.98% | 163.5° C. | Mono*** | Mono*** | — | — |
| 4.96% | 163.5° C. | Mono*** | Mono*** | — | — |
| 11.2% | 163.4° C. | Mono*** | Mono*** | — | — |

(Remark)
— The experiment was not conducted.
Dual Dual domains (island-like reverse tilt domains) were caused, the liquid crystal was tilted at the air side, and oriented at a hybrid alignment along a thickness direction.
Mono The liquid crystal was aligned without causing reverse tilt domains, horizontally aligned at the air side, and oriented homogeneously (mono domains) along a thickness direction.
*Alignment was partially changed to the mono domains.
**Wettability was changed (improved at a high temperature).
***Circular phase separations (circular isotropic areas having a diameter of 20 to 300 μm) were observed

EXAMPLE 2

The compound (28), (29), (30), (31), (32), (33), (34), (35) or (36) was added to the rod-like liquid crystal molecule (N26) in an amount of 1 wt. % based on the amount of the liquid crystal molecule (N26). The mixture was diluted with chloroform to about 15 wt. %. The diluted mixture was dropped on the orientation layer prepared in Example 1, and spin-coated at a rotating rate of 1,000 rpm. The glass plate was placed on a hot plate at 120° C. The alignment (initial orientation) of the rod-like liquid crystal molecule was observed with a polarizing microscope.

In each of the samples, the liquid crystal was aligned without causing reverse tilt domains, horizontally aligned at the air side, and oriented homogeneously (mono domains) along a thickness direction. Further, the coating characteristics (particularly wettability) were improved by using the compound (28), (29), (30), (31), (32), (33), (34), (35) or (36).

COMPARISON EXAMPLE 1

The following comparative compound (R), (S), (T), (U) or (V) was added to the rod-like liquid crystal molecule (N26) in an amount of 1 wt. % based on the amount of the liquid crystal molecule (N26). The mixture was diluted with chloroform to about 15 wt. %. The diluted mixture was dropped on the orientation layer prepared in Example 1, and spin-coated at a rotating rate of 1,000 rpm. The glass plate was placed on a hot plate at 120° C. for 1 minute. The alignment (initial orientation) of the rod-like liquid crystal molecule was observed with a polarizing microscope.

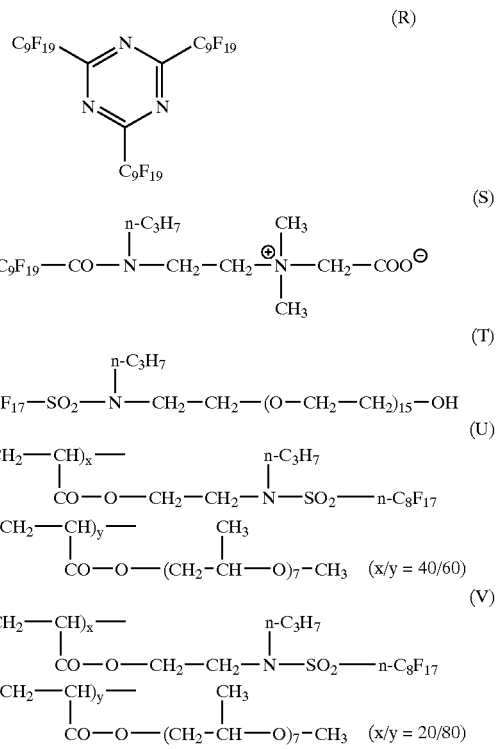

In each of the samples, island-like reverse tilt domains were observed. Further, the coating characteristics (particularly wettability) were degraded by using the compound (R), (S), (T), (U) or (V).

EXAMPLE 3

A sample in which the compound (27) was not added was prepared in the same manner as in Example 1. The retardation of the sample measured at 546 nm according to a senarmon method was 274 nm.

The compound (27) was added to the rod-like liquid crystal molecule (N26) in an amount of 1 wt. % based on the amount of the liquid crystal molecule (N26). The mixture was diluted with chloroform to about 15 wt. %. The diluted mixture was dropped on the orientation layer prepared in Example 1, and spin-coated at a rotating rate of 1,000 rpm. The glass plate was placed on a hot plate at 120° C. for 1 minute. The alignment (initial orientation) of the rod-like liquid crystal molecule was observed with a polarizing microscope. As a result, the liquid crystal was aligned without causing reverse tilt domains, horizontally aligned at the air side, and oriented homogeneously (mono domains) along a thickness direction. The retardation of the sample measured at 546 nm was 388 nm. Further, the coating characteristics were improved by using the compound (27).

Separately, the compound (45) was added to the rod-like liquid crystal molecule (N26) in an amount of 1 wt. % based on the amount of the liquid crystal molecule (N26). The mixture was diluted with chloroform to about 15 wt. %. The diluted mixture was dropped on the orientation layer prepared in Example 1, and spin-coated at a rotating rate of 1,000 rpm. The glass plate was placed on a hot plate at 120° C. for 1 minute. The alignment (initial orientation) of the rod-like liquid crystal molecule was observed with a polarizing microscope. As a result, the liquid crystal was aligned without causing reverse tilt domains, horizontally aligned at the air side, and oriented homogeneously (mono domains) along a thickness direction. The retardation of the sample measured at 546 nm was 546 nm. Further, the coating characteristics were improved by using the compound (45).

EXAMPLE 4

A commercially available non-polymerizable liquid crystal composition (ZLI-1132, Merck & Co., Ink.) was dropped on the orientation layer prepared in Example 1, and spin-coated at a rotating rate of 2,000 rpm. The alignment (initial orientation) of the rod-like liquid crystal molecule was observed with a polarizing microscope at room temperature. As a result, island-like reverse tilt domains were caused, the liquid crystal was tilted at the air side, and oriented at a hybrid alignment along a thickness direction.

Separately, the compound (27), (29), (31), (34) or (36) was added to the non-polymerizable liquid crystal composition in an amount of 1 wt. % based on the amount of the composition. The mixture was dropped on the orientation layer prepared in Example 1, and spin-coated at a rotating rate of 2,000 rpm. The alignment (initial orientation) of the rod-like liquid crystal molecule was observed with a polarizing microscope at room temperature. As a result, the liquid crystal was aligned without causing reverse tilt domains, horizontally aligned at the air side, and oriented homogeneously (mono domains) along a thickness direction. Further, the coating characteristics were improved by using the compound (27), (29), (31), (34) or (36).

EXAMPLE 5

The compound (30) was added to the rod-like liquid crystal molecule (N26) in an amount of 0.2 wt. % based on the liquid crystal molecule (N26). Further, a commercially available polymerization initiator (Irgacure 907, Ciba-Geigy) was added to the mixture in an amount of 3 wt. % based on the molecule (N26). The mixture was diluted with chloroform to about 10 wt. %. The diluted mixture was dropped on the orientation layer prepared in Example 1, and spin-coated at a rotating rate of 2,500 rpm. The sample was heated at 120° C. for 1 minute. The alignment (initial orientation) of the rod-like liquid crystal molecule was observed with a polarizing microscope. As a result, the liquid crystal was aligned without causing-reverse tilt domains, horizontally aligned at the air side, and oriented homogeneously (mono domains) along a thickness direction.

The sample was exposed to ultraviolet light of 300 mJ/cm² using a high-pressure mercury lamp in an atmosphere of nitrogen while heated at 120° C. to polymerize the rod-like liquid crystal molecules. Thus an optically anisotropic element was produced.

The retardation values based on the viewing angles were measure. The results are set forth in FIG. 5.

Figure 5:
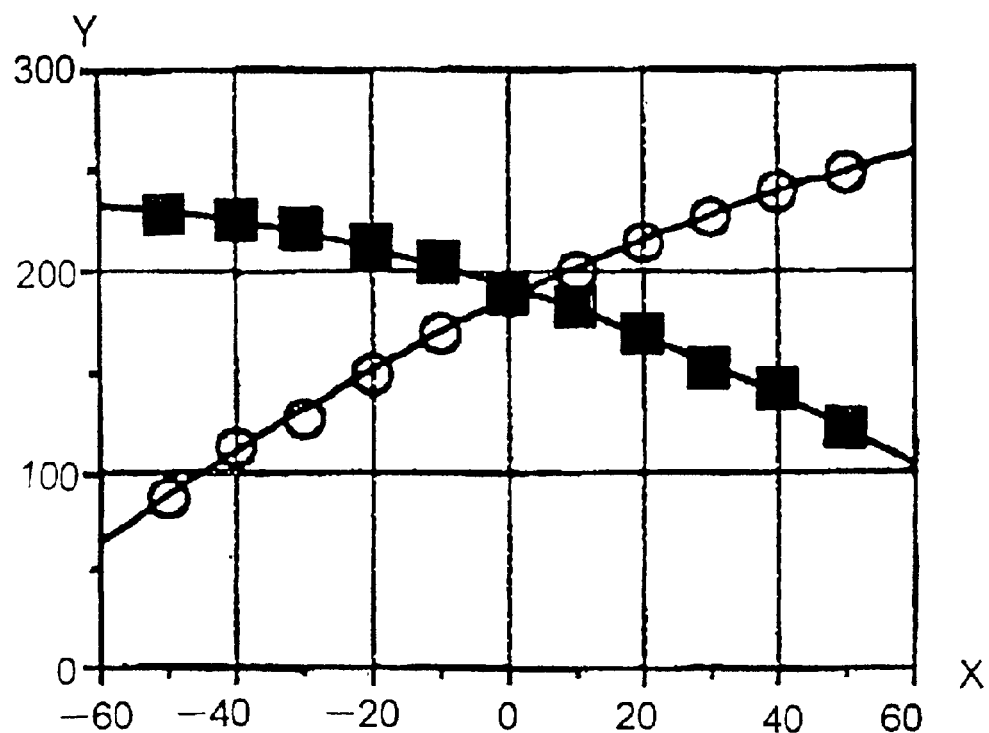
FIG. 5 is a graph showing retardation values of the optically anisotropic element prepared in Comparison Example 2 measured at various viewing angles.

The axis of X in FIG. 5 means an incident angle of the light based on the normal line of the plate as 0°. The axis of Y means the retardation measured at the wavelength of 546 nm. The black squares in FIG. 5 mean values measured along a direction perpendicular to the rubbing direction. The white circles in FIG. 5 mean values measured along a direction parallel to the rubbing direction. The rotating axis of each of the directions is present in a plane of the plate.

As is shown in FIG. 5, the optical axis of the optically anisotropic element is parallel to the rubbing direction, which means that the fixed liquid crystal molecules were homogeneously aligned.

EXAMPLE 6

The compound (30) was added to the rod-like liquid crystal molecule (N72) in an amount of 0.2 wt. % based on the liquid crystal molecule (N72). Further, a commercially available polymerization initiator (Irgacure 907, Ciba-Geigy) was added to the mixture in an amount of 3 wt. % based on the molecule (N72). The mixture was diluted with chloroform to about 10 wt. %. The diluted mixture was dropped on the orientation layer prepared in Example 1, and spin-coated at a rotating rate of 2,500 rpm. The sample was heated at 120° C. for 1 minute. The alignment (initial orientation) of the rod-like liquid crystal molecule was observed with a polarizing microscope. As a result, the liquid crystal was aligned without causing reverse tilt domains, horizontally aligned at the air side, and oriented homogeneously (mono domains) along a thickness direction.

Only the rod-like liquid crystal molecule (N72) shows a nematic phase at 131 to 235° C.

The sample was exposed to ultraviolet light of 300 mJ/cm² using a high-pressure mercury lamp in an atmosphere of nitrogen while heated at 120° C. to polymerize the rod-like liquid crystal molecules. Thus an optically anisotropic element was produced.

The retardation values based on the viewing angles were measure. The results are set forth in FIG. 6.

The axis of X in FIG. 6 means an incident angle of the light based on the normal line of the plate as 0°. The axis of Y means the retardation measured at the wavelength of 546 nm. The black squares in FIG. 6 mean values measured along a direction perpendicular to the rubbing direction. The white circles in FIG. 6 mean values measured along a direction parallel to the rubbing direction. The rotating axis of each of the directions is present in a plane of the plate.

As is shown in FIG. 6, the optical axis of the optically anisotropic element is parallel to the rubbing direction, which means that the fixed liquid crystal molecules were homogeneously aligned.

COMPARISON EXAMPLE 2

A commercially available polymerization initiator (Irgacure 907, Ciba-Geigy) was added to the liquid crystal molecule (N72) in an amount of 3 wt. % based on the molecule (N72). The mixture was diluted with chloroform to about 10 wt. %. The diluted mixture was dropped on the orientation layer prepared in Example 1, and spin-coated at a rotating rate of 1,000 rpm. The sample was heated at 120° C. for 1 minute. The alignment (initial orientation) of the rod-like liquid crystal molecule was observed with a polarizing microscope. As a result, reverse tilt domains were observed.

The sample was exposed to ultraviolet light of 300 mJ/cm² using a high-pressure mercury lamp in an atmosphere of nitrogen while heated at 120° C. to polymerize the rod-like liquid crystal molecules. Thus an optically anisotropic element was produced.

The retardation values based on the viewing angles were measure. The results are set forth in FIG. 7.

The axis of X in FIG. 7 means an incident angle of the light based on the normal line of the plate as 0°. The axis of Y means the retardation measured at the wavelength of 546 nm. The black squares and white circles in FIG. 7 mean values measured in different domains of different tilted directions.

As is shown in FIG. 7, the fixed liquid crystal molecules were oriented as a hybrid alignment in which the tilted directions were different in different domains.

EXAMPLE 7

The following liquid crystal composition was prepared while heating. The composition was dropped on the orientation layer prepared in Example 1, and spin-coated at a rotating rate of 500 rpm. The sample was heated at 130° C. for 1 minute. The alignment (initial orientation) of the rod-like liquid crystal molecule was observed with a polarizing microscope. As a result, the liquid crystal was aligned without causing reverse tilt domains, and uniformly oriented in a twisted alignment.

| Liquid crystal composition | |
| --- | --- |
| The rod-like liquid crystal molecule (N73) | 0.32 weight part |
| The rod-like liquid crystal molecule (N26) | 50 weight parts |
| The rod-like liquid crystal molecule (N72) | 50 weight parts |
| The compound (30) | 0.2 weight parts |
| Polymerization initiator (Irgacure 907, Ciba-Geigy) | 3 weight parts |
| Chloroform | 400 weight parts |

The sample was exposed to ultraviolet light of 300 mJ/cm² using a high-pressure mercury lamp in an atmosphere of nitrogen while heated at 130° C. to polymerize the rod-like liquid crystal molecules. Thus an optically anisotropic element was produced.

The thickness of the liquid crystal layer was 5.3 μm, the retardation measured at the wavelength of 550 nm was 860 nm, and the twisted angle of the liquid crystal molecule was 240°.

EXAMPLE 8

A cellulose triacetate film (thickness: 100 μm, size: 270 mm×100 mm, FUJI TAC, Fuji Photo Film Co., Ltd.) was used as a transparent support.

The polyimide shown below was dissolved in a mixed solvent of N-methyl-2-pyrrolidone and 2-butanone in the amount of 5 wt. %. The prepared solution was applied on the transparent support by using a bar coater. After the applied solution was dried with blowing air at 80° C. for 10 minutes, the surface of the formed layer was subjected to a rubbing treatment to form an orientation layer.

(Repeating Unit of Polyimide)

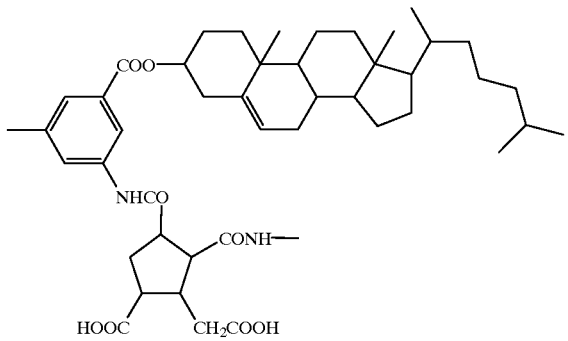

The orientation layer was coated with the coating solution having the following components according to the extrusion coating method. By heating the applied solution at 130° C., discotic liquid crystal molecules were aligned.

| Coating solution | |
| --- | --- |
| The following discotic liquid crystal molecule (1) | 100 weight parts |
| The compound (32) | 5.0 weight parts |
| A photopolymerization initiator (Irgacure 907, Ciba-Geigy) | 0.2 weight part |
| 2-butane | 185 weight parts |

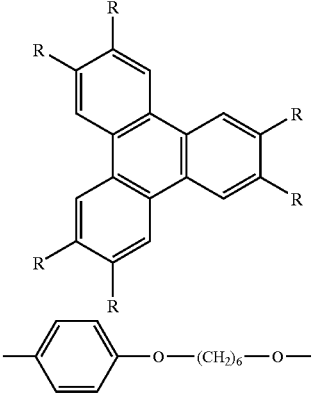

R: —O—CO—⟨⟩—O—$(CH_2)_6$—O—CO—CH=$CH_2$

Discotic liquid crystal molecule (1)

The formed layer was exposed to ultraviolet light for 4 seconds while heated at 130° C., to polymerize the terminal vinyl group of the discotic liquid crystal molecules and to fix the alignment. Thus an optically anisotropic element was produced.

The retardation in plane (Re) of the element was measured to obtain the angel dependency of Re, from which the average inclined angle of the discotic liquid crystal molecules was determined 89°. Further, the alignment of the discotic liquid crystal molecules was observed by means of a polarizing microscope, and thereby it was confirmed that all the molecules were uniformly oriented in monodomain alignment without any defect.

EXAMPLE 9

(Production of Optical Compensatory Sheet)

A cellulose triacetate film (thickness: 100 μm, size: 270 mm×100 mm, Fuji Tac, Fuji Photo Film Co., Ltd.) was used as a transparent support.

The following acrylic acid copolymer and triethylamine was dissolved in a mixed solvent of methanol and water to prepare 5 wt. % solution. The weight ratio of triethylamine to the acrylic acid copolymer was 20 wt. %, and the volume ratio of methanol/water was 30/70. The prepared solution was applied on the transparent support by using a bar coater to form a layer having a thickness of 1 μm. After the applied solution was dried with blowing air at 100° C. for 10 minutes, the surface of the formed layer was subjected to a rubbing treatment to form an orientation layer.

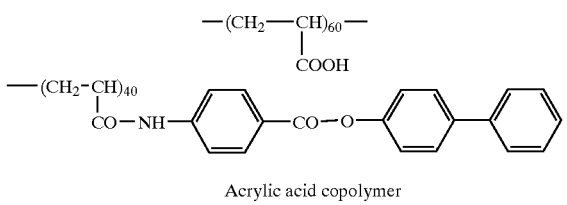

Acrylic acid copolymer

The orientation layer was coated with the coating solution having the following components according to the extrusion coating method. By heating the applied solution at 130° C., discotic liquid crystal molecules were aligned.

| Coating solution | |
|---|---|
| The following discotic liquid crystal molecule (2) | 91 weight parts |
| The following chiral agent | 2.0 weight parts |
| The compound (32) | 1.0 weight parts |
| The following polymerizable plasticizer | 9.0 weight parts |
| The following photopolymerization initiator | 3.0 weight parts |
| Methyl ethyl ketone | 120 weight parts |

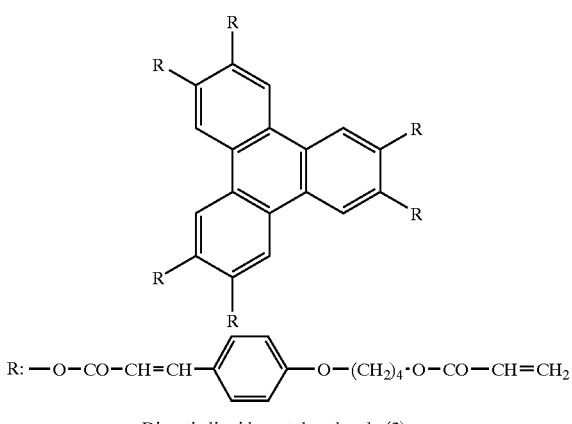

Discotic liquid crystal molecule (2)

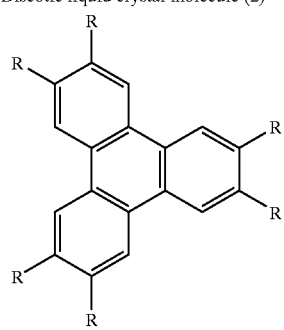

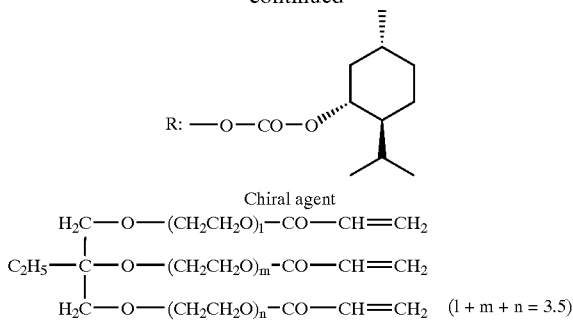

Chiral agent $H_2C-O-(CH_2CH_2O)_l-CO-CH=CH_2$
$C_2H_5-C-O-(CH_2CH_2O)_m-CO-CH=CH_2$
$H_2C-O-(CH_2CH_2O)_n-CO-CH=CH_2$  (l + m + n = 3.5)

Polymerizable plasticizer

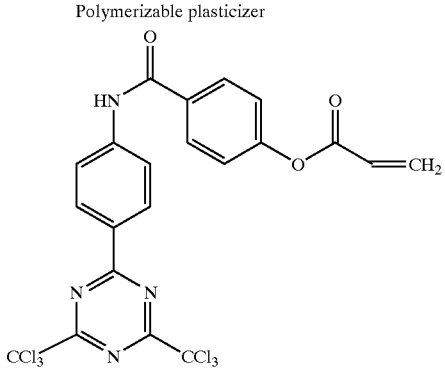

Photopolymerization initiator

The formed layer was exposed to ultraviolet light for 4 seconds while heated at 130° C., to polymerize the terminal vinyl group of the discotic liquid crystal molecules and to fix the alignment. Thus an optical compensatory sheet was produced.

The retardation of the produced optical compensatory sheet measured at the wavelength of 550 nm was 880 nm. The twist angle of the discotic liquid crystal molecule was 240°. Further, the alignment of the discotic liquid crystal molecules was observed by means of a polarizing microscope, and thereby it was confirmed that all the molecules were uniformly oriented in monodomain alignment.

Separately, an optical compensatory sheet was prepared in the same manner as is described above, except that the chiral agent was not used. The discotic liquid crystal molecules were vertically aligned, but not twisted in the prepared optical compensatory sheet. The retardation value (Re) was measured using an elipsometer at the wavelength of 550 nm. The average inclined angle calculated from the measured retardation value was 85 to 90°.

(Production of Liquid Crystal Display)

An STN liquid crystal cell (twist angle: 240°, Δnd: 880 nm) was prepared. Independently, two optical compensatory sheets produced in Applied Example 1 were laminated so that their optically anisotropic layer sides might face each other and that the director (direction of a normal line of the discotic core plane) of the discotic liquid crystal molecules in one sheet might be identical with that of the liquid crystal molecules in the other sheet. The thus laminated optical compensatory sheets were provided on the bottom of the STN liquid crystal cell, so that the director of the discotic liquid crystal molecules in the sheets might be arranged at the same direction of the director of the rod-like liquid crystal molecules in the cell along the interface between the cell and the sheets. A pair of polarizing plates were then provided in cross-Nicol, to produce a liquid crystal display of an STN mode.

The produced liquid crystal display was compared with a liquid crystal display having no optical compensatory sheet, and thereby it was confirmed that the optical compensatory sheet remarkably enlarged a viewing angle of the liquid crystal cell.

EXAMPLE 10
(Production of Optically Anisotropic Element)

A cellulose triacetate film (thickness: 100 μm, size: 270 mm×100 mm, FUJI TAC, Fuji Photo Film Co., Ltd.) was used as a transparent support.

The polyimide used in Example 1 was dissolved in a mixed solvent of N-methyl-2-pyrrolidone and 2-butanone in the amount of 5 wt. %. The prepared solution was applied on the transparent support by means of a bar coater. After the applied solution was dried with blowing air at 80° C. for 10 minutes, the surface of the formed layer was subjected to a rubbing treatment to form an orientation layer.

The orientation layer was coated with the coating solution having the following components according to the extrusion coating method. By heating the applied solution at 130° C., discotic liquid crystal molecules were aligned.

| Coating solution | |
|---|---|
| The discotic liquid crystal molecule (1) used in Example 8 | 100 weight parts |
| The compound (45) | 5.0 weight parts |
| A photopolymerization initiator (Irgacure 907, Ciba Geigy) | 0.2 weight part |
| 2-butanone | 185 weight parts |

While the formed layer was heated at 130° C., non-polarized parallel rays of 365 nm emitted from an extra-high pressure mercury lamp (500 w) were applied (incident angle to the surface of the support: 60°, azimuthal angle: parallel to the rubbing direction) for 1 minute.

The light source was changed to a metal halide lamp, and then ultraviolet rays were applied for 10 seconds so as to polymerize the terminal vinyl group of the discotic liquid crystal molecules and to fix the alignment. Thus an optically anisotropic element was produced.

The retardation in plane (Re) of the element was measured to obtain the angel dependency of Re, from which the average inclined angle of the discotic liquid crystal molecules was determined 70°. Further, the alignment of the discotic liquid crystal molecules was observed by means of a polarizing microscope, and thereby it was confirmed that all the molecules were uniformly oriented in monodomain alignment without any defect.

This measurement was repeated twice. As a result, though there was a slight variation in the average inclined angle (70±2°), no defect in the alignment was observed in either measurement.

COMPARISON EXAMPLE 3

The procedure of Example 10 was repeated except that the compound (45) was not used, to produce an optically anisotropic element.

The retardation in plane (Re) of the element was measured to obtain the angel dependency of Re, from which the average inclined angle of the discotic liquid crystal molecules was determined 78°. Further, the alignment of the discotic liquid crystal molecules was observed by means of a polarizing microscope, and thereby many island-like aligning defects were confirmed.

EXAMPLE 11

The procedure of Example 10 was repeated except that a commercially available polyimide orientation layer (SE-150, Nissan Chemicals Co., Ltd.) used, to produce an optically anisotropic element.

The retardation in plane (Re) of the element was measured to obtain the angel dependency of Re, from which the average inclined angle of the discotic liquid crystal molecules was determined 40°. Further, the alignment of the discotic liquid crystal molecules was observed by means of a polarizing microscope, and thereby it was confirmed that all the molecules were uniformly oriented in monodomain alignment without any defect.

COMPARISON EXAMPLE 4

The procedure of Example 11 was repeated except that the compound (45) was not used, to produce an optically anisotropic element.

The retardation in plane (Re) of the element was measured to obtain the angel dependency of Re, from which the average inclined angle of the discotic liquid crystal molecules was determined 20°. Further, the alignment of the discotic liquid crystal molecules was observed by means of a polarizing microscope, and thereby it was confirmed that all the molecules were uniformly oriented in monodomain alignment without any defect.

EXAMPLE 12

Completely saponified polyvinyl alcohol (polymerization degree: 500) and 4-(4-hexylphenylazo)phenoxyacetyl chloride were added in a mixed solvent of dimethylformamide and benzene, and heated for 5 hours to prepare the following denatured polyvinyl alcohol containing azobenzene-repeating units in the amount of 16 wt. %.

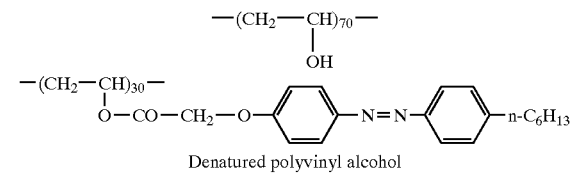

Denatured polyvinyl alcohol

The procedure of Example 10 was repeated except that an orientation layer was formed from the above-prepared denatured polyvinyl alcohol not by performing the rubbing treatment but by applying ultraviolet rays from the extra-high pressure mercury lamp for 3 minutes, to produce an optically anisotropic element.

The retardation in plane (Re) of the element was measured to obtain the angel dependency of Re, from which the average inclined angle of the discotic liquid crystal molecules was determined 58°. Further, the alignment of the discotic liquid crystal molecules was observed by means of a polarizing microscope, and thereby it was confirmed that all the molecules were uniformly oriented in monodomain alignment without any defect.

EXAMPLE 13

The procedure of Example 12 was repeated except that light from the extra-high pressure mercury lamp was applied (incident angle to the surface of the support: 60°, azimuthal angle: 45°) for 3 minutes while the layer was heated at 130° C., to produce an optically anisotropic element.

The retardation in plane (Re) of the element was measured to obtain the angel dependency of Re, from which the average inclined angle of the discotic liquid crystal molecules was determined 58°. Further, the alignment of the discotic liquid crystal molecules was observed by means of a polarizing microscope, and thereby it was confirmed that all the molecules were uniformly oriented in monodomain alignment without any defect. When the axis of crossed nickols was placed parallel to the major axis of the support, the element was the brightest. On the other hand, when the axis of crossed nickols was placed at an angle of 45° to the major axis of the support, light did not pass through the element.

What is claimed is:

1. A liquid crystal composition comprising liquid crystal molecules and an alignment promoter represented by the formula (I) in an amount of 0.01 to 20 wt. % based on the amount of the liquid crystal molecules:

$$(\text{Hb-L}^1\text{-})_n\text{Bl} \qquad (\text{I})$$

in which Hb is a hydrophobic group selected from the group consisting of an aliphatic group having 4 to 40 carbon atoms, an aromatic group having 6 to 40 carbon atoms and an aliphatic substituted oligosiloxanoxy group having 1 to 40 carbon atoms; $L^1$ is a single bond or a divalent linking group; n is an integer of 2 to 12; and Bl is an n-valent group comprising at least two rings and showing an excluded volume effect.

2. The liquid crystal composition as defined in claim 1, wherein Hb is a fluorine-substituted alkyl group having 4 to 40 carbon atoms, an alkyl group having 6 to 40 carbon atoms or a fluorine-substituted aryl group having 6 to 40 carbon atoms.

3. The liquid crystal composition as defined in claim 1, wherein $L^1$ is a single bond or a divalent linking group selected from the group consisting of an alkylene group, a fluorine-substituted alkylene group, —O—, —S—, —CO—, —NR—, —SO$_2$—, and a combination thereof, and R is hydrogen or an alkyl group having 1 to 30 carbon atoms.

4. The liquid crystal composition as defined in claim 1, wherein n is an integer of 3 to 9.

5. The liquid crystal composition as defined in claim 1, wherein Bl is an n-valent group comprising at least three rings.

6. The liquid crystal composition as defined in claim 5, wherein the alignment promoter is represented by the formula (II):

$$(\text{Hb-L}^1\text{-Cy}^1\text{-L}^2\text{-})_n\text{Cy}^2 \qquad (\text{II})$$

in which Hb is a hydrophobic group selected from the group consisting of an aliphatic group having 4 to 40 carbon atoms, an aromatic group having 6 to 40 carbon atoms and an aliphatic substituted oligosiloxanoxy group having 1 to 40 carbon atoms; $L^1$ is a single bond or a divalent linking group; $Cy^1$ is a divalent cyclic group; $L^2$ is a single bond or a divalent linking group; n is an integer of 2 to 12; and $Cy^2$ is an n-valent cyclic group.

7. The liquid crystal composition as defined in claim 6, wherein $L^2$ is a single bond or a divalent linking group selected from the group consisting of an alkylene group, an alkenylene group, an alkynylene group, —O—, —S—, —CO—, —NR—, —SO$_2$— and a combination thereof, and R is hydrogen or an alkyl group having 1 to 30 carbon atoms.

8. The liquid crystal composition as defined in claim 6, wherein the cyclic groups represented by $Cy^1$ and $Cy^2$ form a plane molecular structure as a whole.

9. The liquid crystal composition as defined in claim 6, wherein each of $Cy^1$ and $Cy^2$ independently is an aromatic group or a heterocyclic group.

10. The liquid crystal composition as defined in claim 9, wherein $Cy^1$ is a divalent aromatic group.

11. The liquid crystal composition as defined in claim 10, wherein the divalent aromatic group of $Cy^1$ is combined with another aromatic ring by a single bond, vinylene bond or ethynylene bond, or is condensed with another aromatic ring.

12. The liquid crystal composition as defined in claim 9, wherein $Cy^2$ is an n-valent aromatic group.

13. The liquid crystal composition as defined in claim 1, wherein Bl contains a photosensitive group that changes its chemical structure when absorbing light energy.

14. The liquid crystal composition as defined in claim 13, wherein the photosensitive group contains a double bond selected from the group consisting of C=C, C=N and N=N.

15. The liquid crystal composition as defined in claim 13, wherein the photosensitive group is an aromatic azo group.

16. The liquid crystal composition as defined in claim 1, wherein the liquid crystal molecules are discotic liquid crystal molecules.

17. The liquid crystal composition as defined in claim 1, wherein the liquid crystal molecules are rod-like liquid crystal molecules.

18. The liquid crystal composition as defined in claim 1, wherein the liquid crystal molecules have polymerizable groups.

19. An optically anisotropic element which comprises a liquid crystal layer comprising liquid crystal molecules and an orientation layer provided on one side of the liquid crystal layer, wherein the liquid crystal layer further contains an alignment promoter represented by the formula (I) in an amount of 0.005 to 0.5 g/m$^2$:

$$(\text{Hb-L}^1\text{-})_n\text{Bl} \qquad (\text{I})$$

in which Hb is a hydrophobic group selected from the group consisting of an aliphatic group having 4 to 40 carbon atoms, an aromatic group having 6 to 40 carbon atoms and an aliphatic substituted oligosiloxanoxy group having 1 to 40 carbon atoms; $L^1$ is a single bond or a divalent linking group; n is an integer of 2 to 12; and Bl is an n-valent group comprising at least two rings.

20. The optically anisotropic element as defined in claim 19, wherein the liquid crystal molecules are aligned at an average inclined angle of 50° to 90°.

21. The optically anisotropic element as defined in claim 19, wherein the liquid crystal molecules are aligned and polymerized while keeping alignment.

22. A liquid crystal composition comprising liquid crystal molecules and an alignment promoter represented by the formula (II) in an amount of 0.01 to 20 wt. % based on the amount of the liquid crystal molecules:

$$(\text{Hb-L}^1\text{-Cy}^1\text{-L}^2\text{-})_n\text{Cy}^2 \qquad (\text{II})$$

in which Hb is a hydrophobic group selected from the group consisting of an aliphatic group having 4 to 40 carbon atoms, an aromatic group having 6 to 40 carbon atoms and an aliphatic substituted oligosiloxanoxy group having 1 to 40 carbon atoms; $L^1$ is a single bond or a divalent linking group; $Cy^1$ is a divalent cyclic group; $L^2$ is a single bond or a divalent linking group; n is an integer of 2 to 12; and $Cy^2$ is an n-valent cyclic group.

23. The liquid crystal composition as defined in claim 22, wherein Hb is a fluorine-substituted alkyl group having 4 to 40 carbon atoms, an alkyl group having 6 to 40 carbon atoms or a fluorine-substituted aryl group having 6 to 40 carbon atoms.

24. The liquid crystal composition as defined in claim 22, wherein $L^1$ is a single bond or a divalent linking group selected from the group consisting of an alkylene group, a fluorine-substituted alkylene group, —O—, —S—, —CO—, —NR—, —SO$_2$— and a combination thereof, and R is hydrogen or an alkyl group having 1 to 30 carbon atoms.

25. The liquid crystal composition as defined in claim 22, wherein n is an integer of 3 to 9.

26. The liquid crystal composition as defined in claim 22, wherein $L^2$ is a single bond or a divalent linking group selected from the group consisting of an alkylene group, an alkenylene group, an alkynylene group, —O—, —S—, —CO—, —NR—, —SO$_2$— and a combination thereof, and R is hydrogen or an alkyl group having 1 to 30 carbon atoms.

27. The liquid crystal composition as defined in claim 22, wherein each of $Cy^1$ and $Cy^2$ independently is an aromatic group or a heterocyclic group.

28. The liquid crystal composition as defined in claim 27, wherein $Cy^1$ is a divalent aromatic group.

29. The liquid crystal composition as defined in claim 28, wherein the divalent aromatic group of $Cy^1$ is combined with another aromatic ring by a single bond, vinylene bond or ethynylene bond, or is condensed with another aromatic ring.

30. The liquid crystal composition as defined in claim 27, wherein $Cy^2$ is an n-valent aromatic group.

31. The liquid crystal composition as defined in claim 22, wherein the cyclic groups represented by $Cy^1$ and $Cy^2$ form a plane molecular structure as a whole.

32. The liquid crystal composition comprising as defined in claim 22, wherein the liquid crystal molecules are discotic liquid crystal molecules.

33. The liquid crystal composition as defined in claim 22, wherein the liquid crystal molecules are rod-like liquid crystal molecules.

34. The liquid crystal composition as defined in claim 22, wherein the liquid crystal molecules have polymerizable groups.

35. A liquid crystal composition comprising liquid crystal molecules and an alignment promoter represented by the formula (I) in an amount of 0.01 to 20 wt. % based on the amount of the liquid crystal molecules:

in which Hb is a hydrophobic group selected from the group consisting of an aliphatic group having 4 to 40 carbon atoms, an aromatic group having 6 to 40 carbon atoms and an aliphatic substituted oligosiloxanoxy group having 1 to 40 carbon atoms; $L^1$ is a single bond or a divalent linking group; n is an integer of 2 to 12; Bl is an n-valent group comprising at least two rings, and wherein Bl contains a photosensitive group that changes its chemical structure when absorbing light energy.

36. The liquid crystal composition as defined in claim 35, wherein Hb is a fluorine-substituted alkyl group having 4 to 40 carbon atoms, an alkyl group having 6 to 40 carbon atoms or a fluorine-substituted aryl group having 6 to 40 carbon atoms.

37. The liquid crystal composition as defined in claim 35, wherein $L^1$ is a single bond or a divalent linking group selected from the group consisting of an alkylene group, a fluorine-substituted alkylene group, —O—, —S—, —CO—, —NR—, —SO$_2$— and a combination thereof, and R is hydrogen or an alkyl group having 1 to 30 carbon atoms.

38. A liquid crystal composition as defined in claim 35, wherein n is an integer of 3 to 9.

39. The liquid crystal composition as defined in claim 35, wherein Bl is an n-valent group comprising at least three rings.

40. The liquid crystal composition as defined in claim 35, wherein the photosensitive group contains a double bond selected from the group consisting of C=C, C=N and N=N.

41. The liquid crystal composition as defined in claim 35, wherein the photosensitive group is an aromatic azo group.

42. The liquid crystal composition as defined in claim 35, wherein the liquid crystal molecules are discotic liquid crystal molecules.

43. The liquid crystal composition as defined in claim 35, wherein the liquid crystal molecules are rod-like liquid crystal molecules.

44. The liquid crystal composition as defined in claim 35, wherein the liquid crystal molecules have polymerizable groups.

45. A liquid crystal composition comprising rod-like liquid crystal molecules and an alignment promoter represented by the formula (I) in an amount of 0.01 to 20 wt. % based on the amount of the liquid crystal molecules:

in which Hb is a hydrophobic group selected from the group consisting of an aliphatic group having 4 to 40 carbon atoms, an aromatic group having 6 to 40 carbon atoms and an aliphatic substituted oligosiloxanoxy group having 1 to 40 carbon atoms; $L^1$ is a single bond or a divalent linking group; n is an integer of 2 to 12; and Bl is an n-valent group comprising at least two rings.

46. The liquid crystal composition as defined in claim 45, wherein Hb is a fluorine-substituted alkyl group having 4 to 40 carbon atoms, an alkyl group having 6 to 40 carbon atoms or a fluorine-substituted aryl group having 6 to 40 carbon atoms.

47. The liquid crystal composition as defined in claim 45, wherein $L^1$ is a single bond or a divalent linking group selected from the group consisting of an alkylene group, a fluorine-substituted alkylene group, —O—, —S—, —CO—, —NR—, —SO$_2$— and a combination thereof, and R is hydrogen or an alkyl group having 1 to 30 carbon atoms.

48. The liquid crystal composition as defined in claim 45, wherein n is an integer of 3 to 9.

49. The liquid crystal composition as defined in claim 45, wherein Bl is an n-valent group comprising at least three rings.

50. The liquid crystal composition as defined in claim 45, wherein the rod-like liquid crystal molecules have polymerizable groups.

* * * * *